(12) United States Patent
Rinzler et al.

(10) Patent No.: US 10,042,123 B2
(45) Date of Patent: Aug. 7, 2018

(54) RUGGED PASSIVELY COOLED HIGH POWER LASER FIBER OPTIC CONNECTORS AND METHODS OF USE

(71) Applicant: Foro Energy, Inc., Houston, TX (US)

(72) Inventors: Charles C. Rinzler, Boston, MA (US); William C. Gray, Parker, CO (US); Jason D. Fraze, Littleton, CO (US); Brian O. Faircloth, Evergreen, CO (US); Mark S. Zediker, Castle Rock, CO (US); Ryan P. McKay, Littleton, CO (US)

(73) Assignee: Foro Energy, Littleton, CO (US)

( * ) Notice: Subject to any disclaimer, the term of this patent is extended or adjusted under 35 U.S.C. 154(b) by 0 days.

(21) Appl. No.: 15/147,269

(22) Filed: May 5, 2016

(65) Prior Publication Data

US 2016/0341906 A1    Nov. 24, 2016

Related U.S. Application Data

(62) Division of application No. 13/486,795, filed on Jun. 1, 2012, now Pat. No. 9,360,643.

(60) Provisional application No. 61/493,174, filed on Jun. 3, 2011, provisional application No. 61/605,413, filed on Mar. 1, 2012.

(51) Int. Cl.
| | |
|---|---|
| *G02B 6/26* | (2006.01) |
| *G02B 6/36* | (2006.01) |
| *H01S 3/042* | (2006.01) |
| *G02B 6/38* | (2006.01) |
| *G02B 6/42* | (2006.01) |
| *G02B 6/44* | (2006.01) |
| *H01S 3/00* | (2006.01) |

(52) U.S. Cl.
CPC .......... *G02B 6/3624* (2013.01); *G02B 6/262* (2013.01); *G02B 6/3813* (2013.01); *G02B 6/3814* (2013.01); *G02B 6/3818* (2013.01); *G02B 6/4296* (2013.01); *G02B 6/4427* (2013.01); *H01S 3/0064* (2013.01); *H01S 3/042* (2013.01); *G02B 2006/4297* (2013.01)

(58) Field of Classification Search
CPC . G02B 6/14; G02B 6/262; G02B 6/32; G02B 6/34; G02B 6/3624; G02B 6/3813; G02B 6/3814; G02B 6/3818; G02B 6/42; G02B 6/4201; G02B 6/4296; G02B 6/4427; H01S 3/0405; H01S 3/042; H01S 3/005; H01S 3/0064; H01S 3/0675; H01S 3/067; H01S 3/06754; H01S 3/06708; H01S 5/0683
USPC .. 385/27–28, 31, 33, 38, 39, 78, 88, 89, 92, 385/93, 94, 123; 362/259, 312; 372/6
See application file for complete search history.

(56) References Cited

U.S. PATENT DOCUMENTS

2010/0044105 A1* 2/2010 Faircloth ............... E21B 7/14
 175/16

* cited by examiner

*Primary Examiner* — Jerry Rahll
*Assistant Examiner* — Michael Mooney
(74) *Attorney, Agent, or Firm* — Glen P. Belvis; Belvis Law LLC

(57) ABSTRACT

There are provided high power laser connectors and couplers and methods that are capable of providing high laser power without the need for active cooling to remote, harsh and difficult to access locations and under difficult and harsh conditions and to manage and mitigate the adverse effects of back reflections.

13 Claims, 59 Drawing Sheets

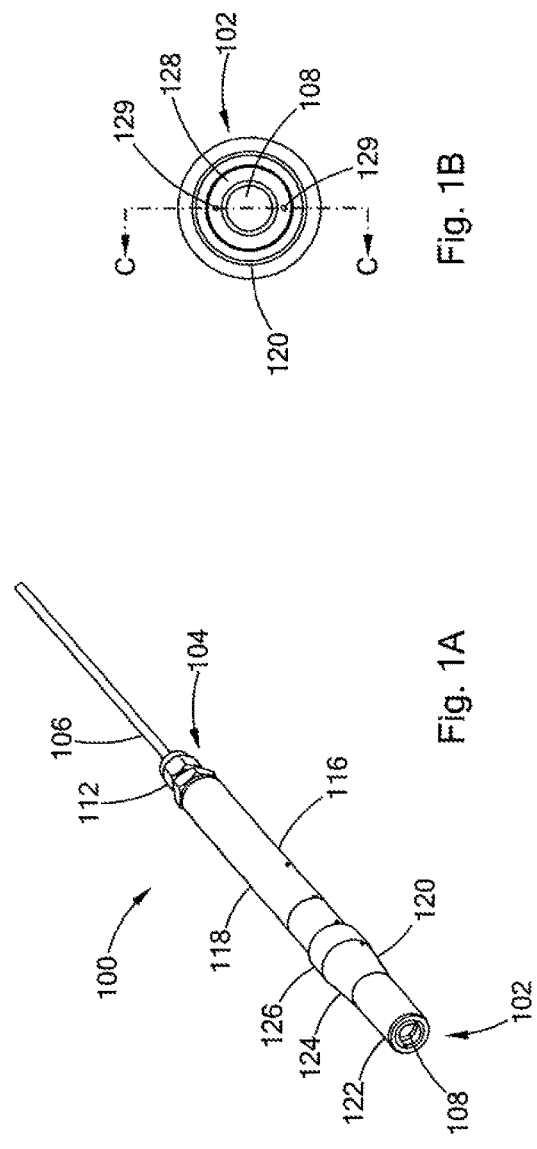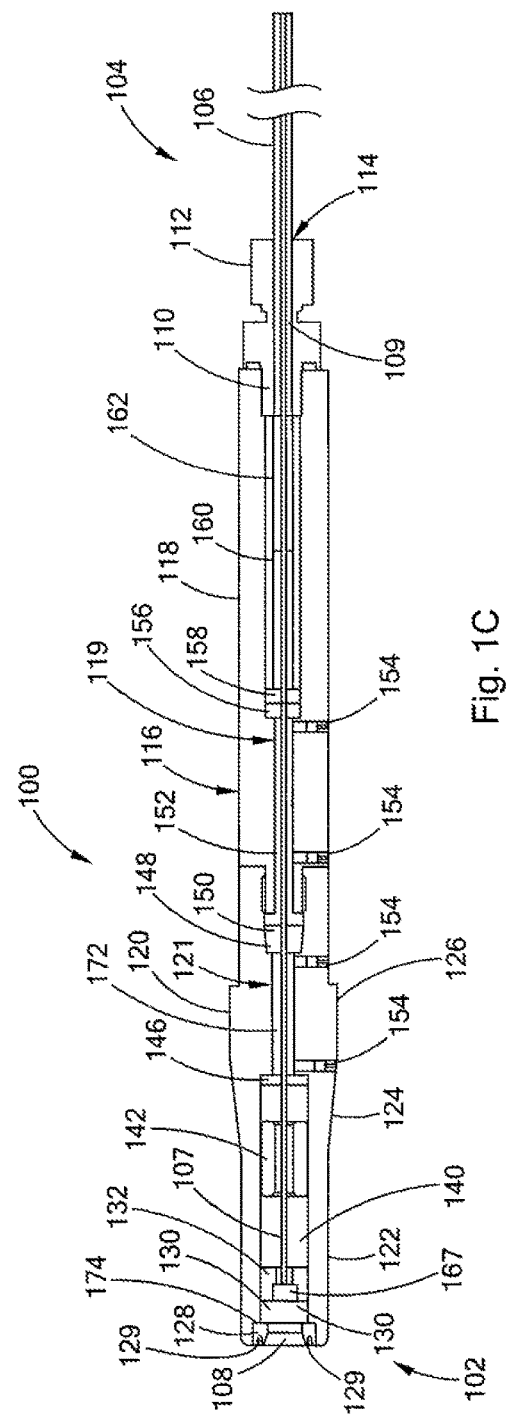

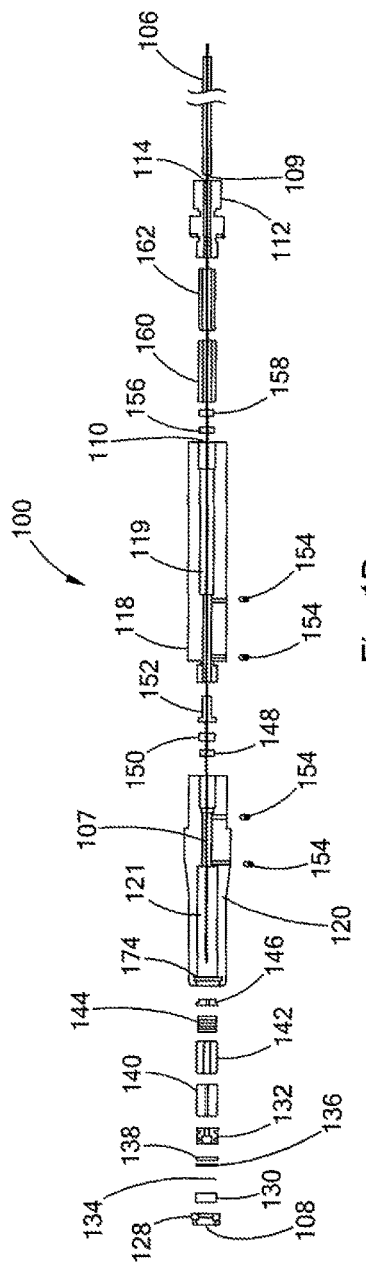
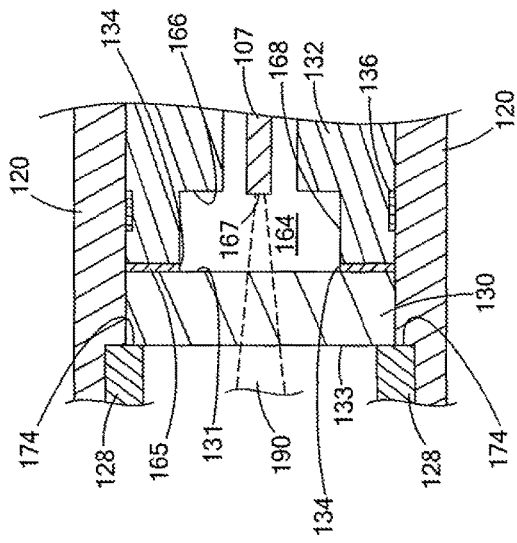
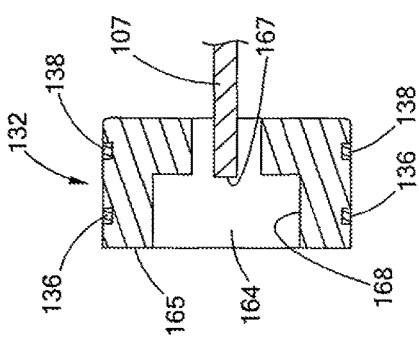

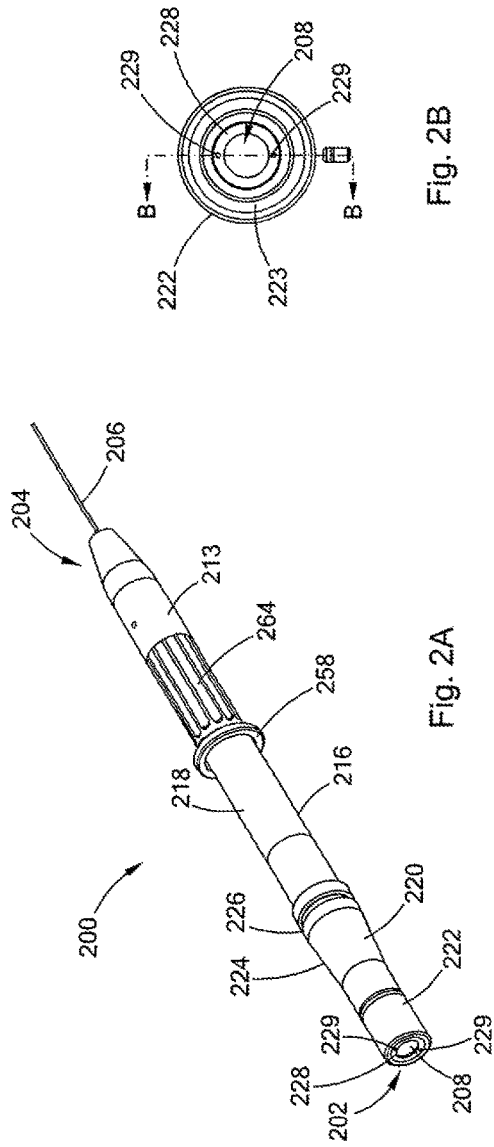
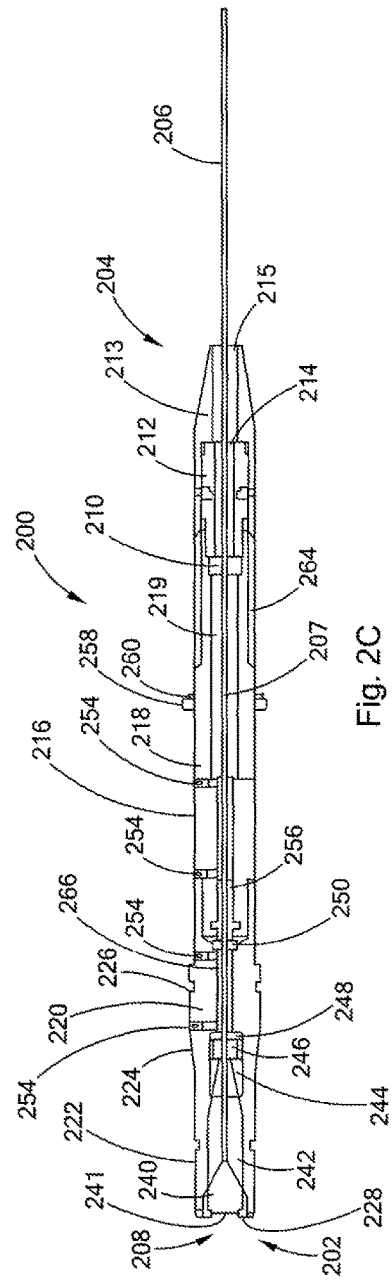

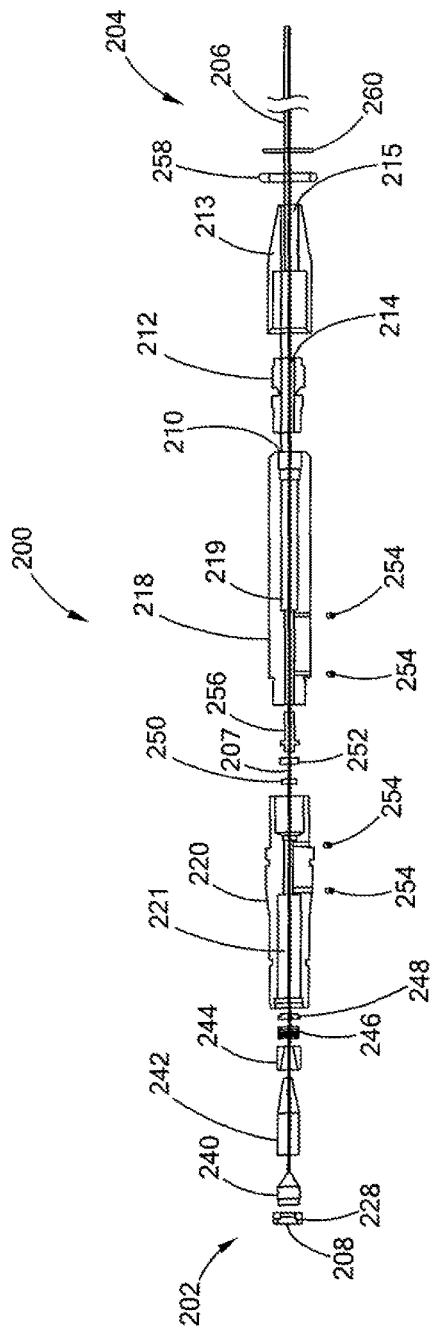
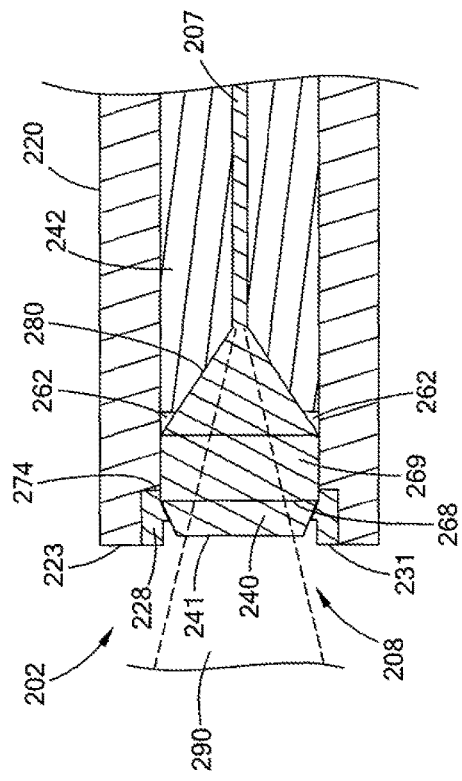

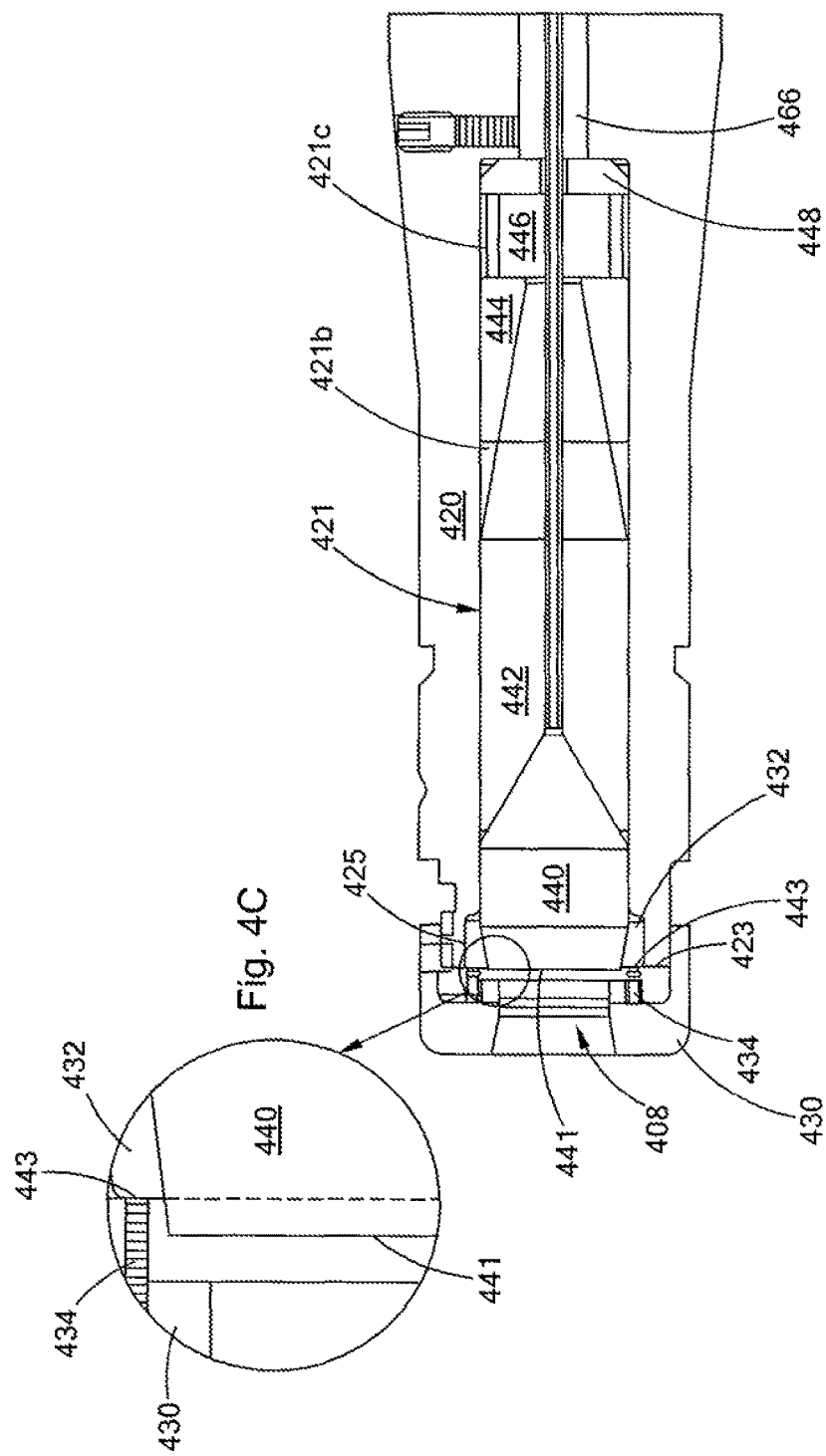

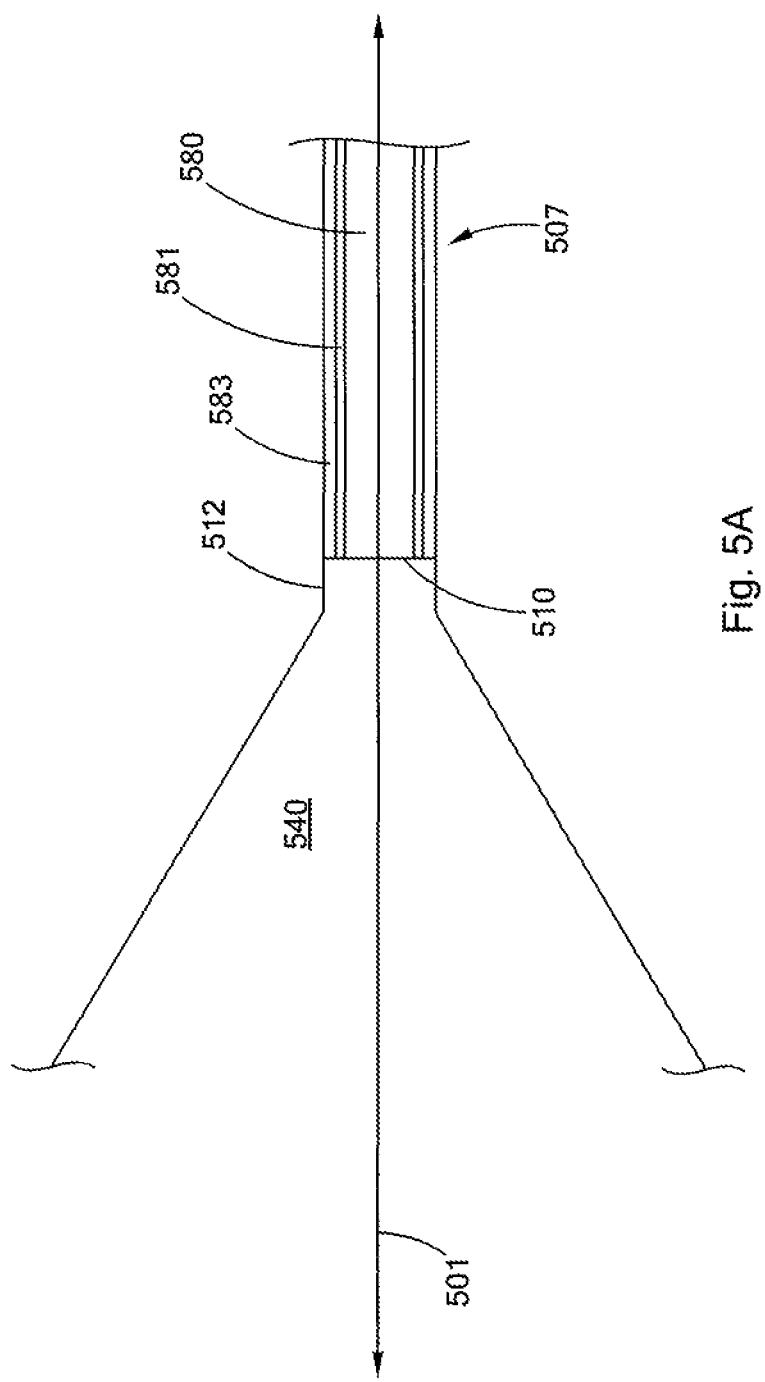

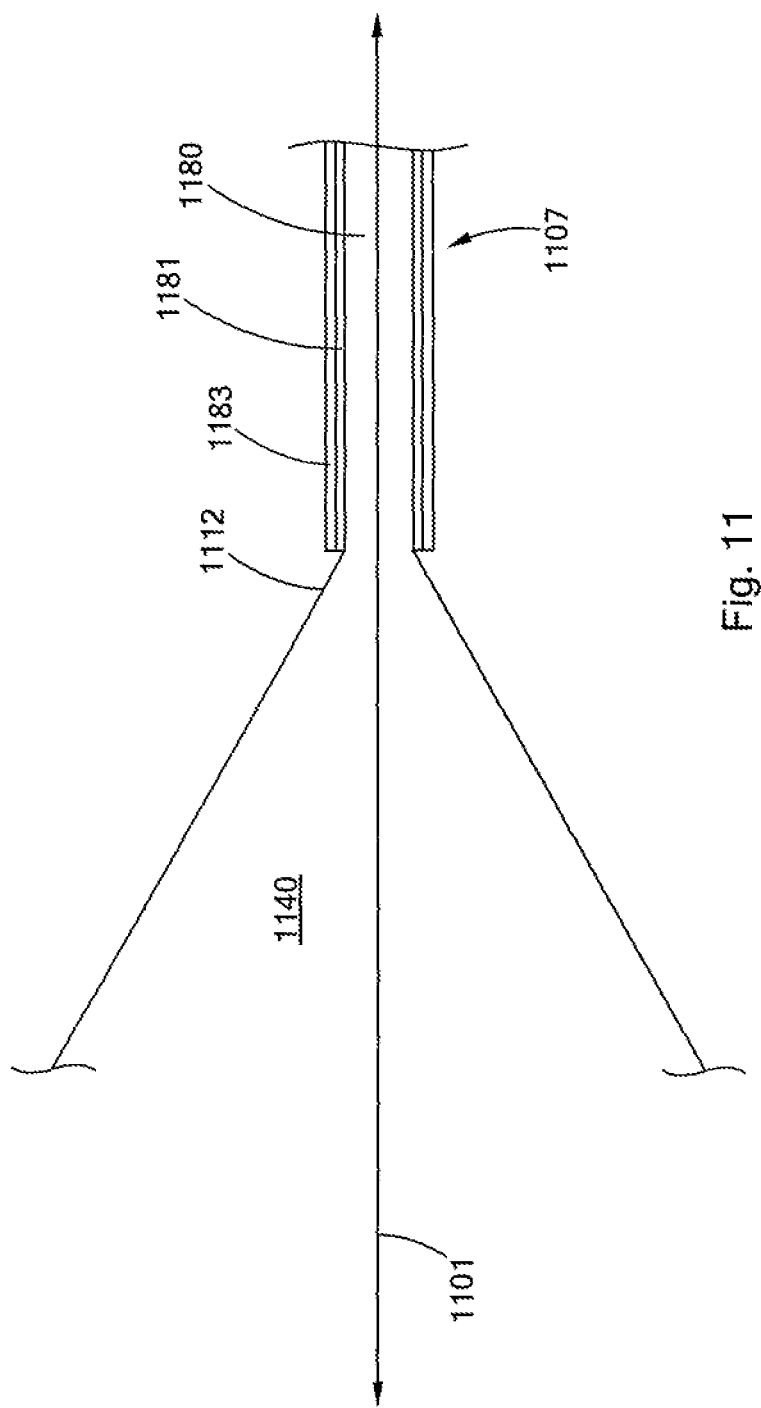

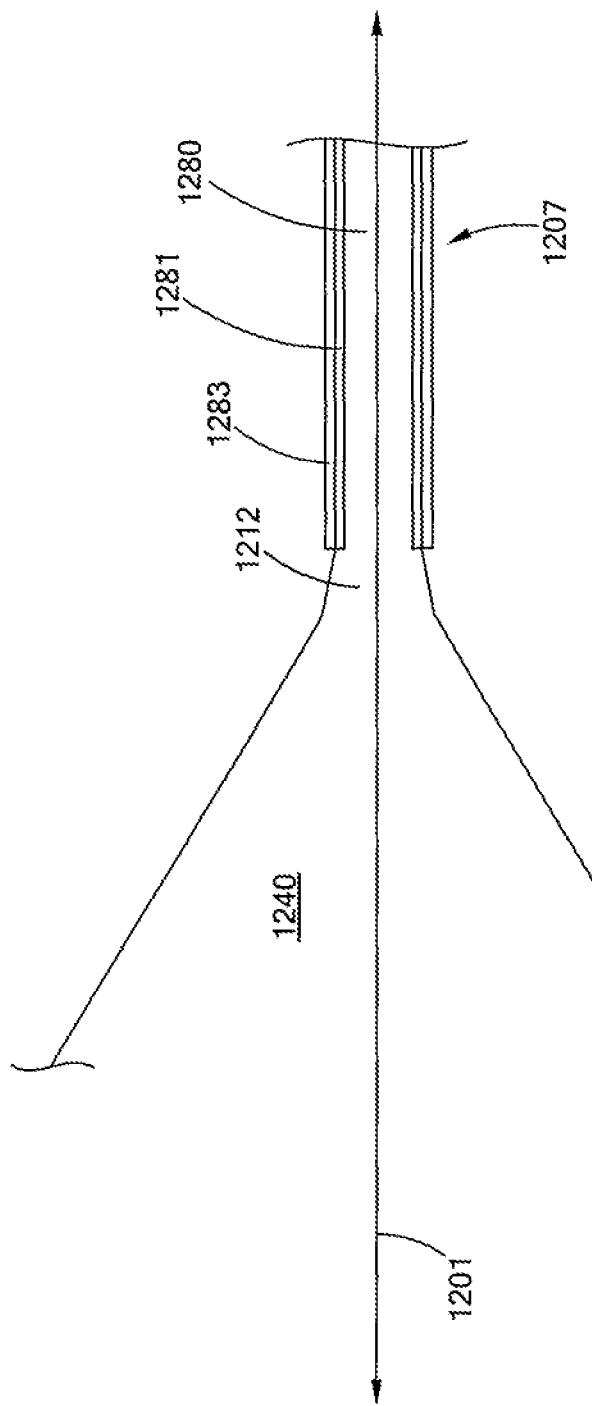

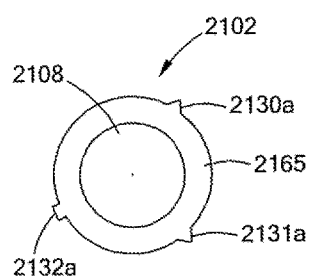
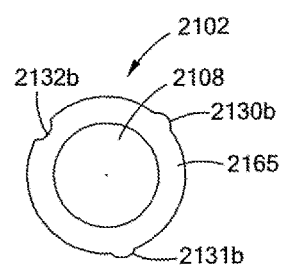
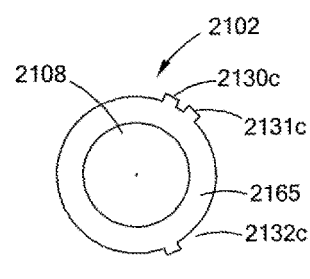
Fig. 21A      Fig. 21B      Fig. 21C
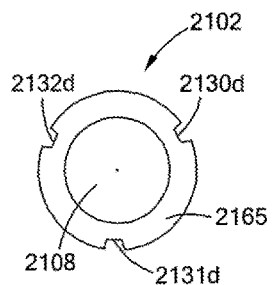
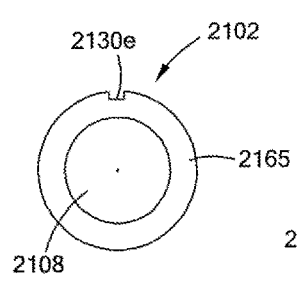
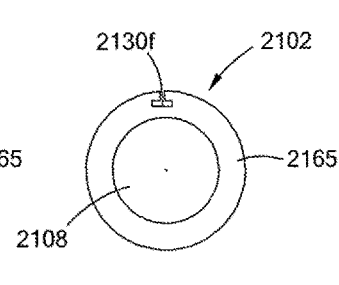
Fig. 21D      Fig. 21E      Fig. 21F
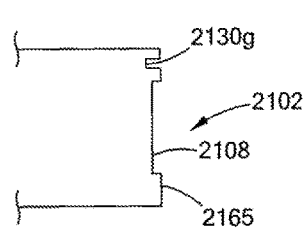
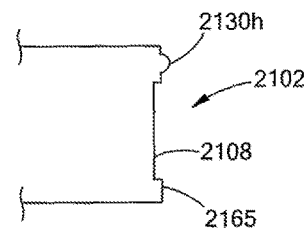
Fig. 21G      Fig. 21H

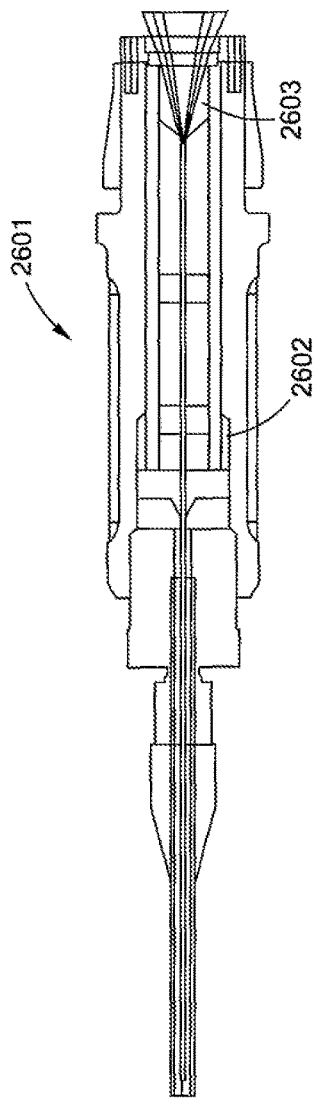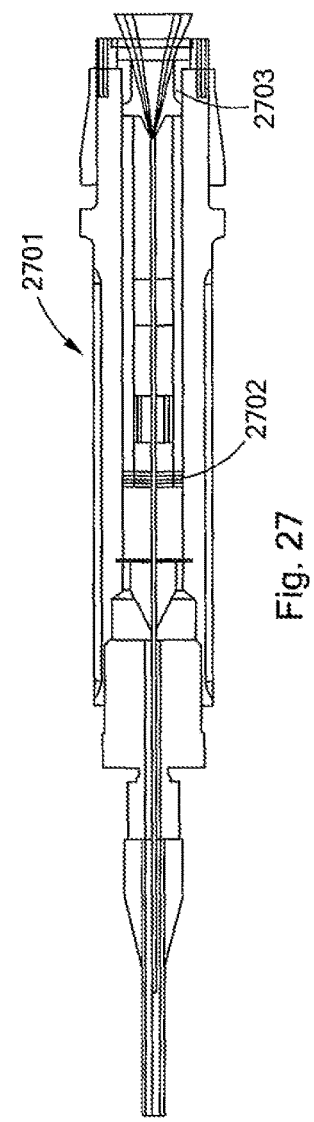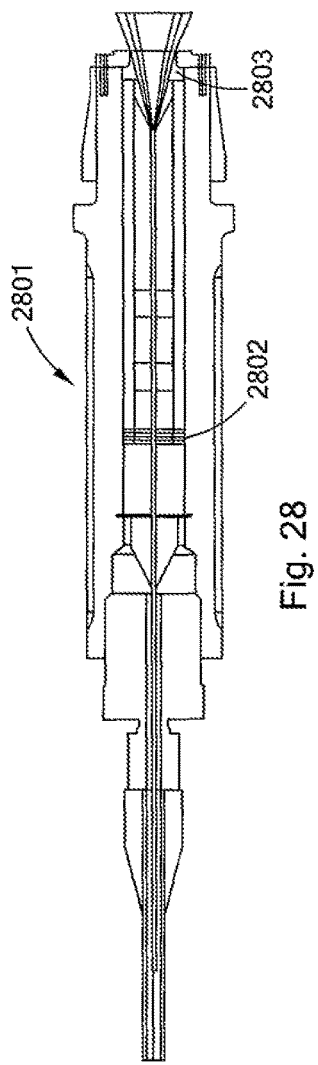

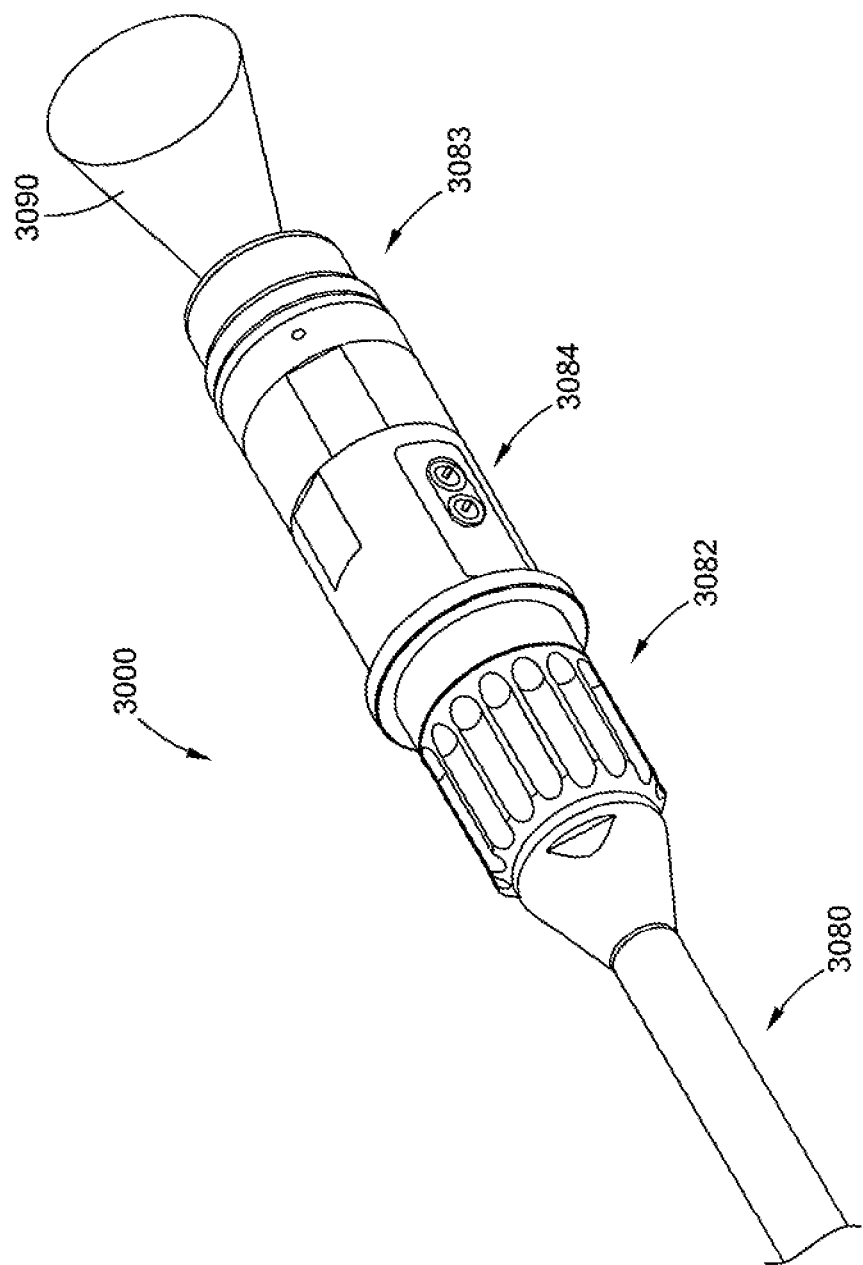

RUGGED PASSIVELY COOLED HIGH POWER LASER FIBER OPTIC CONNECTORS AND METHODS OF USE

This application: is a divisional of U.S. application Ser. No. 13/486,795, filed on Jun. 1, 2012, which: (i) claims, under 35 U.S.C. § 119(e)(1), the benefit of the filing date of Jun. 3, 2011 of provisional application Ser. No. 61/493,174; and (ii) claims, under 35 U.S.C. § 119(e)(1), the benefit of the filing date of Mar. 1, 2012 of provisional application Ser. No. 61/605,413, the entire disclosures of each of which are incorporated herein by reference.

This invention was made with Government support under Award DE-AR0000044 awarded by the Office of ARPA-E U.S. Department of Energy. The Government has certain rights in this invention.

BACKGROUND OF THE INVENTION

Field of the Invention

The present inventions relate to high power laser systems, high power laser fibers for the delivery of high power laser energy to remote and difficult to access locations, high power laser tools, and other high power laser systems and applications.

As used herein, unless specified otherwise "high power laser energy" means a laser beam having at least about 1 kW (kilowatt) of power. As used herein, unless specified otherwise "great distances" means at least about 500 m (meter). As used herein the term "substantial loss of power," "substantial power loss" and similar such phrases, mean a loss of power of more than about 3.0 dB/km (decibel/kilometer) for a selected wavelength. As used herein the term "substantial power transmission" means at least about 50% transmittance.

As used herein, unless specified otherwise, "optical connector", "fiber optics connector", "connector" and similar terms are to be given their broadest possible meaning and include, for example, any component from which a laser beam is or can be propagated, any component into which a laser beam is or can be propagated, and any component that propagates, receives, or both, a laser beam in relation to, e.g., free space, (which would include a vacuum, a gas, a liquid, a foam and other non-optical component materials), an optical component, a wave guide, a fiber, and combinations of the forgoing.

As used herein "passive cooling," "passively cooled" and similar such terms mean any type of cooling that does not employ or use an additional system, material, component or equipment to cool the assembly; but instead relies only on the operating environment and conditions to manage and to the extent needed to cool any heat generated by the high power laser energy during operations.

Discussion of Related Art

Although not limited to such applications and uses, embodiments of the present inventions may be employed or utilized with, or in conjunction with conventional high power laser systems, tools, applications and uses, such as short distance high power laser transmission systems that are commercially used in manufacturing, such as, e.g., in the automotive industry.

The present inventions may be utilized, and preferably are utilized and employed with, or in conjunction with, the novel and innovative high power long distance laser systems and recent breakthroughs in long distance high power laser transmission and applications that were created by inventors and co-inventors working at Foro Energy, Inc., which would include for example, the novel and innovative systems, methods and apparatus that are disclosed and taught in the following US patent applications, US Patent Application Publications and PCT Applications: Publication No. US 2010/0044106 (Method and Apparatus For Delivering High Power Laser Energy Over Long Distances); Publication No. 2010/0215326 (Optical Fiber Cable for Transmission of High Power Laser Energy Over Great Distances); Publication No. 2010/0044103 (Method and System for Advancement of a Borehole using a High Power Laser); Publication No. 2012/0020631 (Optical Fiber Configuration for Transmission of Laser Energy Over Great Distances); Ser. No. 13/210,581 (System and Conveyance Structures for High Power Long Distance Laser Transmission); Ser. No. PCT/U.S. Pat. No. 12/26337 (Tools and Methods for Use with a High Power Laser Transmission System); and Ser. No. 13/403,692 (Control System for High Power Laser Drilling Workover and Completion Unit), the entire disclosures of each of which are incorporated by reference herein.

The present inventions may also be utilized, and preferably are utilized and employed with, or in conjunction with, the novel and innovative high power long distance laser tools, apparatus, devices and systems and recent breakthroughs in long distance high power laser transmission and applications that were created by inventors and co-inventors working at Foro Energy, Inc., which would include for example, the novel and innovative systems, methods and apparatus that are disclosed and taught in the following US patent applications and US Patent Application Publications: Publication No. 2010/0044106 (Method and Apparatus For Delivering High Power Laser Energy Over Long Distances); Publication No. 2010/0044104 (Apparatus for Advancing a Wellbore using High Power Laser Energy); Publication No. 2010/0044105 (Methods and Apparatus for Delivering High Power Laser Energy to a Surface); Publication No. 2010/0044103 (Method and System for Advancement of a Borehole using a High Power Laser); Ser. No. 13/034,037 (Laser Assisted System for Controlling Deep Water Drilling Emergency Situations); Ser. No. 13/222,931 (Fluid LaserJets, Cutting Heads, Tools and Methods of Use); Ser. No. 13/211,729 (Two-Phase Isolation Methods and Systems for Controlled Drilling); Ser. No. 13/247,445 (High Power Laser Photo-Conversion Assemblies, Apparatus and Methods of Use); Ser. No. 13/366,882 (High Power Laser Pipeline Tool and Methods of Use); Ser. No. 13/403,132 (Method of High Power Laser-Mechanical Drilling); Ser. No. 13/403,287 (Electric Motor for Laser-Mechanical Drilling); Ser. No. 13/403,509 (Optics Assembly for High Power Laser Tools); Ser. No. 13/403,615 (High Power Laser-Mechanical Drilling Bit and Methods of Use); Ser. No. 61/605,422 (Laser System and Methods for the Removal of Structures); Ser. No. 61/605,429 (High Power Laser Cutting Tool and System); Ser. No. 61/605,434 (High Power Laser Tools); and, Ser. No. 61/605,401 (High Power Optical Slip Ring Assemblies) the entire disclosures of each of which are incorporated herein by reference.

SUMMARY

It is desirable to have an optical connector that can handle high laser powers. In particular, it is desirable to have a high power optical connector without the need for active cooling, which can handle greater than 2 kW, greater than 5 kW, greater than 10 kW, greater than 20 kW, greater than 25 kW and greater laser powers, and which can do so under harsh environmental and operational conditions, e.g., high g-loads, extreme temperatures, dirty environments and high pressures, such as for example conditions found deep within an oil, gas or geothermal borehole, at a surface mine, in an underground mine, in a pipeline, in a nuclear facility, in a chemical processing facility, in manufacturing facilities, under water, at the seafloor, or below the seafloor. The present inventions, among other things, solve these needs by providing the articles of manufacture, devices and processes taught herein.

Thus, there is provided a high power laser connector having: an optical assembly; the optical assembly having a back reflection chamber in optical association with an optical block; and, the optical block having a launch face for propagating a high power laser beam along a laser beam path in a direction away from the connector; whereby, substantially all back reflections entering the launch face are directed back out the launch face substantially along the laser beam path.

Further, there is provided a passively cooled high power laser connector having: a tail end and a face end; a housing defining a cavity, the cavity located between tail end and the face end; an optics package, having an optical fiber having a core, a first chamber, a back reflection chamber, an optical block, and a window; and, the optics package defining a portion of a laser beam path, the laser beam path extending from the tail end to the face end, and capable of transmitting a laser beam having a power of at least about 15 kW.

Yet additionally, there is provided a high power laser connector having: a tail end and a face end; a housing defining a cavity, the cavity located between tail end and the face end; an optics package, having an optical fiber having a core, a first chamber, and an optical block; the optics package defining a portion of a laser beam path, the laser beam path extending from the tail end to the face end, and capable of transmitting a laser beam having a power of at least about 15 kW; at least a portion of the optics package in the cavity; and, the optics block having ear structures.

Additionally, there is provided a high power laser connector having: a tail end and a face end; a housing defining a cavity, the cavity located between tail end and the face end; an optics package, having an optical fiber having a core, a first chamber, and an optical block; the optics package defining a portion of a laser beam path, the laser beam path extending from the tail end to the face end, and capable of transmitting a laser beam having a power of at least about 15 kW; at least a portion of the optics package in the cavity; and, the optics block having ear structures.

Moreover, there is provided a high power laser beam transmission assembly having: a housing having an outer surface and an inner surface, wherein the inner housing surface is positioned toward a path of a laser beam through the transmission assembly and the outer housing surface is positioned away from the laser beam path; the housing defining a cavity and isolating the cavity from fluid flow; at least one high power optical fiber within the cavity and having a core and a cladding; the optical fiber in optical communication with a laser beam transmission optical surface; and a mode stripper positioned within the cavity and optically associated with the fiber cladding and thermally associated with the housing.

Yet further, there is provided a high power laser beam connector having: a housing, the housing defining in part a face end and a tail end and extending there between; the housing defining a cavity; a high power optical assembly in the cavity; the high power optical assembly having a beam launch surface, whereby the beam launch surface is near the face end; a laser beam path extending from the beam launch surface and away from the optical assembly; the optical assembly joined to the housing; wherein the laser beam path remains substantially unchanged in relation to a predetermined reference area of the housing over temperature changes of at least about 25° C., during g-loads of at least about 20 g's, or at operating temperatures of at least about 100° C.

Still further there is provided a passively cooled high power laser optical connector configured to be placed into optical association and alignment with a device, the passively cooled connector having: a connector laser beam path; a housing, having: an outer surface; an inner surface; wherein the inner housing surface is positioned toward the laser beam path and the outer housing surface is positioned away from the laser beam path; and, the outer surface having an alignment component; the housing defining a cavity and isolating the cavity from fluid flow; at least one high power optical fiber having a core and a cladding; the optical fiber in optical communication with an optical block, the block having a laser beam transmission optical surface and a non-transmission surface; the block non-transmission surface being isolated from fluid flow; the laser beam transmission optical surface having a predetermined external laser beam path and external laser beam properties; wherein, the optical block, transmission optical surface, and fiber core are configured for a wavelength of light to provide a laser power per area along the connector beam path at the transmission optical surface that is at least 50% that of the laser power per area in the fiber along the connector beam path.

Still further, there is provided a high power laser beam transmission component having: a housing having an outer surface and an inner surface, wherein the inner housing surface is positioned toward a path of a laser beam through the housing; the housing defining a cavity and isolating the cavity from fluid flow; at least one high power optical assembly being at least partially contained within the cavity; the high power optical assembly having a laser beam transmission optical surface; and a means to manage back reflections.

Furthermore, there is provided a high power laser beam transmission system having: a receptacle and a connector; the receptacle having a housing configured to join to the connector; the connector having: a housing; a cavity; a high power optical assembly at least partially within the cavity; and, the high power optical assembly having a beam launch surface; the connector having a laser beam path extending from the beam launch surface and away from the high power optical assembly; the high power optical assembly joined to the housing; wherein the laser beam path remains substantially unchanged in relation to a predetermined reference area of the receptacle over temperature changes of at least about 25° C., during g-loads of at least about 20 g's, or at operating temperatures of at least about 100° C.

Yet additionally, there is provided a high power laser beam transmission system having: a first connector and a second connector; the first connector having a first face end and the second connector having a second face end; the first face end configured in the system as a distal end and the second face end configured as a proximal face end; each connector having: a housing; a cavity; a high power optical assembly at least partially within the cavity; and, the high power optical assembly having a beam surface; each beam surface having a laser beam path; the laser beam paths being substantially coincident; each high power optical assembly joined to its respective housing; wherein the laser beam paths remain substantially unchanged in relation to a predetermined reference area over temperature changes of at least about 25° C., during g-loads of at least about 20 g's, or at operating temperatures of at least about 100° C.

Moreover, there is provided a system for connecting high power laser components at remote locations, the system having: a high power laser, capable of providing a laser beam having at least 20 kW of power; a high power optical cable having a distal end and an proximal end and having a length between the distal and proximal ends of at least 1 km; a receptacle; a high power passively cooled connector, the connector having; a distal end and a proximal end; a means for mechanically and optically aligning the connector with the receptacle; a means for maintaining the consistency of the laser beam parameters over a temperature range from at or below 0° C. to at or above 150° C.; wherein, the proximal end of the optical cable is optically associated with the laser, the distal end of the optical cable is optically associated with the proximal end of the connector; and, wherein the distal end of the connector is releasably optically associated with the receptacle.

Still additionally, there is provided a high power laser connector having: a optical assembly; and, the optical assembly having a back reflection chamber in optical association with an optical block; the optical block having a launch face for propagating a high power laser beam along a beam path in a direction away from the connector; whereby, substantially all back reflections entering the launch face are directed back out the launch face substantially along the laser beam path.

Additionally, there is provided a method of transmitting high power laser energy to a remote location; providing a source of a high power laser beam, capable of providing at least about 15 kW of power; optically and mechanically associating a proximal end of a high power optical fiber having a length of at least about 1 km with the high power laser source; the optical fiber having a passively cooled high power laser connector on the distal end; and, transmitting at least 10 kW of laser power through the connector.

Further, there is provided a passively cooled high power laser optical connector configured for insertion into a receptacle of a high power laser device, the passively cooled connector having: an alignment component for mechanically and optically aligning the connector with the receptacle; and a means for athermalizing the connector; wherein the connector is capable of maintaining optical alignment over temperature changes of at least 25° C., during g-loads of at least about 20 g's, or at operating temperatures of at least about 50° C.

Yet still further, there is provided a high power laser connector having: a housing having a face end, a tail end, and defining a cavity between the face end and tail end; a means for transmitting high power laser energy positioned in the tail end and extending into the cavity; a means for launching or receiving a high power laser beam positioned near the face end; a means for managing back reflections positioned in the cavity; and, a means for athermalizing the connector components.

Moreover, there is provided a passively cooled high power laser optical connector configured for insertion into a receptacle of a high power laser device, the passively cooled connector having: an alignment component for mechanically and optically aligning the connector with the receptacle; and a means for compensating for differences in the coefficient of thermal expansion of components of the connector; wherein the connector is capable of maintaining optical alignment over temperature changes of at least 25° C., during g-loads of at least about 20 g's, or at operating temperatures of at least about 50° C.

Yet still further, these connectors, assemblies and methods may also include methods, components, or features, for example: wherein the high power laser beam has a power of at least about 10 kW; wherein at least about 90% of all back reflections are redirected; wherein at least about 95% of all back reflections are redirected; wherein the least power is at least about 15 kW; wherein the back reflection chamber has a mating surface; wherein the optical block has a first and a second back surface; wherein substantially all of the mating surface and the second back surface are optically associated; wherein the back reflection chamber and the optical block are integral; wherein the back reflection chamber and the optical block are separate components; wherein the back reflection chamber and the optical block are opto-mechanically jointed by chemical bonding; and/or wherein the optical block first back surface in optically associated with a core of an optical fiber.

Moreover, these connectors, assemblies and methods may also include methods, components, or features, for example: wherein the optical fiber passes through the back reflection chamber and is optically associated with the optical block; wherein the optical fiber passes through the back reflection chamber and is optically associated with the optical block; wherein the optical block has a means for addressing back reflections; wherein the means for addressing back reflections has a means for utilizing total internal reflection; wherein the back reflection chamber has a means for addressing back reflections; wherein the means for addressing back reflections has a means for utilizing total internal reflection; wherein the back reflection chamber and the optical block has means for addressing back reflections utilizing total internal reflection; wherein the optical block has a means for addressing back reflections; wherein the means for addressing back reflections has a means for utilizing total internal reflection; wherein the back reflection chamber and the optical block comprise means for addressing back reflections utilizing total internal reflection; wherein the means for addressing back reflections has a means for utilizing total internal reflection; wherein the back reflection chamber and the optical block comprise means for addressing back reflections utilizing total internal reflection; having a housing, the housing defining a cavity and isolating the cavity from fluid flow, and the optical assembly positioned within the cavity; having a pressure window in the laser beam path; wherein the connector is capable of operating under pressures of at least about 1,000 psi; wherein the connector is capable of operating under pressures of at least about 5,000 psi; and/or having a means for athermalizing.

Furthermore, these connectors, assemblies and methods may also include methods, components, or features, for example having a means for monitoring a condition of the connector.

Still further, these connectors, assemblies and methods may also include methods, components, or features, for example: having a means for monitoring a condition of the connector; having a means for monitoring a condition of the connector; wherein at least a portion of the cavity contains an epoxy; wherein the laser beam transmission optical surface is a surface of an optical block; wherein the block is a quartz block; wherein the optical surface is substantially planer; wherein the optical surface is a lens; wherein the block has a refractive surface; wherein the block has a diffusing surface; wherein the optical surface is the distal end of the transmission assembly; wherein the optical surface is the proximal end of the transmission assembly;

wherein the optical surface is positioned outside of the cavity; having a means for compensating for differences in the coefficient of thermal expansion of the transmission assembly; having a means for managing vibrational loads; having a means for managing mechanical shocks; wherein the connector is capable of maintaining optical alignment over temperature changes of at least 25° C., during g-loads of at least about 20 g's, or at operating temperatures of at least about 50° C.; having a first and a second spring; wherein both springs are associated with an epoxy dam; wherein the housing has two sections; having a high power optical fiber positioned in the cavity and extending from the connector tail end; and/or having an optical block, a mode stripper, a ferrule, a spacer wherein, the optical block is fused to the high power optical fiber.

BRIEF DESCRIPTION OF THE DRAWINGS

FIG. 1A is a perspective view of a first embodiment of a connector in accordance with the present invention.

FIG. 1B is a plan view of the face end of the embodiment of FIG. 1 A.

FIG. 1C is a cross-sectional view of the embodiment of FIG. 1A taken along line C-C of FIG. 1B.

FIG. 1D is an exploded view of the embodiment of FIG. 1 A.

FIG. 1E is a cross-sectional view of the front end of the embodiment of FIG. 1A.

FIG. 1F is an enlarged cross-section view of the front end of FIG. 1E.

FIG. 2A is a perspective view of a second embodiment of a connector in accordance with the present invention.

FIG. 2B is a plan view of the face end of the embodiment of FIG. 2A.

FIG. 2C is a cross-sectional view of the embodiment of FIG. 2A taken along line B-B of FIG. 2B.

FIG. 2D is an exploded view of the embodiment of FIG. 2A.

FIG. 2E is a cross-sectional view of the front end of the embodiment of FIG. 2A.

FIG. 4B is a cross-sectional view of the front end of the connector of FIG. 4A.

FIG. 4C is an enlarged cross-sectional view of the indicated area from FIG. 4B.

FIG. 5A is a cross-sectional view of an embodiment of a fiber and an optical block in accordance with the present invention.

FIG. 11 is a cross-sectional view of an embodiment of optical components in accordance with the present invention.

FIG. 12 is a cross-sectional view of a second embodiment of optical components in accordance with the present invention.

FIGS. 21A-H are schematics of embodiments of different key configurations in accordance with the present invention.

FIGS. 26-28 are cross-sectional views of twelfth through fourteenth embodiments of connectors in accordance with the present invention.

FIG. 30 is a perspective view of a sixteenth embodiment of a connector in accordance with the present invention.

DESCRIPTION OF THE PREFERRED EMBODIMENTS

Figure 3A:
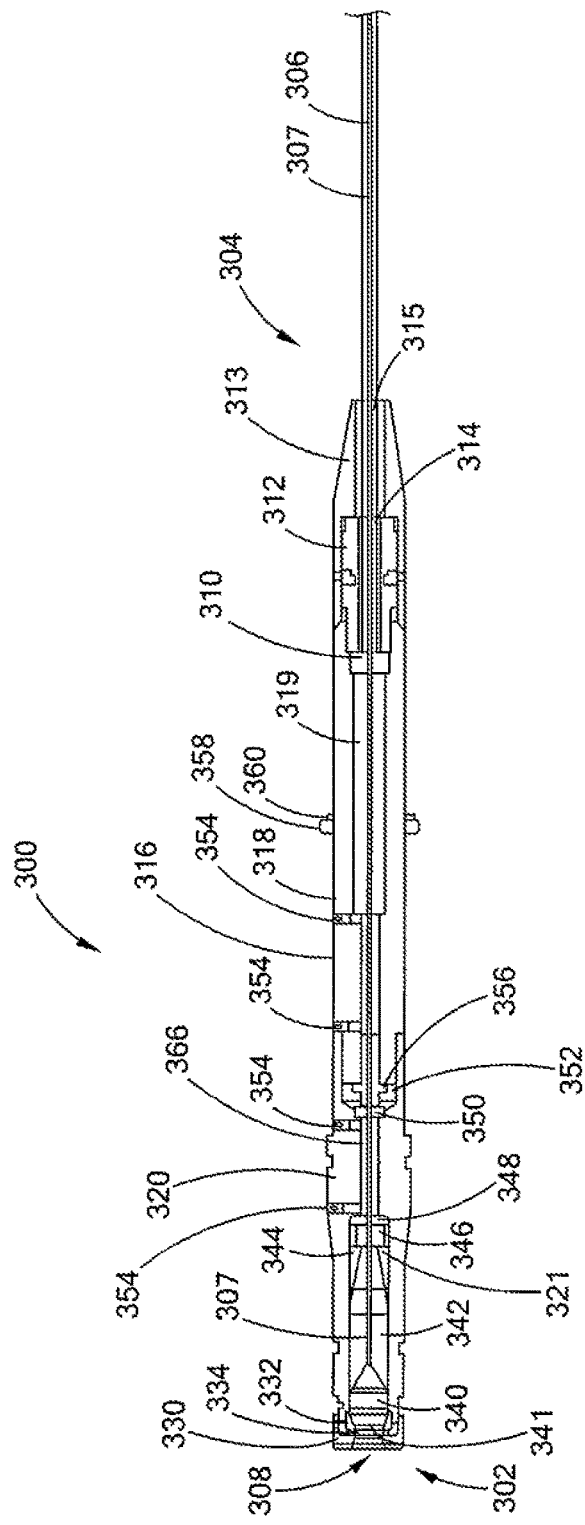
FIG. 3A is a cross-sectional view of a third embodiment of a connector in accordance with the present invention.

In general, the present inventions relate to high power optical connectors. These optical connectors may, for example, be utilized with high power laser systems, high power optical fibers, high power optics assemblies, and high power laser tools. In particular, and by way of example, the present inventions relate to high power optical connectors for use with laser systems for transmitting high power laser energy over great distances, and preferably, for doing so in harsh environments, while minimizing, overcoming or managing losses, back reflections, and other adverse optical, physical and environmental factors.

The present inventions further provide in some embodiments and applications the ability to have high power laser tools, which can be quickly disconnected, connected, and reconnected to a high power laser source, such as a fiber-coupled high power laser, in a "plug-n-play" type fashion, and to be able to do so under harsh environmental and operational conditions. Such high power laser tools, could for example, be used with high power laser systems for performing high power laser activities, such as, for example: ROV (remote operated vehicles) operations; laser-pig pipeline operations; subsea exploration; subsea activities; nuclear plant related activities; mining and the recovery of natural resources; drilling, workover, and completion activities; flow control activities; flow assurance; cleaning; milling; perforating; monitoring; analyzing; cutting; welding; MWD (measuring while drilling); LWD (Logging while drilling); MWD/LWD; exploration and production of oil, natural gas and geothermal energy; paint removal; contaminate removal; resurfacing; assembling components; and other applications where the ability to provide high power laser energy to distant, harsh environments, remote or difficult to access locations may be beneficial, useful or otherwise desirable. Examples of high power laser systems, high power laser tools, high power laser optics assemblies, high power laser activities, and in particular, remote tools, systems and activities are set forth in the above referenced US Published Patent Applications and US patent applications and disclosed and taught in the following US patent applications and US Patent Application Publications: Publication No. 2010/0044106; Publication No. 2010/0044104; Publication No. 2010/0044103; Ser. No. 61/446,312; Ser. No. 61/446,407; Ser. No. 61/439,970; Ser. No. 61/446,412; Ser. No. 61/446,041; Ser. No. 61/446,042; Ser. No. 61/446,040; Ser. No. 61/431,830; Ser. No. 61/378,910; Ser. No. 61/431,827 and Ser. No. 61/374,594, the entire disclosures of each of which are incorporated herein by reference.

In general, embodiments of the present high power laser connectors can address and manage potential environmental and operational conditions, such as one or more of shock, vibration, thermal, cleanliness, laser beam delivery parameters (e.g., laser power, beam shape, power per beam area, etc.), as well as, other potential conditions, and combinations and variations of these. Further, these factors may also be addressed and managed by embodiments of the present high power optical connectors in the area of rotational transition zones of an apparatus or tool. A rotational transition zone is any area, section, or part of a tool, where rotating components merge with, are jointed to, overlap with, or are otherwise mechanically associated with non-rotating components, components rotating in a different direction, components rotating at a different speed, and combinations and variations of the these. Embodiments of the present high power optical connectors may also, for example, be used in conjunction with high power laser optics assemblies, such as those disclosed and taught in the following US patent applications and US Patent Application Publications: Publication No. 2010/0044105; and Ser. No. 61/446,040, the entire disclosures of each of which are incorporated herein by reference.

Adverse optical and environmental conditions typically may occur in situations where the operational beam path, e.g., the total optical distance and path of the laser beam from the laser source to the intended work piece, site, location, or material, is great, or greatest. Thus, in these situations, typically the high power optical fiber is deployed over great distances for providing high power laser energy to a remote location to perform a high power laser activity at that remote location. In particular, in situations, where the distal end of these fibers are in remote, difficult to access locations, it may be difficult, costly, burdensome, if not impossible, to operationally optically connect the fiber distal end to a tool, another fiber, an optical component, or other assembly. Embodiments of the present high power optical connectors can overcome these difficulties and problems and provide for such optical connections. Further, embodiments of the present high power optical connectors provide for the ability to operationally optically make such connections, e.g., make and maintain optical association and beam quality under the high laser powers, environmental, and operational conditions of the connector's intended use. It is noted that such adverse conditions may also be present on shorter, and short, operational beam paths.

In general, as used herein, the term "proximal end" of a component, such as an optical fiber, will refer to the end that is closest to the high power laser source when the component is in optical communication with the laser source, i.e., the end that is receiving the laser beam. In general, as used herein, the term "distal end" of component, such as an optical fiber, will refer to the end that is optically furthest away from the laser source when the component is in optical communication with the laser source.

In general, and by way of illustration, an embodiment of a passively cooled high power optical connector may have a housing that forms a cavity. The connector has a face end and a tail end. The tail end is adapted to receive a high power optical cable and fiber. The face end is adapted to launch (e.g., propagate) or receive a high power laser beam. Thus, the tail end may be the proximal or distal end of the connector depending upon whether the face end is receiving the laser beam (in which case the tail end would be the distal end) or if the face end is launching the laser beam (in which case the tail end would be the proximal end). Although both types of connectors are contemplated, it is preferred that the face end be the distal end and that the tail end be the proximal end. Further, although connectors having a single tail end and a single face end are preferred, connectors having multiple tail ends, a single tail end and multiple fibers, multiple face ends, face ends having multiple separate beam launch areas and combinations and variations of these are contemplated.

The housing, in general, may be made from rugged and durable materials, such as for example, aluminum, steel, composite materials (such as carbon fibers), fused silica, sapphire, titanium, copper, ceramic, nickel alloys, carbide, polycrystalline components, and linvar. The exterior of the housing, the connector, the face end, and combinations of these, may be specifically shaped, such as for example by having specifically shaped surfaces, e.g., conical, frusto conical, pyramidal, having keying, slots, lands, or other structures, to assure that the connector is properly positioned, e.g., aligned both physically and optically, within a receptacle, such as a receptacle on a tool or an optics assembly. In addition to alignment features, the exterior of the connector may also serve to prevent the connector from being used in a particular manner. Thus, for example, if a connector were capable of handling up to 50 kW of delivered power, and a particular tool was only capable of handling up to 20 kW, the tool and connector could be configured, such that the 50 kW rated connector could not be inserted into the 20 kW rated tool. Turning to FIGS. 21A-H there are provide illustrative embodiments of key configurations. In each of these figures there is provided the face end of a connector 2102, having a housing having a face end surface 2165. The face also has a laser beam transmission area 2108, which could be the face of an optical block, an opening, a window, or other suitable structure or device, from which the high power laser beam can be launched, received, or both. There are provided examples of keying means 2130*a-h*, 2131*a-d*, and 2132*a-d*, as well as the position of those keying means relative to each other. Many different types, variations and positions of such keying means may be employed.

The housing, in general, may be contained within other components of the connector, or another structure or component of an assembly such as a laser tool or laser system. The housing may form part of, or the entire outer surface of, the connector. The housing may be made from a single component or piece, several components or pieces, and these components or pieces may be configured such that they can be removably attached, e.g., threaded connections, pressure tabs, pins, etc., fixedly attached e.g., set screws, etc., fused together to form a single component, e.g., welding, adhesives, etc. and combinations and variations thereof. Additionally, the housing may be integral to, form a part of, or contain, some or all of the optical, heat management, vibration and shock management, components of the connector. Further the housing may serve as the heat management component, or a portion or part of the heat management components, for the connector.

The cavity within the housing of the connector, in general, may contain the optical fiber and at least a portion of the beam launching and receiving components. The housing has sidewalls, having a thickness. In a passively cooled connector the sidewalls of the housing, and the exterior of the connector, may be, and preferably are essentially free from, and more preferably free from, open passages, e.g., they are essentially free from: i) any passages leading from the cavity to the exterior of the housing or connector; and, ii) any openings in the housing or connector connecting a passage in the sidewall, or the cavity, to the exterior of the housing. As such, the sidewalls do not contain any internal passages or openings for the flow of an active cooling media, and the cavity is not in fluid communication with any source of cooling fluid or media, and is physically isolated from any source of active cooling media. Thus, the housing, and the connector, are not actively cooled, or configured to provide for such cooling.

In high power laser connectors and systems, and in particular, as laser powers start to become greater than about 5 kW, 10 kW, 15 kW, 25 kW and greater, back reflections that may be created when the laser beam is launched (e.g., propagated) from a surface, or surfaces within the connector or the receptacle for the connector, such as the face of an optical fiber, a mirror, a quartz block, or an optic. Back reflections may also be created by the laser beam striking the work surface and reflecting from that surface, as well as, from other sources along the operational beam path. Back reflections, as well as, other intended and unintended paths of high power laser light, can cause heating, temperature change of the components and resultant thermal issues. These thermal issues can be significant, detrimental to optical and mechanical performance, and in many cases can result in the complete failure of the connector, the receptacle, the tool, the optics assembly, the laser, the laser system and combinations and variations thereof.

Examples of two types of thermal issues are thermal lensing and dimensional change. These may be caused by back reflections, forward propagating laser beams, environmental and operational conditions, as well as combinations and variations thereof. In general, thermal lensing, relates to changes in the optical properties, e.g., the prescription or the index of refraction, of the optical components. Thermal lensing issues can change the focal point and other properties of the optics, and thus, can change the properties of the laser beam. Another type of thermal issue relates to dimensional changes in the components that occur with temperature changes, e.g., issues that relate to the coefficient of thermal expansion ("CTE") for the materials used in the connector, in any receptacle for the connector, any target optical surface of the connector as well as other components that are mechanically, optically or opto-mechanically-optically associated. Depending, upon the particular configuration of the connector and receptacle, the materials of construction for the components, and the temperature ranges of operation for the connector and receptacle, and other factors, these two thermal issues may be interrelated and both present to lesser or greater extents.

Without active cooling embodiments of the connectors of the present invention may be exposed to, or be operated over, substantially greater temperature ranges than are typical with actively cooled connectors, and over which an actively cooled connector is operable. Thus, embodiments of the present connectors may be capable of maintaining optical operability over high laser powers, including powers at or greater than 15 kW, over temperature ranges from about 50° C., 100° C., up to as much as 300° C. These ranges cover a wide range of median operating temperatures for the connector and its components. Thus, median connector operating temperatures of about −20° C., and lower, to as great as 300° C. and higher are envisioned. Further, passively cooled connectors having these operating temperature ranges and median connector operating ranges may be utilized in a wide range of environmental temperatures that the connector may be exposed to.

There is provided herein several novel and unique configurations and embodiments of connectors, materials, and heat and high power laser light management. These approaches, in general, provide for the management of the high power laser beam, forward propagating light, scattered light, back reflections, environmental issues, operational issues, and the related thermal issues, with passive cooling and thereby, reduce or eliminate the need for any active cooling. These approaches include, for example, and in isolation and in combination: the use of mode strippers, optics having predetermined and reciprocal thermal properties; optics having predetermined and matched thermal properties; materials having predetermined and matched CTEs; materials having predetermined and reciprocal CTEs; heat sinks; springs and biasing assemblies; selective fixation points; coatings; shapes and configurations of components; the nature and type of high power fiber within the connector; the removal of and use of coatings on the fiber and on other materials; and, the use of capillaries surrounding the fiber. These approaches may be used alone or in combination, and further may preferably be used with the approaches to manage cleanliness and vibrational issues.

Further, and by way of example, active cooling such as water cooling may be used in conjunction with a passively cooled connector in particular situations. For example, a high power passively cooled connector may be rated for operating across a temperature range of 100° C., at up to 30 kW of power, at a median operating temperature of 75° C., and under environmental conditions of 100° C. If such a connector were to be used in a deep high temperature geothermal well, e.g., about 300° C., additional active cooling, such as an external water cooled jacket around the housing, may be used with this passively cooled connector to address the environmental temperatures without departing from the spirit of the present inventions.

In harsh and remote locations, such as deep within a borehole, as well as in more easily accessible locations, such as on the factory floor, and in other applications, dirt, dust, debris and other contaminants, may provide a source of failure, optical performance degradation, or both, for high power connectors. Thus, there is provided herein several novel and unique configurations and embodiments of connectors, materials, and heat and high power laser light management techniques that address the issue of dirt and debris management, e.g., cleanliness, in a high power connector. These approaches, in general, provide for the management of the high power laser beam and the related cleanliness issues. These approaches include, for example, the use of greater optically active surface areas where the laser beam is launched or received, and in particular greater surface areas in locations where contamination is more likely to occur, isolation means within the connector to manage and reduce contamination risks, and configuration and placement of components at, near and within the housing cavity. Additionally, self-sealing means such as spring-loaded apertures may be used to isolate the susceptible optical surface from possible contamination. These approaches may be used alone and in combination, and more preferably may be used in combination with the approaches utilized to address thermal issues and vibrational issues.

In harsh and remote locations, such as within a borehole, as well as, in more easily accessible locations such as on the factory floor, and in other applications as well, a high power optical connector may be exposed to high levels of vibration. Thus, there is provided herein several novel and unique configurations and embodiments of connectors, materials, and heat and high power laser light management that address and manage high levels of mechanical-shock and vibration in a high power connector. These approaches, in general, provide for the management of the high power laser beam delivery under high g-force ("g's") loads, including shocks, vibration and both, for example forces from about 20 g's or greater, about 50 g's or greater, about 100 g's or greater, about 200 g's or greater, about 250 g's or greater, and about 500 g's or greater. These approaches include, for example, the use of fixation means and the selective positioning of these means for the optical cable, preloading of components, optical fiber and other optical components, and the radiusing, shape, and manner of contact or association of components, and in particular components making up or associated with the laser beam path. These approaches may be used alone and in combination, and more preferably may be used in combination with the approaches utilized to address thermal issues and cleanliness issues.

Turning to FIGS. 1A to 1F there is provided an embodiment of a passively cooled high power connector 100. In FIG. 1A there is provided a perspective view of the connector 100. In FIG. 1B there is provided a view of the face end 102 of the connector; and in FIG. 1C there is provided a schematic cross-sectional view of the components of the connector taken along line C-C of FIG. 1B. In general, the connector 100 has a face end 102 and a tail end 104. The face end 102 has an opening 108 through which a laser beam is launched, along a laser beam path. The tail end 104 has an opening 114. The tail end opening 114 is formed by an attachment member 112. It is also contemplated that an additional window that may be coplanar with face end 102 may be utilized, or the window 130 may be positioned coplanar with face end 102, or window 130, or a second window, may extend beyond face end 102.

A high power optical cable 106, having a high power optical fiber 107, is contained within the attachment member 112. The attachment member 112, may be a threaded pressure-fitting type device, such as for example a SWAGELOK, or other type of locking member, and attaches to and seals against the outer surface of the optical cable 106.

In the embodiment of FIGS. 1A to F, the optical cable is an optical fiber in a stainless steel metal tube, the tube having an outside diameter of about ⅛" ("inch"). The optical fiber has a core diameter of about 1000 urn, (microns), a cladding thickness of about 50 urn, (the thickness of a layer or coating is measured from the internal diameter or inner surface of the layer or coating to the outer diameter or outer surface of the layer or coating) and an acrylate coating thickness of about 100 urn. The optical fiber is within a TEFLON sleeve, that is within the stainless steel tube. The optical cable may be an optical fiber without any added outer protective layers. It may be, for example, any of the configurations disclosed and taught in US Patent Publication Nos. 2010/0044106, 2010/0215326, and 2012/0020631, the entire disclosures of each of which are incorporated by reference herein.

Although a single optical cable is shown in the embodiment of FIGS. 1A to F, and in other embodiments herein, multiple optical cables may be utilized, or a single optical cable with multiple optical fibers may be utilized. Thus, for example, an optical-fiber squid may be used, a beam combiner may be used, or other assemblies to combine multiple fibers into a single fiber may be used, as part of, or in conjunction with the connectors of the present invention. The multiple fibers may further be combined at or near an optical block within the connector or outside of the connector. Thus, for example, they may be combined at some other location in the system, tool, or device that the connector is intended to be associated with.

The high power passively cooled connector 100 has a body 116, having a housing, which in this embodiment has two housing sections 118, 120. Housing section 118 forms cavity 119 and housing section 120 forms cavity 121. Housing section 118 and housing section 120 are mechanically attached, by way of for example, a threaded connection. The housing sections may be made from a single component or piece, several components or pieces, and these components or pieces may be configured such that they can be removably attached, e.g., threaded connections, pressure tabs, pins, etc., fixedly attached e.g., set screws, etc., fused together to form a single component, e.g., welding, adhesives, etc. and combinations and variations thereof.

Housing section 120, which is adjacent to and forms a portion of the face end 102, has an outer surface having a predetermined shape, which has three sub-sections, front sub-section 122, middle sub-section 124, and back sub-section 126. Front sub-section 122 has an essentially cylindrical shape. Middle sub-section 124 has an essentially frustoconical shape. Back sub-section 126 has an essentially cylindrical shape having a larger diameter than front sub-section 122.

The housing 118 has an opening 110, which forms part of the cavity 119. The opening 110 is configured to receive and hold the attachment member 112. The cable 106 extends through opening 110.

The cable 106 and the optical fiber 107 are affixed and held within the body 116. The stainless steel tube of the cable 106 extends through openings 114 and ends, having end 109, in the general area of opening 110. The end 109 of the stainless steel tube, preferably may be located anywhere past the point of mechanical attachment and sealing by the attachment member 112 up to the adhesive dam 156. The TEFLON tube also may end at the end 109 of the stainless steel tube. The TEFLON tube, preferably may be located anywhere past the point of mechanical attachment and sealing by the attachment member 112 up to the adhesive dam 156. It being understood, that depending upon the type of attachment member, the type of optical cable, and other considerations, the end of any protective layers of the optical fiber, such as the TEFLON and stainless steel tubes in the embodiment of FIGS. 1A to 1F, may be at different locations, the same locations, or other locations within, partially within, or outside of the connector body.

In the embodiment of FIGS. 1A to 1F, the optical fiber 107 exits the end 109 of the stainless steel tubing and extends through the cavities 119, 121 of the body 116 and housings 118, 120. The optical fiber 107 extends through these cavities 119, 121 and terminates at fiber face 167. The optical fiber exiting the end 109 of the stainless steel tubing, has its core, cladding and acrylate coating. The optical fiber 107 extends through the adhesive dam 156 and into and through adhesive dam 152. At about the location of the adhesive dam 152, the acrylate coating is removed from the optical fiber leaving the core and the cladding. The optical fiber, having the core and cladding extends from the adhesive dam 152 through the cavity 121 to the fiber face 167. The adhesive dams 156, 152, have springs 158, 150 associated with them. It being understood, that depending upon the type of attachment member, the type of optical cable, and other considerations, the coating of the optical fiber, such as the acrylate coating, in this embodiment, may end at different locations, the same locations, or other locations within, partially within, or outside of the cavity or connector body.

The optical fiber 107 extends through spring 150, adhesive dam 148, cavity 121, adhesive dam 146, spring 144, spacer 142, ferrule 140, and into laser launch ring 132. FIG. 1D provides an exploded schematic view of the components of the connector, and FIGS. 1E and 1F provide enlarged schematic cross-sectional views of the launch ring area of the connector. Laser launch ring 132 has two o-rings 136, 138 that engage the outer surface of the laser launch ring 132 and the inner surface of the cavity 121. The o-rings may form seals preventing debris from entering into the cavity 121 and may also dampen vibration and shocks.

Spacers 160, 162 are located within cavity 119 and around optical fiber 107. The spacers 160, 162 form a cavity through which the optical fiber 107 is located. When assembled spacers 160, 162 abut against spring 158, compressing spring 158, and thus, place a preload on dam 156.

One manner, by way of example, in which the components may be assembled, is to slide the optical fiber into the cavity through the various components, so that the end of the fiber extends out beyond the face end 102 of the connector (the window 130 is not yet in place at this point in the assembly process). The end 109 of the stainless steel tube provides a convenient stop member for controlling how far beyond the end of the face 102 the fiber can be extended during assembly. The end 109 may abut against a ledge or a dam in cavity 119. At which point in the assembly process, the general amount of fiber length needed is determined, and the fiber extending from the face is cleaved off. (If further processing of the face of the fiber is to occur, such as polishing, coating, or forming an optical surface, such as a lens, it may be performed at this point in the assembly process.) The fiber is then pulled back into the cavity and the attachment member 112 is tightened or otherwise locked against the optical cable 106 fixing its general position with respect to the connector 100, and in, particular the receptacle aligning surface 124, as well as, potentially the end face 102.

An annular gasket 134 is located adjacent the face 165 of the laser launch ring 132. The gasket 134 is located between a window 130 and the laser launch ring 132. A locking ring 128 engages a ledge 174 and a portion of the surface of the window 130. The locking ring 128 has openings 129 for receiving a tool for placing and tightening (threading) the locking ring in place within the cavity 121. In this manner the locking ring 128 forms a portion of the face end 102 and the opening in the locking ring 128 forms the opening 108 of face end 102. Other forms of attaching the locking ring may be employed.

When the locking ring 128 is tightened and in engagement with ledge 174 and window 130 the other components, i.e., laser launch ring 132, ferrule 140, and spacer 142 are forced against spring 144, creating a preload on those components, as well as, providing a force against dam 146 holding it in place against a ledge, formed by housing section 120, in the cavity 121.

Epoxy, 170, 172 is used to hold the fiber 107 in place with respect to the body 116 and the face end 102 of the connector 100. The epoxy is added to the cavities 121, 119 through ports. Preferably, in this embodiment, the portions of cavities 121, 119 between dams 146, 148 and dams 152, 156 are completely filled with epoxy providing for the secure attachment of the fiber to the housing sections 118, 120 of the body 116 of the connector 100. Once the epoxy has been added set screws 154 are inserted into the ports sealing them. In this manner the ports do not form an opening connecting the cavity or the inner portions of the housing to the outside of the housing. The ports, being so plugged, are incapable of transmitting or conveying a cooling fluid. The ports may also be plugged with epoxy or by other means.

Although not specifically shown in the figures, break detection and back reflection monitoring devices and systems may be utilized with, or integrated into, the connectors and the high power optical cables. Examples of such break detection monitoring devices, systems and methods are taught and disclosed in U.S. patent application Ser. No. 61/446,407; and Ser. No. 13/403,723, and US Patent Application Publication No. 2010/0044106, the entire disclosure of each of which are incorporated herein by reference.

The spacer 142 may be made from for example a metal, a ceramic, a composite material, a glass, fused silica, sapphire, a polycrystalline structure, a thermoplastic, or other suitable types of material. In the embodiment of FIGS. 1A to 1F the inner wall of the spacer is removed from the outer surface of the fiber, i.e., the ID ("inner diameter") of the spacer is greater than the OD ("outer diameter") of the fiber, and thus, creates a cavity between the spacer and the fiber. This cavity may be filled with a liquid having a predetermined index of refraction, e.g., equal to or greater than the index of refraction of the cladding, to enable the spacer to function as a mode stripper, to remove back reflections that are traveling up the cladding, e.g., moving from the distal end of the fiber to the proximal end of the fiber, before those back reflections reach the location where the acrylate or other coating is present. Further, the ID of the spacer may be substantially the same as the OD of the fiber, e.g., so that the spacer or fiber may be inserted but is also in physical contact, placing the spacer in physical and optical contact with the fiber, and thus, depending upon the materials used for the spacer, it may also function as a mode stripper. The OD of the spacer is preferably substantially the same as the ID of the cavity 121 in the location of the spacer, e.g., so that the spacer may be inserted but is also in physical contact.

The ferrule 140 may be made from, for example, a metal, a ceramic, a composite material, a glass, fused silica, sapphire, a polycrystalline structure, a thermoplastic, or other suitable types of material. In the embodiment of FIGS. 1A to 1F the inner wall of the ferrule is adjacent the outer surface of the fiber. The ferrule functions as a mode stripper either by removing some, and preferably the majority of back reflections propagating along the cladding from the distal end to the proximal end, by being in optical association with the fiber and thus transmitting removed back reflections away from the fiber toward the housing, or in the case of a non-transmissive material absorbing the back reflection energy that escapes from the cladding and conveying the heat thus generated to the housing.

The thermal properties, e.g., CTE, of the ferrule 140, and the spacer 142, preferably are closely matched to that of the fiber, and that of the housing. However, in this embodiment, the connector design is capable of using materials having a considerably different CTE from the fiber. This is accomplished by having the fiber fixed at the epoxy section 172, but only being slideably engaged with the laser launch ring 132, the ferrule 140, and the spacer 142. In this manner the different CTE of the structures associated with the fiber, from the fibers point of fixation in the housing to the fiber face will not put stress upon or break the fiber as those structures expand and contract at different rates from the fiber over the range of operating temperatures of the connector.

The design of the connectors, and the selection of and potential matching of CTEs for components of the connectors provide for the ability to have the connectors desensitized to localized heating. Preferably, in the embodiment of FIGS. 1A to 1F, the CTE of the ferrule and the housing should be closely matched to further mitigate misalignment issues over large temperate ranges. Thus, and for example, in managing back reflections, which could cause localized heating of the connector components, the design of the components manage this localized heating in a manner that does not materially change the alignment and relative location where the laser beam is launched from the connector (or received into the connector) with respect to the surface or portion of the housing that is used to mechanically position the connector in a receptacle, or tool, or other device.

The use of a biasing means, such as the springs or the preload during assembly provides the ability to manage greater g-loads, and g-loads across greater temperature ranges. The biasing assures that the components remain in the desired or intended contact with each other as the connector expands and contracts with temperature changes. In this manner the biasing prevents the components from being loosened or compressed during thermal changes. Additionally, and in particular in the embodiment of FIG. 1, the absence of heavy glass or other optical components permits the connector to handle larger vibrational forces.

Further, it is preferable that at least one of the locations where the fiber is fixed to housing, e.g., the epoxy, is located near to, adjacent or coplanar with the engagement surface of the housing that is used for aligning the connector in a receptacle. Still more preferable, the point or area of fiber fixation that is closest to the face end of the connector should be the fixation point, or area, that is closest to the engagement surface.

Turning now to the face end 102 of the connector 100, shown is FIGS. 1E and 1F, there is provided a novel configuration for the launching of the laser beam along a beam path 190 from the fiber face 167. The fiber 107, which in this embodiment includes a core and a cladding, extends into the laser launch ring 132. The fiber is not in physical contact with the laser launch ring 132, although in other embodiments it may be. The fiber face 167 in this embodiment may be a flat surface, it may be formed by cleaving the fiber, it may be polished, it is preferably perpendicular to the sides and longitudinal axis of the fiber, it may have a predetermined shape, such as a sphere, a curve, or function as a lens or other optic that shapes or affects the properties of the laser beam.

The laser launch ring 132 has an inner surface; in this embodiment the inner surface has at least two sections, a cylindrical surface 168, and an annular surface 166 (in this embodiment there is also another annular surface in the area of the sides of the fiber, which surface is not numbered). In this embodiment, the inner surface of the laser launch ring plays a role, from small to significant, in the management of back reflections, i.e., laser light traveling back through opening 164 from the window 130 toward the ferrule 140. To manage these back reflections the inner surface may be coated with material to absorb the back reflected light, shaped and coated with material to reflect the back reflected light, and preferably reflect the back reflected light back in a direction toward the window 130, and have surfaces that will defuse the back reflected light, e.g., a diffuser, which surfaces may transmit the diffused light, reflect the diffused light, and combinations and variations of these.

Gasket 134 is annular in shape and should not extend into the laser beam path 190. Gasket 134 is positioned between annular face 165 of the laser launch ring 132 and the proximal surface 131 of window 130. Preferably, both surfaces 131 and 133 have anti-reflective coatings on them. As can been seen in detail in FIG. 1F, the locking ring 128 engages the distal surface 133 of the window 130 around an outer annular area of that surface, while simultaneously engaging ledge 174, holding the outer surface 133 in a co-planer position with ledge 174.

The window may be made from fused silica, quartz, sapphire, suprasil, infrasil, calcium fluoride and other glasses, zirconium fluoride, diamond and other highly transmissive materials for the selected wavelength.

In operation the beam is launched from fiber face 167 into opening 164, which preferably is filled with air. Traveling along the beam path, the beam expands from fiber face 167 (in the case of a flat surface for the fiber face), travels through space 164 and enters the window 130 through surface 131. The beam then exits window 130 through surface 133 and is launched from the connector 100 through opening 108 in face end 102.

Thus, connectors of the type as shown in the embodiment of FIGS. 1A to 1F do not require, and are configured without the ability to have, active cooling, e.g., they do not have the capability of flowing a cooling liquid through the interior of the housing, the cavities, or in direct, i.e., in fluid, contact with the fiber or optical components. Further, the location of the epoxy, the housing's outer shape, and other features described above enable the connector to operate over a wide range of vibrations, temperatures and laser powers, including by way of example 0-10 kW, 0-500 g's, −40-400° F., while maintaining its beam quality, beam parameters, and its optical distance from and position with respect to a receptacle and the receptacle associated optics, tools, etc.

In general, absorptive coatings that may be used on surfaces for the laser launch ring, other components and other surfaces within or associated with the connectors of the present inventions are, for example black chrome, dendritic surfaces, absorptive anodization, and carbon coating, as well as other materials and constructs.

In general, reflective coatings that may be used on surfaces for the laser launch ring, other components, and other surfaces within or associated with the connectors of the present inventions are, for example, gold, silver, chromium, aluminum, copper, laser gold, MgF2, and HR coatings, as well as other materials and constructs.

In general, diffusing surfaces, or diffusers that may be used as surfaces for the laser launch ring, other components and other surfaces within or associated with the connectors of the present inventions may be, for example, fused silica, sapphire, ceramic, metal and a bead blasted surface finished with gold plating, as well as other materials and constructs.

In general, attachment members or combination of such members, for sealing to the cable at or near the tail end, attaching to cable at or near the tail end and both may be, for example, swagelok, flared fitting, threaded fitting, compressive fitting and crimped fitting, as well as other materials and constructs.

In general, the shape of the connectors, or the outer shape of the housings, may vary depending upon the particular application, use, receptacle, tool and other design and use factors. The housing, the front, the back, or both, may have more or less differently shaped sub-sections. The outer shape of the front housing may take on a configuration resembling the shape of commercially available connectors, and thus, may be able to plug directly into receptacles, systems, tools, etc., designed for use with such commercially available connectors. Such commercial connector types would include, by way of example, QBH, QD, Q5, QCS, SMA, LLK and SMA0.5.

In general, the optical cable used with the connectors may be an optical fiber with, or without any added outer protective layers. It may be for example any of the configurations disclosed and taught in U.S. patent applications and US Patent Application Publications: Publication No. 2010/0044106; Publication No. 2010/0215326, and Publication No. 2012/0020631; and Ser. No. 12/840,978. Thus, for example it may be a single clad or multiple clad fiber. It may have a cross section that is square, rectangular or a shape other than circular. Multiple fibers may be used and enter into the tail end of the connector. The connector may have multiple face ends through which individual beams are launch in the same, parallel, diverging, converging and combinations of these directions. In may have a single face end that launches multiple beams that may be parallel diverging, converging and combinations of these directions. It may further have varying combinations and configurations of multiple and single fibers and beam launches.

In general the epoxy may be any suitable adhesive and would include for example, thermal cure, conductive epoxy, optically transmissive epoxy, 2-part epoxy, and room temperature cure epoxy, specifically NAOH, Epotek, and Optocast adhesives. A particularly beneficial, from the standpoint of ease of assembly, epoxy is a UV curable epoxy. With a UV curable epoxy ultraviolet light can be propagated down the fiber, at a wavelength that will readily escape the fibers cladding and which will cure the epoxy, which may avoid the need to use heat curable epoxies.

The shape of the connectors, for example the cylindrical and frustoconical section of the embodiment of FIGS. 1A to 1F and FIGS. 2A to 2E, may be predetermined to cooperate with a receptacle to provide for easy and consistent laser beam alignment and positioning, when the connector is placed in optical communication with the receptacle and whatever tools, assemblies, etc. may be associated with that receptacle. Further, a surface, or surfaces, of the connector may serve as contact points, or alignment and positioning points for the connector with respect to a receptacle. The face end of the connector need not, and is preferably not used as an alignment point, and thus, in this manner thermal changes that may affect the location or position of that end face will not affect the alignment and position of the connector.

Turning to FIGS. 2A to 2E there is provided an embodiment of a passively cooled high power connector 200. In FIG. 2A there is provided a perspective view of the connector 200. In FIG. 2B there is provided a view of the face end 202 of the connector; and in FIG. 2C there is provided a schematic cross-sectional view of the components of the connector taken along line B-B of FIG. 2B. FIG. 2D provides an exploded schematic view of the components of the connector, and FIG. 2E provides an enlarged cross-sectional view of the face end area of the connector. In general, in this embodiment, the connector 200 has a face end 202 and a tail end 204. The face end 202 has an opening 208 through which a laser beam is launched, along a laser beam path. The tail end 204 has an opening 214. The tail end opening 214 is formed by an inner attachment member 212 and an outer cover 213. These components 212, 213 may be attachment members, an attachment member and a cover, locking members, sealing members and combinations of these. More or fewer members and covers may also be utilized.

The use of a component, such as the cover 213, in one of the illustrated embodiments of the present connectors, but not in others, as well as, other components that may be used in only one, a few, less then all, or all of the illustrated embodiments, is not and should not be considered as a limitation that such components may only be used with those illustrated embodiments, or must necessarily be used with those illustrated embodiments. Rather, these components, consistent with the teachings herein, may be used with other embodiments, may be used with embodiments not expressly illustrated herein, and may be used with other connector configurations, without departing from the spirit of the inventions. The components, designs, teachings, configurations and arrangements for one embodiment of a connector may be utilized with, or for, the components, designs, teachings, configurations and arrangements of other embodiments of connectors.

A high power optical cable 206, having a high power optical fiber 207, is contained within the attachment member 212. The attachment member 212, may be a threaded pressure-fitting type device, such as for example a SWA-GELOK, or other type of locking member, and attaches to and seals against the outer surface of the optical cable 206.

In the embodiment of FIGS. 2A to 2E, the optical cable is an optical fiber having a core diameter of about 600 urn, (microns), a cladding thickness of about 30 urn, and an acrylate coating thickness of about 75 urn. The optical cable may be an optical fiber with any added outer protective layers. It may be, for example, any of the configurations disclosed and taught in US Patent Publication Nos. 2010/0044106, 2010/0215326, and 2012/0020631, the entire disclosures of each of which are incorporated by reference herein. Although a single optical cable is shown in the embodiment of FIGS. 2A to 2E, multiple optical cables may be utilized, or a single optical cable with multiple optical fibers may be utilized.

The high power passively cooled connector 200 has a body 216, having a housing, which in this embodiment has two housing sections 218, 220. Housing section 218 forms cavity 219 and housing section 220 forms cavity 221. Housing section 218 and housing section 220 are mechanically attached, by way of for example, a threaded connection. The housing sections may be made from a single component or piece, several components or pieces, and these components or pieces may be configured such that they can be removably attached, e.g., threaded connections, pressure tabs, pins, etc., fixedly attached e.g., set screws, etc., fused together to form a single component, e.g., welding, adhesives, etc. and combinations thereof.

Housing section 220, which is adjacent to and forms a portion of the face end 202, has an outer surface having a predetermined shape, which has three sub-sections, front sub-section 222, middle sub-section 224, and back sub-section 226. Front sub-section 222 has an essentially cylindrical shape and has an end face 223, which forms a part of end face 202. Middle sub-section 224 has an essentially frustoconical shape. Back sub-section 226 has an essentially cylindrical shape having a larger diameter than front sub-section 222. Middle sub-section 224 is specifically configured to be the contacting, positioning and aligning surface with a receptacle (not shown in this figure).

As discussed above, the shape of the connector, or the outer shape of the housings, may vary depending upon the particular application, use, receptacle, tool and other design and use factors.

The housing 218 has an opening 210, which forms part of the cavity 219. The opening 210 is configured to receive and hold the member 212. The cable 206 extends through opening 210.

The cable 206 and the optical fiber 207 are affixed and held within the body 216. Although not utilized in this embodiment, a protective member, such as a TEFLON tube, or other means to protect the fiber, may extend into and beyond the opening 215, and thus provide protection to the outer surface of the fiber from the edge of the stainless steel tube. The protective member, preferably may be located anywhere past the point of mechanical attachment and sealing by the members 212, 213 up to the adhesive dam 256. It being understood, that depending upon the type of attachment member, the type of optical cable, and other considerations, protective layers of the optical fiber, such as the TEFLON and stainless steel tubes in the embodiment of FIGS. 1A to 1F may be used and may end at different locations, the same locations, or other locations within, partially within, or outside of the connector body. Further, as disclosed and taught in US Patent Publication Nos. 2010/0044106, 2010/0215326, and 2012/0020631, the entire disclosures of each of which are incorporated by reference herein, other protective layers or material than TEFLON, or in addition to TEFLON, may be employed.

In the embodiment of FIGS. 2A to 2E, the optical fiber 207 extends through the cavities 219, 221 of the body 216 and housings 218, 220. The optical fiber 207 extends through these cavities 219, 221 and is formed into a quartz block 240 that permits a reduction, or stepping down, in the fluence of the laser beam from the core of the fiber to the face 241 of the block 240. The fiber 207 is in optical communication with the end of the quartz block 240, preferably by way of a fusion splice joining the fiber to quartz block 240; other means to optically and mechanically connect or associate the fiber to the block may be employed. To accommodate high g-loads, preferably, a strong mechanical connection, and support for that connection, as discussed herein should be employed. The optical fiber exiting the opening 210 and going into cavity 219 has its core, cladding and acrylate coating. The optical fiber 207 extends through the adhesive dam 256, spring 252 and into and through adhesive dam 250. At about the location of the epoxy 266, the acrylate coating is removed from the optical fiber leaving the core and the cladding. The optical fiber, having the core and cladding extends from the epoxy 266 through the remainder of cavity 221 to the end of the quartz block 240. (In this embodiment the end of the quartz block 240 that is attached to the fiber 207 would be the proximal end; however, if this connector were used, for example, as part of a coupler, then this end of the quartz block could be the distal end of the quartz block and the face 214 could be the proximal end of the quartz block.) The adhesive dams 256, 250, and 248 have springs 246 and 252 associated with them. It being understood, that depending upon the type of attachment member, the type of optical cable, and other considerations, the coating of the optical fiber, such as the acrylate coating, in the embodiment of FIGS. 2A to 2E, may end at different locations, the same locations, or other locations within, partially within, or outside of the cavity or connector body.

The optical fiber 207 extends through spring 252, adhesive dam 250, cavity 221, adhesive dam 248, spring 246, spacer 244, ferrule 242, and to quartz block 240.

One manner, by way of example, in which the components may be assembled, is to fuse an end of the optical fiber 207 to the end of the quartz block 240. The other end of the optical fiber 207 is then slid into the cavity through the various components, so that the end of the fiber extends out beyond the opening 215. The fiber would also be slid through the exterior members, positioning ring 258, and locking ring 260, with these components at some point being attached to the exterior of the housing. (By saying sliding the fiber through the components, it should be recognized that the components may also be slid over the fiber) At which point in the assembly process, the general amount of extra fiber length to accommodate expansion and contraction the housing 218 is determined and that length of fiber is positioned in the corresponding cavity in the final product by the epoxy 266 and members 212, 213.

Attachment member 212 and cover 213, however, may simply function as pass through members, to provide for and accommodate thermal expansion issues. In this configuration, the positioning member 258, or other means (not shown in the figure) of holding and affixing the tail end 204 of the connector may be employed to prevent the fiber from being broken or damaged during operation.

A locking ring 228 engages a ledge 274 and a portion of the surface of the quartz block 240. The locking ring 228 has openings 229 for receiving a tool for placing and tightening (threading) the locking ring in place within the cavity 221. In this manner the locking ring 228, has an end face 231, which forms a portion of the face end 202 and the opening in the locking ring 228 forms the opening 208 of face end 202. Other forms of attaching the locking ring may be employed.

When the locking ring 228 is tightened and in engagement with ledge 274 and quartz block 240 the other components, i.e., ferrule 242, and spacer 244 are forced against spring 246, creating a preload on those components, as well as, providing a force against dam 248 holding it in place against a ledge in the cavity 221.

Epoxy 266 is used to hold the fiber 207 in place with respect to the body 216 and in particular the engagement section 224 of the connector 200. The epoxy is added to the cavities 221 through ports. Preferably the portions of cavities 221 between dams 248, 250 is completely filled with epoxy providing for the secure attachment of the fiber to the housings 220 and body 216 of the connector 200. In this embodiment only one cavity, 221 contains epoxy, the other cavity although capable of containing epoxy is not filled with epoxy to provide for extra fiber length as discussed above. Once the epoxy has been added setscrews 254 are inserted into all of the ports sealing them. In this manner the ports do not form an opening connecting the cavity or the inner portions of the housing to the outside of the housing. The ports, being so plugged, are incapable of transmitting or conveying a cooling fluid. The ports may also be plugged with epoxy or by other means.

Although not specifically shown in the figures, break detection and back reflection monitoring devices and systems may be utilized with, or integrated into, the connectors and the high power optical cables. Examples of such break detection and monitoring devices, systems and methods are taught and disclosed in U.S. patent application Ser. No. 61/446,407; and Ser. No. 13/403,723, and US Patent Application Publication No. 2010/0044106, the entire disclosure of each of which are incorporated herein by reference.

The spacer 244 may be made from for example a metal, a ceramic, a composite material, a glass, fused silica, sapphire, a polycrystalline structure, a thermoplastic, or other suitable types of material. In the embodiment of FIGS. 2A to 2E the inner wall of the spacer is configured to align and center the fiber 207, ferrule 242 and quartz block 240 assembly. The spacer 244 may also be configured to function as a mode stripper, by having it configured to be in optical association with the fiber.

The ferrule 242 may be made from, for example, a metal, a ceramic, a composite material, a glass, fused silica, sapphire, a polycrystalline structure, a thermoplastic, or other suitable types of material. In the embodiment of FIGS. 2A to 2E, the inner wall of the ferrule is adjacent the outer surface of the fiber. The ferrule may function as a mode stripper either by removing some, and preferably the majority of back reflections propagating along the cladding from the distal end to the proximal end, or in the case of a non-transmissive material absorbing the back reflection energy that escapes from the cladding and conveying the heat thus generated to the exterior of the housing. Thus, for example, the outer surface of the fiber may be etched to facilitate the escape of back reflections from the cladding, or the inner surface of the ferrule may be in optical contact with the outer surface of the fiber, and the index of refraction of the ferrule may be such as to cause back reflected light to escape from the cladding into the ferrule, which in turn would transmit these back reflections to be absorbed by the inner walls of the housing, to be diffused by the outer surface of the ferrule and combinations of these and other manners of managing back reflections and their related energy that is removed from the cladding in this location.

The thermal properties of the ferrule 242, and the spacer 244, preferably are closely matched to that of the fiber 207, and that of the housing 220, respectively. However, in the FIGS. 2A to 2E embodiment, the connector design is capable of using materials having a considerably different CTE from the fiber. This is accomplished by having the fiber fixed at the epoxy section 266, but only being slideably engaged with the ferrule 242, and the spacer 244. In this manner, the different CTE of the structures associated with the fiber, from the fibers point of fixation in the housing to the face 241 of the quartz block 240 will not put stress upon or break the fiber or the quartz block as those structures expand and contract at different rates from the fiber over the range of operating temperatures of the connector.

The spacer 244 may further be shaped and coated in such a manner as to redirect any back reflections that are present in the ferrule 342 back out the face of the connector.

Turning now to the face end 202 of the connector 200, there is provided a novel configuration for the launching of the laser beam along a beam path 290 from the fiber 207 through the quartz block 240 out the quartz block face 241 and thus from the connector face end 202. The fiber 207, which in this embodiment consists of a core and a cladding, extends to and is fused with the quartz block 240. The quartz block face 241 in this embodiment may be a flat surface, it may be polished, it is preferably perpendicular to the sides and longitudinal axis of the fiber, and the connector. It may also have a predetermined shape, such as a sphere, a curve, or function as a lens or other optic that shapes or affects the properties of the laser beam.

The locking ring 228 has an inner surface; in this embodiment the inner surface has two section, conical surface 268, and annular surface 269. These inner surfaces engage the surfaces of the quartz block to align, center and hold it in place. The locking ring 228 further engages ledge 274, which is located in housing section 220. To accommodate higher g-loads and reduce or eliminate a point of mechanical stress the ends of ferrule 242 are configured to provide for a space or void 262 between the ferrule and the quartz block adjacent to the inner wall of the housing 221.

As is illustrated by the beam path 290, the beam has a substantially larger surface area, e.g., bigger spot diameter, when it leaves the face 241 of the quartz block 240, than when it leaves the fiber. By increasing the spot diameter at the face of the quartz block, the fluence of the beam is reduced and the ability of the connector to handle contamination on the face where the beam is launched is enhanced.

Further, the larger surface area for the laser beam launch point makes the application of antireflective and other coatings easier to apply.

In addition to using quartz, the block 240 may be made from sapphire, Infrasil, Suprasil, diamond, calcium fluoride, zirconium fluoride, or other glass, fused silica and other highly transmissive materials for the selected wavelength.

The proximal side 280 of the quartz block may be used to play a significant role in the management of back reflections. Preferably, this surface is used to reflect back reflections entering the face 241 of the quartz block back towards that face, and thus, may among other things reduce, lessen the chance of, or prevent them from entering either the core of the fiber 207, the cladding of the fiber 207, or the connector body 216. An anti-reflective coating may be used on the surface 241 while a reflective coating may be used on the surface 280. The difference in the indices of refraction for the quartz block 240 and the ferrule 242 may also be selected to enhance the reflection of back reflection from the surface 280. Care, however, should be taken, as the opposite effect may occur, i.e., the funneling of light into the fiber, under certain conditions of configurations, e.g., spacing, sizes and angles of the components. (The funneling effect may be utilized in a connector that is intended to have its face end function as the proximal end, e.g., beam receiving end, in a coupler system.) Additionally, the shape of these surfaces, their angle may be varied to enhance this ability to handle back reflections by returning them to forward propagation. Thus, this system has the added advantage of not only preventing or reducing the risk of back reflections entering the fiber and damaging the connector or other optical components further proximal to the connector, it provides for a more efficient connector and the energy from back reflections is not lost but directed back in the direction of the beam, i.e., toward the distal face of the connector. It is further noted that this surface 280 of the quartz block, as well as, the other surfaces of the quartz block, do not require active cooling and are not in direct fluid communication with any cooling channel, passage or media. In a like manner the ferrule 242 and the spacer 244 do not require active cooling and are not in direct fluid communication with any cooling channel, passage or media.

The surface 280 could also functions as a diffuser, diffusing back reflections and propagating them into ferrule 242 where they would be absorbed and the resultant heat conveyed by the ferrule to the housing or reflected in the manner above described.

In the embodiment of FIGS. 2A to 2E the face of the quartz block is only slightly, less than about 0.1 mm, more preferably [sic] about 0.5 mm, recessed from the surface 223. The amount of recess could be greater, although that may make cleaning more difficult, as well as provide a dead space for accumulating debris. The block could also be configured such that its face 241 is coplanar with surface 223, or extends out beyond surface 223 of the end face 202 of the connector 200.

Cooling fins, or flutes 264 are positioned along the outside of the housing. These fins assist in heat management and dissipation and may or may not be present and may vary in size, shape and number.

Thus, connectors of the type as shown in the embodiment of FIGS. 2A to 2E do not require, and are configured without the ability to have, active cooling, e.g., they do not have the capability of flowing a cooling liquid through the interior of the housing, the cavities, or in direct contact with the fiber or optical components. Further, the location of the epoxy, the housings outer shape, and other features described above enable the connector to operate over a wide range of vibrations, temperatures and laser powers, including byway of example about 21 kW, 250 g's, 150° F., to about 50 kW, 500 g's, 400° F.; while maintaining, or substantially maintaining, its beam quality, beam parameters, and its optical distance from and position with respect to a receptacle and the receptacle associated optics, tools, etc.

Figure 3B:
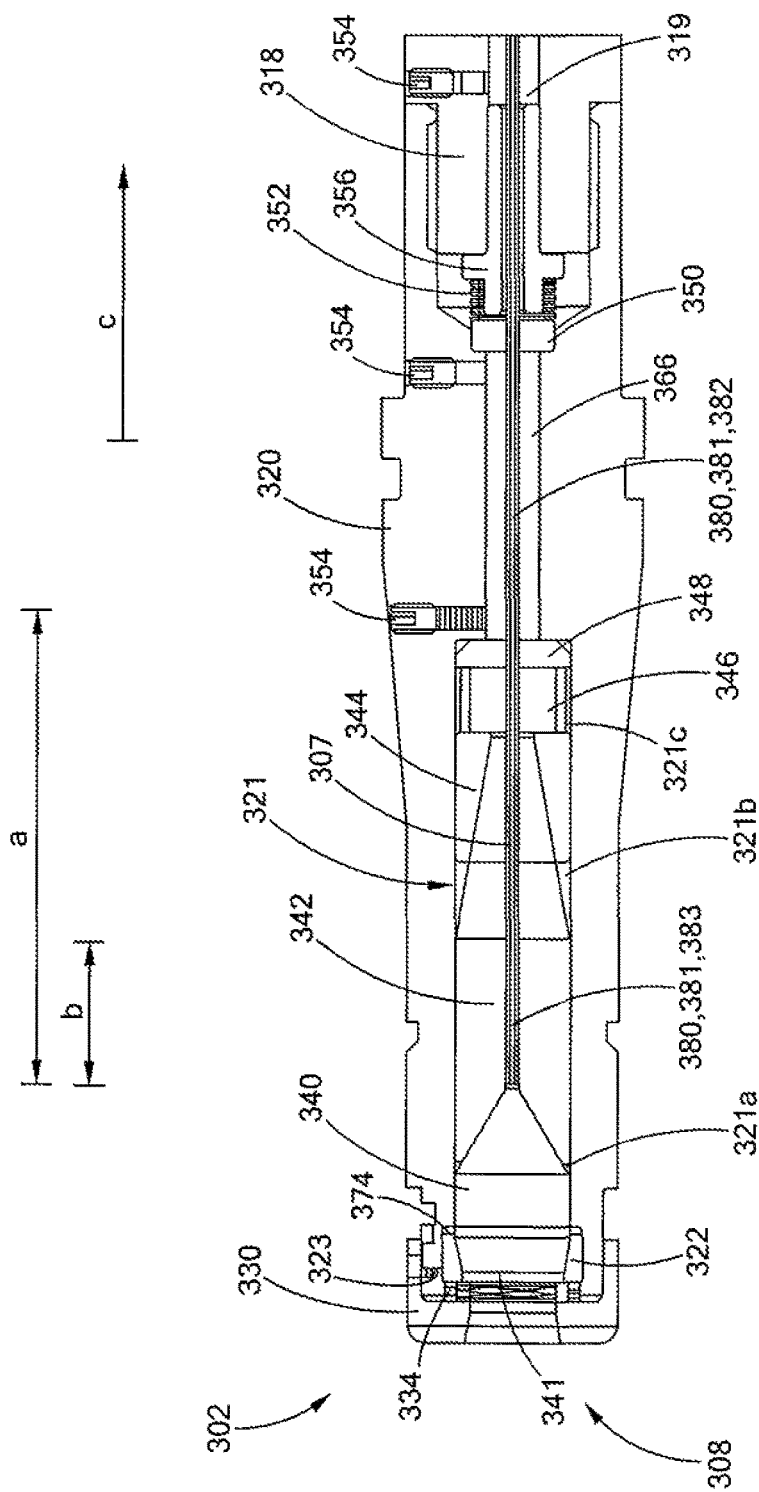
FIG. 3B is an enlarged cross-sectional view of the front end of the connector of FIG. 3A.
Figure 3C:
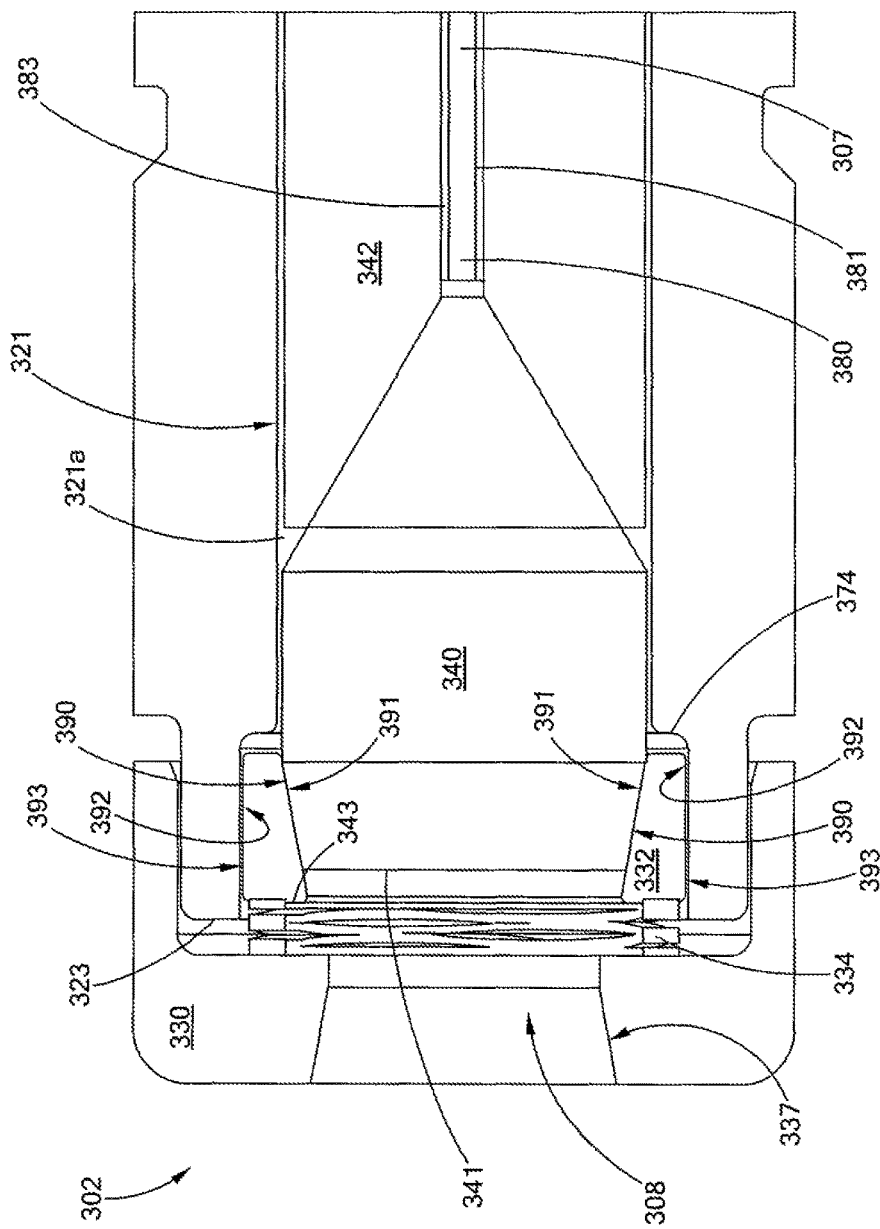
FIG. 3C is an enlarged cross-sectional view of the front end of FIG. 3B.

Turning to FIGS. 3A to 3C there is provided an embodiment of a passively cooled high power connector 300. In general, the connector 300 has a face end 302 and a tail end 304. The face end 302 has an opening 308 through which a laser beam is launched, along a laser beam path. The tail end 304 has an opening 314. The tail end opening 314 is formed by an attachment member 312. An outer member, cover, attachment, or locking member 313 having opening 315 is also provided in this embodiment.

A high power optical cable 306, having a high power optical fiber 307, is contained within the attachment member 312. The attachment member 312, may be a threaded pressure-fitting type device, such as for example a SWAGELOK, or other type of locking member, and attaches to and seals against the outer surface, e.g., the steel tube, of the optical cable 306. Further, the outer attachment member 313 may be an additional or second attachment means, or may be the sole means of attachment.

In the embodiment of FIGS. 3A to 3C, the optical cable is an optical fiber having a core diameter of about 600 urn, (microns), a cladding thickness of about 30 urn, and an acrylate coating thickness of about 75 urn. The optical cable may be an optical fiber with any added outer protective layers. It may be, for example, any of the configurations disclosed and taught in US Patent Publication Nos. 2010/0044106, 2010/0215326, and 2012/0020631, the entire disclosures of each of which are incorporated by reference herein. Although a single optical cable is shown in the embodiment of FIGS. 3A to 3C, multiple optical cables may be utilized, or a single optical cable with multiple optical fibers may be utilized.

Although not specifically shown in the Figures, break detection and back reflection monitory devices and systems may be utilized with, or integrated into the connectors and the high power optical cables. Examples of such break detection and monitoring devices, systems and methods are taught and disclosed in U.S. Patent Application Ser. No. 61/446,407; and Ser. No. 13/403,723, and US Patent Application Publication No. 2010/0044106, the entire disclosure of each of which are incorporated herein by reference.

The high power passively cooled connector 300 has a body 316, having a housing, which in this embodiment has two housing sections 318, 320. Housing section 318 forms cavity 319 and housing section 320 forms cavity 321. Housing section 318 and housing section 320 are mechanically attached, byway of for example, a threaded connection. The housing sections may be made from a single component or piece, several components or pieces, and these components or pieces may be configured such that they can be removably attached, e.g., threaded connections, pressure tabs, pins, etc., fixedly attached e.g., set screws, etc., fused together to form a single component, e.g., welding, adhesives, etc. and combinations and variations thereof.

Housing section 320, which is adjacent to and forms a portion of the face end 302, has an outer surface having a predetermined shape, which has three sub-sections, front sub-section, middle sub-section, and back sub-section along the lines of the outer housing in the FIGS. 2A to 2E embodiment. As discussed above, the shape of the connector, or the outer shape of the housings, may vary depending upon the particular application, use, receptacle, tool and other design and use factors.

The housing 318 has an opening 310, which forms part of the cavity 319. The opening 310 is configured to receive and hold the attachment member 312. The cable 306 extends through opening 310.

The optical fiber 307 is affixed and held within the body 316. Although not utilized in the embodiment of FIGS. 3A to 3C, a protective member or layer may extend into and beyond the opening 315, and thus provide protection to the outer surface of the fiber from the edge of the stainless steel tube. Examples of such protective members or layers are disclosed and taught in US Patent Publication Nos. 2010/0044106, 2010/0215326, and 2012/0020631, the entire disclosures of each of which are incorporated by reference herein.

In the embodiment of FIGS. 3A to 3C, the optical fiber 307 extends through the cavities 319, 321 of the body 316 and housings 318, 320. The optical fiber 307 extends through these cavities 319, 321 and is formed into a quartz block 340 that permits a reduction, or stepping down, in the fluence of the laser beam from the core of the fiber to the face 341 of the block 340. The fiber 307 is in optical communication with the end of the quartz block 340, preferably by way of a fusion splice joining the fiber to quartz block 340; other means to optically and mechanically connect or associate the fiber to the block may be employed. To accommodate high g-loads, preferably, a strong mechanical connection, and support for that connection, as discussed below should be employed.

The optical fiber exiting the opening 310 and going into cavity 319 has its core, cladding and acrylate coating. The optical fiber 307 extends through the spring seat 356, spring 352, epoxy dam 350, epoxy filled section 366, epoxy dam 348, spacer 346, aligner and spacer 344, ferrule 342, to quartz block 340. In this embodiment there is one spring 334 positioned distally to the quartz block.

In the embodiment of FIGS. 3A to 3C, an over-clad 383 is placed on the fiber. The over-clad 383 may be a capillary through which the fiber 307 is extended. The overclad 383 may be made from fused silica, sapphire, quartz, epoxy, plastic, diamond, ceramic, or other substantially transmissive materials. Preferably the overclad material has an index of refraction that is higher than or equal to the index of refraction of the outermost cladding of the fiber. The overclad may also be used to enhance, or increase the mechanical strength of the quartz block fiber assembly. Preferably, the overclad should have the same or substantially the same CTE as the fiber.

Figure 5B:
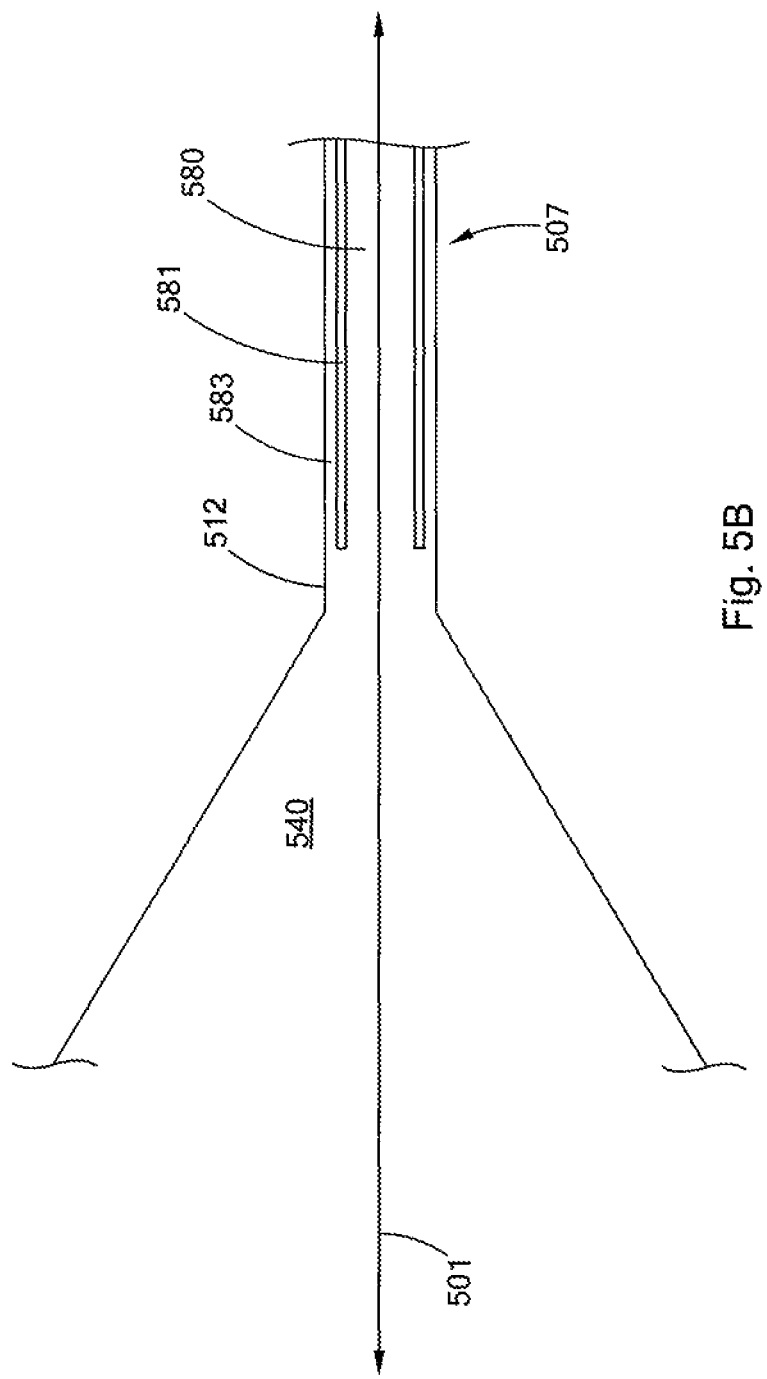
FIG. 5B is a cross-sectional view of the embodiment of FIG. 5A with the fiber bonded to the optical block in accordance with the present invention.

Turning to FIGS. 5A and 5B there is shown an example of a process and configuration for the junction of the overclad, the fiber and the quartz block. Thus, in FIG. 5A there is shown a portion of a quartz block 540 having a stem 512. The quartz block stem 512 is in mechanical contact with a fiber 507 having a core 580, a cladding 581 and having an overclad 583 fused to the cladding 581. As shown in FIG. 5B the mechanical contact is fused into an optical and mechanical connection, essentially making the quartz block, fiber and overclad a unitary structure.

Returning now to the embodiment of FIGS. 3A to C. In FIG. 3B there is provided the relative longitudinal location and area of fixation, of the overclad 383, with respect to the fiber core 380, fiber cladding 381, and fiber coating 382. Thus, for the length shown by line "b" the overclad 383 is preferably fused to the fiber cladding 381. The overclad 383 preferably extends over the fiber 307 for the length shown by line "a". As such, in a preferred embodiment, the majority of the overclad 383 is not fused to the fiber. Further, in the length "a" the fiber 307 does not have any coatings, such as an acrylate coating. In the preferred embodiment that coating 382 is located along length "c". It being understood that these lengths, relative positions, and overlaps may change depending upon the nature of the fiber, overclad and coatings.

One manner, by way of example, in which the components may be assembled, is to fuse an end section "b" of the overclad 383 to the fiber 307. The fused assembly of overclad and fiber would then be heated in conjunction with the heating of the stem of the quartz block. These two heated members would then be brought together in a precise manner, by for example, the use of a VYTRAN machine, and fused together. Other machines and apparatuses for making these junctions are available and may be used, such as the AFL ARCMASTER.

Set screws 354 are used to plug epoxy fill ports or passages; sealing and isolating these passages and the cavities 319, 321 from the outside of the housing. Thus, a fluid flowing along the exterior of the housing could not enter into the cavities or the interior of the housing.

To reduce stress points in the assembly, the edges of the components are configured to provide voids, or open spaces 321a, 321b, and 321c.

The face end 302 of the connector 300 has a face end cap 330, an annular retaining wedge 332, and a spring 334. The housing 320 has an end face 323 and a ledge 374. The face end cap 330 is attached to the end of the housing 320. The end cap 330 may be threaded on, attached by pins, detents, or other means of fixedly or releasable securing the cap to the housing. The cap may engage either or both ledge 374 or face 323, or as shown in the figure, it may be adjacent to but not mechanically touching those structures. The cap 330 exerts a force against spring 334, which in turn exerts a force against annular wedge 332. The inner surfaces 390 of the wedge 332 are forced against the outer surfaces 391 of the quartz block 340 and the outer surfaces 392 of wedge 332 are slideably engaged with the inner surfaces 393 of the housing 320 aligning the quartz block 340 in place with respect to housing 320, but still allowing for axial thermal expansion differences. In this embodiment the wedge and the spring do not engage or contact the face 341 of the quartz block 340 from which the laser beam is launched. The face 341 may have an antireflective, v-coat, long wave reflective, long wave cut-off, hot mirror, bandpass, or other coating.

In this embodiment, because the index of refraction of the overclad is higher than or equal to the index of refraction of the fiber outer cladding, the overclad 383 acts as a mode striper, removing back-reflected light from the cladding, before that light reaches a section of the fiber where the coating is present.

Like the embodiment of FIGS. 2A to E, the epoxy 366 is used to hold the fiber 307 in place with respect to the body 316 and any engagement section of the connector 300. Break detection and monitoring devices may also be employed. The considerations, materials and configurations for the spacer 344, the ferrule 342, the quartz block 340, the use of coatings, and surfaces and the means to handle, manage or otherwise address back reflections are similar to those discussed above for the embodiment of FIGS. 2A to E, and those discussions and teachings are applicable to the embodiment of FIGS. 3A to C.

The use of a component, such as the glass overclad member 383, in one of the illustrated embodiments of the present connectors, but not in others, as well as, other components that may be used in only one, a few, less then all, or all of the illustrated embodiments, is not and should not be considered as a limitation that such components may only be used with those illustrated embodiments, or must necessarily be used with those illustrated embodiments. Rather, these components, consistent with the teachings herein, may be used with other embodiments, may be used with embodiments not expressly illustrated herein, and may be used with other connector configures, without departing from the spirit of the inventions. The components, designs, teachings, configurations and arrangements for one embodiment of a connector may be utilized with, or for, the components, designs, teachings, configurations and arrangements of other embodiments of connectors.

The quartz block face 341 in this embodiment may be a flat surface, it may be polished, it is preferably perpendicular to the sides and longitudinal axis of the fiber, and the connector. It may also have a predetermined shape, such as a sphere, a curve, or function as a lens or other optic that shapes or affects the properties of the laser beam.

The face 341 of quartz block 340 is proximal to the end surface 343 of the wedge 332. The end surface 343 of the wedge is proximal to the end surface 323 of the housing 320. In this manner the face 341 of the quartz block 340 is positioned within the housing cavity 321. The relative position of the face and these surfaces may be varied. Thus, the face of the quartz block may be co-planar with the end surface of the wedge, with the end surface of the housing and both. The face of the quartz block may also extend beyond (e.g., be more distal than) the end surface of the wedge, the end surface of the housing and both.

The inner surface 337 of end cap 330 that faces the laser beam and laser beam path may be coated with a reflective coating or material, such as gold, silver, chromium, aluminum, copper, laser gold, $MgF_2$, and HR coatings, as well as other suitable materials.

Like the quartz block configuration of the embodiment of FIGS. 2A to E, the laser beam and beam path in the FIGS. 3A to C embodiment has a substantially larger surface area, e.g., bigger spot diameter, when it leaves the face 341 of the quartz block 340, than when it leaves the fiber 307 at the stem of the quartz block. By increasing the spot diameter at the face of the quartz block, the fluence of the beam is reduced and the ability of the connector to handle contamination on the face where the beam is launched is enhanced.

Thus, connectors of the type as shown in the embodiment of FIGS. 3A to C do not require, and are configured without the ability to have, active cooling, e.g., they do not have the capability of flowing a cooling liquid through the interior of the housing, the cavities, or in direct contact with the fiber or optical components. Further, the location of the epoxy, the housings outer shape, and other features described above enable the connector to operate over a wide range of vibrations, temperatures and laser powers, including by way of example laser powers as set forth in TABLE 1 and g-loads up to, or greater than 250 g, and up to, or greater than 500 g and temperatures up to or greater than 150° F., and up to, or greater than, 400° F.; while maintaining, or substantially maintaining, its beam quality, beam parameters, and its optical distance from and position with respect to a receptacle and the receptacle associated optics, tools, etc.

In general, for the present connectors break detection and back reflection monitoring devices and systems may be utilized with, or integrated into the connectors and the high power optical cables. Examples of such break detection and monitoring devices, systems and methods are taught and disclosed in U.S. patent application Ser. No. 61/446,407; and Ser. No. 13/403,723, and US Patent Application Publication No. 2010/0044106, the entire disclosure of each of which are incorporated herein by reference.

In general, the size and shape of the expanding block, e.g., the quartz block can be varied. Thus, for example, this block can be a cylinder, cone, square, rectangular, spherical, or have section in which combinations of these and various other shapes are used. The surface area of the face, through which the beam is launched may be increased to control the power density at the face. The length of the block, i.e., along the direction of the beam travel may also be increased. In addition to considerations to maximize and address the handling of back reflections, the size of the receptacle or tool that the connector will be used with will be a consideration for determining or limiting the size, shape and dimensions of the block. Moreover, the NA of the fiber will be a consideration and factor in determining the size, shape and dimensions of the block, as it is desirable, but not required, to avoid having the laser beam leave the sides of the block, and thus, limit the beams launch from the block to the face. Further, as exemplified by the embodiment of FIGS. 30, 30A to 30J, the block may be configured to exhibit total internal reflectance ("TIR") and thus function as, or exhibit wave guide properties for specific wavelengths of light.

In general the shapes of the connector components, and in particular an assembly of adjacent components, may be such as to provide for an "effective CTE" for those components or that assembly. In this manner the effective CTE of the assembly can be matched to, e.g., essentially the same as, or the same as, the CTE for another component, such as the optical fiber, the quartz block, or combinations of these. For example, in the configuration of the embodiment of FIGS. 3A to C, the lengths and angles of the tail end of ferrule 342, and spacer 344, in the general area where they are adjacent, are predetermined to provide the ferrule 342-spacer 344 assembly with an effective CTE. (In this combination the spacer would contribute a negative CTE to the effective CTE, in that as the spacer is heated its ID would become greater and the tail of the ferrule would extend further into it, providing for a shorter length of the assembly upon heating.) The effective CTE of the ferrule-spacer assembly is further predetermined to address the CTE of spacer 346 and dam 348. In this manner the effective CTE of the ferrule 342-spacer 344-spacer 346-dam 348 assembly can be substantially matched, or more preferably matched to the CTE of the fiber 307 and quartz block 340. In this manner, the effective CTE of components is one way in which to balance, control and manage thermal issues in the connectors. By way of example, the "effective CTE" of a ferrule-spacer assembly is over the temperature range of 20 C to 100 C, over the temperature range of 20 to 200 C, and over the temperature range of 20 to 300 C; and the "effective CTE" of a ferrule-spacer-spacer-dam assembly is over the temperature range of 20 C to 100 C, over the temperature range of 0 to 200 C, and over the temperature range of 20 to 300 C; and the fiber would have a CTE of over the temperature range of 20 C to 100 C, over temperature range of 20 to 200 C, and over the temperature range of 20 to 300 C, Thus, in this example the effective CTE of the ferrule-spacer-dam assembly would induce a strain in the fiber (over the temperature ranges) that is sufficiently small as to minimally adversely effect, and preferably to not adversely effect, the optical or physical properties of the fiber.

Figure 4A:
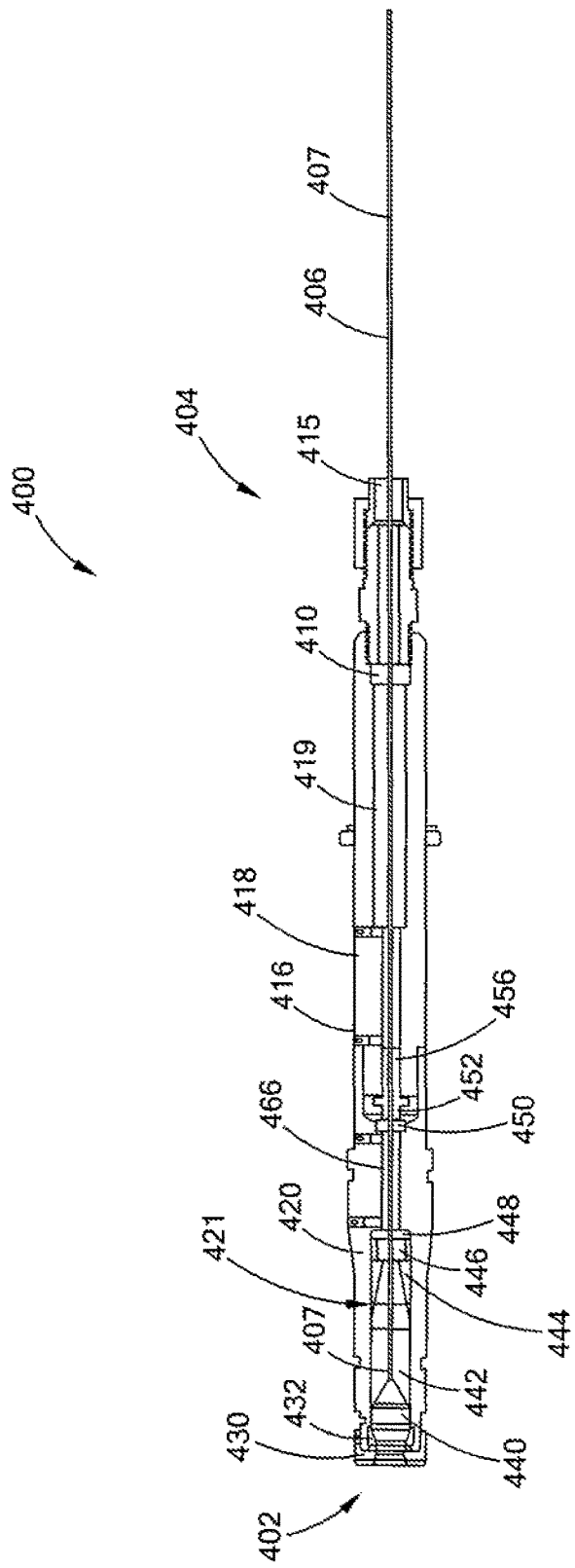
FIG. 4A is a cross-sectional view of a fourth embodiment of a connector in accordance with the present invention.

Turning to FIGS. 4A to 4C there is provided an embodiment of a passively cooled high power connector 400. In general, the connector 400 has a face end 402 and a tail end 404. The face end 402 has an opening through which a laser beam is launched, along a laser beam path. The tail end 404 has an opening into which the optical cable 406 is inserted. The tail end has an attachment member.

A high power optical cable 406, which in this case is an optical fiber 407, without any protective layers other than an acrylate coating around the cladding.

In the embodiment of FIGS. 4A to 4C, the optical cable is an optical fiber having a core of about 1000/vm, (microns), a cladding having a thickness of about 50 pm, and an acrylate coating having a thickness of about 100/jm.

The high power passively cooled connector 400 has a body 416, having a housing, which in this embodiment has two housing sections 418, 420. Housing section 418 forms cavity 419 and housing section 420 forms cavity 421. Housing section 418 and housing section 420 are mechanically attached, by way of for example, a threaded connection. The housing sections may be made from a single component or piece, several components or pieces, and these components or pieces may be configured such that they can be removably attached, e.g., threaded connections, pressure tabs, pins, etc., fixedly attached e.g., set screws, etc., fused together to form a single component, e.g., welding, adhesives, etc. and combinations thereof.

Housing section 420, which is adjacent to and forms a portion of the face end 402, has an outer surface having a predetermined shape, which has three sub-sections, front sub-section, middle sub-section, and back sub-section along the lines of the outer housing in the FIGS. 2A to 2E embodiment. As discussed above, the shape of the connector, or the outer shape of the housings, my vary depending upon the particular application, use, receptacle, tool and other design and use factors.

The housing 418 has an opening 410, which forms part of the cavity 419. The opening is configured to receive and hold the attachment member. The cable 406 extends through this opening.

The optical fiber 407 is affixed and held within the body 416. Although not utilized in the embodiment of FIG. 4, a protective member or layer may extend into and beyond the opening 415, and thus provide protection to the outer surface of the fiber, from the edges of opening 415, or from the edge of a stainless steel tube that may surround the fiber; but which is not shown in the embodiments of FIG. 4. Examples of such protective members or layers are as set forth above.

In the embodiment of FIGS. 4A to 4C, the optical fiber 407 extends through the cavities 419, 421 of the body 416 and housings 418, 420. The optical fiber 407 extends through these cavities 419, 421 and is formed into a quartz block 440 that permits a reduction, or stepping down, in the fluence of the laser beam from the core of the fiber to the face 441 of the block 440. The fiber 407 is in optical communication with the end of the quartz block 440, preferably by way of a fusion splice joining the fiber to quartz block 440; other means to optically and mechanically connect or associate the fiber to the block may be employed. To accommodate high g-loads, preferably, a strong mechanical connection, and support for that connection, as discussed below should be employed.

The optical fiber entering into the opening and going into cavity 419 has its core, cladding and acrylate coating. The optical fiber 407 extends through the spring seat 456, spring 452, epoxy dam 450, epoxy filled section 466, epoxy dam 448, spacer 446, aligner and spacer 444, ferrule 442, to quartz block 440. In this embodiment spring 434 is positioned distally to the quartz block 440.

In the embodiment of FIGS. 4A to 4C, an over-clad is employed in a manner similar to the configuration used in the FIGS. 3A to 3C embodiment. Similarly, in the embodiment of FIG. 4 the fiber and overclad fusion to the quartz block, the general shape of the quartz block, and the shape of the face of the quartz block are similar. As such, the above discussion regarding these structures, their configurations and components with respect to the FIGS. 3A to 3C embodiment is applicable to the FIGS. 4A to 4C embodiment.

The face end 402 of the connector 400 has a face end cap 430, an annular retaining wedge 432, and a spring 434. The wedge 432 has an end face 443. The housing 420 has an end face 423. The face end cap 430 is attached to the end of the housing 420. The end cap 430 may be threaded on, attached by pins, detents, or by other means to permanently, fixedly or releasably secure the cap to the housing. The cap 430 exerts a force against spring 434, which in turn exerts a force against annular wedge 432. The inner surfaces of the wedge 432 are forced against the outer surfaces of the quartz block 440 and the inner surfaces of the housing 420 aligning the quartz block in place. In this embodiment the wedge and the spring do not engage or contact the face 441 of the quartz block 440 from which the laser beam is launched. The face 441 may have an antireflective coating, v-coat, long wave reflective, long wave cut-off, hot mirror, bandpass, other coating, or suitable material.

The face 441 of the quartz block 440 is distal to, e.g., it extends beyond, the end face 443 of wedge 432. (As addressed above in the specification, it is understood that if the connector were being used as the receiving section of a coupler assembly, or was otherwise receiving a laser beam into the face of the quartz block, the quartz block would be extending proximally from the end face.) The end face 443 of wedge 432 is co-planar with the end face 423 of housing 420. Thus, the face 441 of the quartz block 440 extends beyond both the end of the wedge and the end of the housing. In this manner the face of the quartz block is not contained within, and extends beyond, the housing 420. Such a configuration makes cleaning easier, and in particular the cap can be removed making the face of the block easily cleaned, because it extends from the housing, and then the end cap can be replaced.

The cap 430 and also wedge 432 and the end of the housing may use a key configuration to assure that the components are in radial alignment, e.g., clocked, or are in a predetermined radial configuration. A portion of such a keying mechanism is shown as item 425. The use of a component, such as the radial alignment mechanism, in one of the illustrated embodiments of the present connectors, but not in others, as well as, other components that may be used in only one, a few, less then all, or all of the illustrated embodiments, is not and should not be considered as a limitation that such components may only be used with those illustrated embodiments, or must necessarily be used with those illustrated embodiments. Rather, these components, consistent with the teachings herein, may be used with other embodiments, may be used with embodiments not expressly illustrated herein, and may be used with other connector configures, without departing from the spirit of the inventions. The components, designs, teachings, configurations and arrangements for one embodiment of a connector may be utilized with, or for, the components, designs, teachings, configurations and arrangements of other embodiments of connectors.

Like the embodiment of FIGS. 2A to 2E, and 3A to 3C, the epoxy 466 is used to hold the fiber 407 in place with respect to the body 416 and any engagement section of the connector. Break detection and monitoring devices may also be employed. The considerations, materials and configurations for the spacer 444, the ferrule 442, the quartz block 440, the use of coatings, and surfaces and the means to handle, manage or otherwise address back reflections are similar to those discussed above for the embodiment of FIGS. 1A to 1F, 2A to 2E and 3A to 3C, and in particular FIGS. 2A to 2E and 3A to 3C, and those discussions and teachings are applicable to the embodiment of FIGS. 4A to 4C.

The quartz block face 441 in this embodiment may be a flat surface, it may be polished, it is preferably perpendicular to the sides and longitudinal axis of the fiber, and the connector. It may also have a predetermined shape, such as a sphere, a curve, or function as a lens or other optic that shapes or affects the properties of the laser beam.

The inner surface of end cap 430 that faces the laser beam and laser beam path may be coated with a reflective coating or material, such as gold, silver, chromium, nickel, aluminum, copper, laser gold, $MgF_2$, and HR coatings, and other suitable materials. This inner surface may also be have baffles, steps or terracing of different configurations, which help to manage back reflections by reflecting them away from the quartz block or fiber face, and more preferably by redirecting the back reflection in a forward propagating direction. Additional reflection may be the result of a total internal reflection.

Like the quartz block configuration of the embodiments of FIGS. 2A to 2E and 3A to 3C the laser beam and beam path in the FIGS. 4A to 4C embodiment has a substantially larger surface area, e.g., bigger spot diameter, when it leaves the face 441 of the quartz block 440, than when it leaves the fiber 407 at the stem of the quartz block. By increasing the spot diameter at the face of the quartz block, the fluence of the beam is reduced and the ability of the connector to handle contamination on the face where the beam is launched is enhanced.

Thus, connectors of the type as shown in the embodiment of FIGS. 4A to 4C do not require, and are configured without the ability to have, active cooling, e.g., they do not have the capability of flowing a cooling liquid through the interior of the housing, the cavities, or in direct contact with the fiber or optical components. Further, the location of the epoxy, the housings outer shape, and other features described above enable the connector to operate over a wide range of vibrations, temperatures and laser powers, including by way of example those set forth in the below TABLE 1, while maintaining its beam quality, beam parameters, and its optical distance from and position with respect to a receptacle and the receptacle associated optics, tools, etc.

Figure 15:
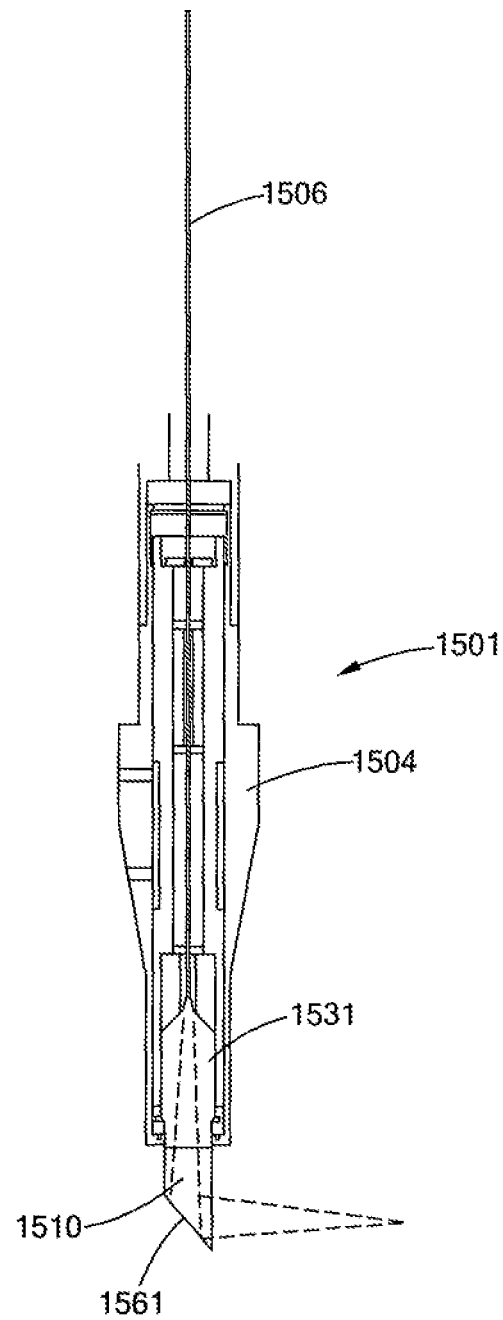
FIG. 15 is a cross-sectional view of a seventh embodiment of a connector in accordance with the present invention.

The optical expander block, e.g., the quartz block may for example have an angular reflective surface, that may also have optical properties, such as, shaping or focusing of the beam. In FIG. 15 there is illustrated an embodiment of a connector 1501 having a quartz block 1531 partially within a housing 1504. The block 1531 has a reflective surface 1561, which in this embodiment is curved, to focus the beam, but may be any other shape to obtained desired beam shaping, transmitting or other properties. The reflective surface may be obtained by TIR, a mirrored surface, or other suitable means for reflecting the high power laser beam. The path 1510 of the laser beam upon leaving the fiber 1506, traveling through the block 1531, striking, and reflecting off of the surface 1561 and leaving the block 1531 is shown. Although not shown, the housing could be extended down toward or past the end of the block 1531 to protect it, and a suitable window or opening could be formed in extended housing to provide for the passage of the laser beam. In this manner the laser beam path can be redirected at an angle different from the path of the beam, e.g., optical axis of the connector housing, when it is within the optical fiber in the connector.

Figure 16:
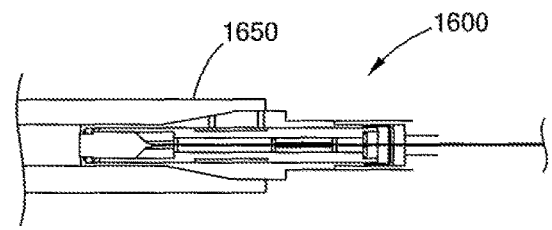
FIGS. 16-19 are cross-sectional views of first through fourth embodiments of connector systems in accordance with the present invention.

Turning to FIGS. 16-19 there are provided examples of various high power laser systems. In FIG. 16 there is shown an illustration of a system having a high power passively cooled connector 1600 optically and mechanically connected to a receptacle 1650. The receptacle may be in a tool, such as a laser bottom hole assembly, electric motor assembly, laser cutting, milling and perforating system. Thus, by way of example, the receptacle may be associated with or a part of the high power laser tools, optics assemblies, tools, and systems that are disclosed and taught in US patent applications and US Patent Application Publications: Publication No. 2010/0044106; Publication No. 2010/0044104; Publication No. 2010/0044105; Publication No. 2010/0044103; Ser. Nos. 13/034,037; 13/222,931; 13/211,729; 13/247,445; 13/366,882; 13/403,132 (Method of High Power Laser-Mechanical Drilling); Ser. Nos. 13/403,287; 13/403,509; 13/403,615; Ser. No. 61/605,422; Ser. No. 61/605; Ser. No. 61/605,434; Ser. No. 61/605,401; Ser. No. 61/446,312; Ser. No. 61/446,407; Ser. No. 61/439,970; Ser. No. 61/446,412; Ser. No. 61/446,041; Ser. No. 61/446,042; Ser. No. 61/446,040; Ser. No. 61/431,830; Ser. No. 61/378,910; Ser. No. 61/431,827 and Ser. No. 61/374,594, the entire disclosures of each of which are incorporated herein by reference.

Figure 17:
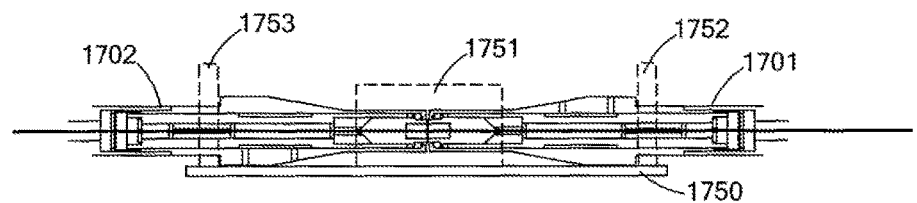

In FIG. 17 there is shown a first connector 1701 and a second connector 1702. The connectors are of the FIGS. 1A to 1F embodiment. The fiber faces are placed adjacent each other and the connectors are initially placed and held in optical and mechanical alignment by frame 1750 having attachment and adjustment devices 1751, 1752, 1753 (shown in dashed lines because in this embodiment they surround the connectors, although other means of adjusting and holding may be utilized). Preferably, the proximal face (receiving face) should be larger than the distal (launching face) by at least about, for example, 20/vm.

Figure 18:
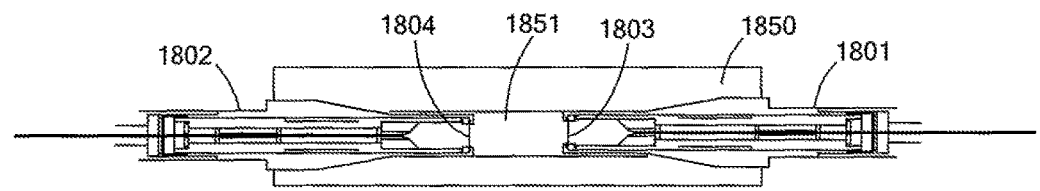

In FIG. 18 there is shown a first connector 1801 and a second connector 1802 and a receptacle 1850 for receiving the two connectors. Each connector 1801, 1802 has an optically active surface 1803, 1804 for launching or receiving the laser beam as it is propagated through free space 1851 (this space may be filled with air, gas, a liquid, and preferably a material that is high transmissive to the wavelength of the laser beam being used). The optically active surfaces 1804, 1803 should be reciprocal and designed to transmit and receive the laser beam through the free space 1851, preferably in the most efficient manner possible, for example spherical or aspherical shapes.

Figure 19:
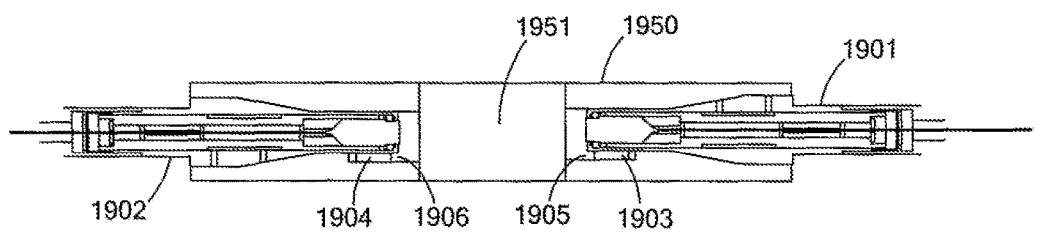

In FIG. 19 there is shown a first connector 1901, a second connector 1902, which are opto-mechanically associated by way of an assembly 1950, having two receptacles for receiving the connectors 1901, 1902. The receptacles may further have key elements 1906, 1905 that are reciprocal to key elements 1904, 1903 on the connectors 1902, 1901. The assembly has an optics package 1951. The assembly 1950 and optics 1951 package may be for example of the kind and types that are disclosed and taught in U.S. patent applications and US Patent Application Publications: Publication No. 2010/0044106; Publication No. 2010/0044105; Publication No. 2010/0044103; Ser. Nos. 13/403,287; 13/403,509; Ser. No. 61/605,401; Ser. No. 61/446,040; and Ser. No. 61/446,042, the entire disclosures of each of which are incorporated herein by reference.

Figure 20:
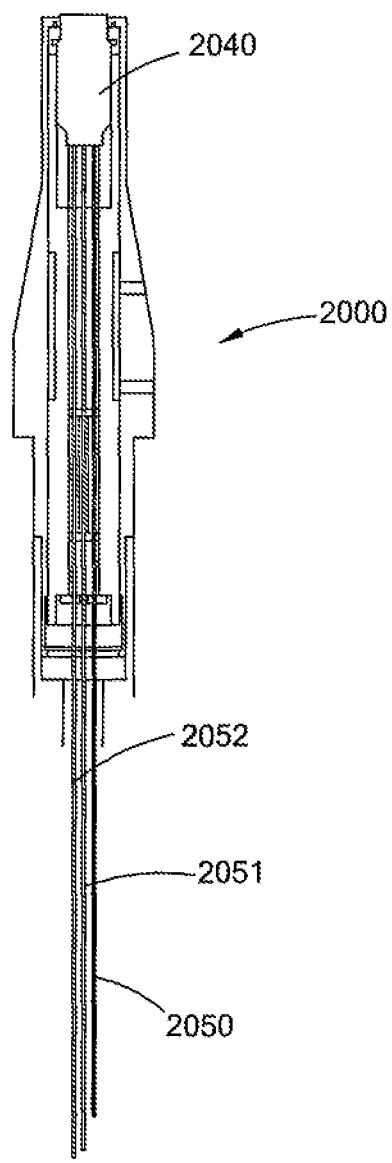
FIG. 20 is cross-sectional view of an eighth embodiment of a connector in accordance with the present inventions.

Turning now to FIG. 20 there is shown an embodiment of a connector 2000 having multiple optical cables 2050, 2051, 2052 entering into the tail end of the connector 2000 and having their optical fibers fused to an optical block 2040.

Examples of the relative power densities for high power laser beams being transmitted by a connector of the present invention are set forth in the following table (TABLE 1).

TABLE 1

| laser power entering connector in each fiber | surface area of face of block (cm²) | power density at face of block kW/cm² | Fiber core diameter in μ/m | power density in fiber kW/cm² | Number of fibers fused to a block |
|---|---|---|---|---|---|
| 10 | 0.8 | 15.9 | 600 | 3537 | 1 |
| 10 | 0.4 | 159.2 | 600 | 3537 | 5 |
| 10 | 1.6 | 55.7 | 600 | 3537 | 7 |
| 15 | 0.8 | 23.9 | 1000 | 1910 | 1 |
| 15 | 0.4 | 238.7 | 1000 | 1910 | 5 |
| 15 | 19.6 | 6.7 | 1000 | 1910 | 7 |
| 20 | 0.8 | 31.8 | 1000 | 2546 | 1 |
| 20 | 0.4 | 318.3 | 1000 | 2546 | 5 |
| 20 | 0.2 | 891.3 | 1000 | 2546 | 7 |
| 30 | 0.8 | 95.5 | 1000 | 3820 | 2 |
| 50 | 19.6 | 3.2 | 1000 | 6366 | 1 |

Figure 6:
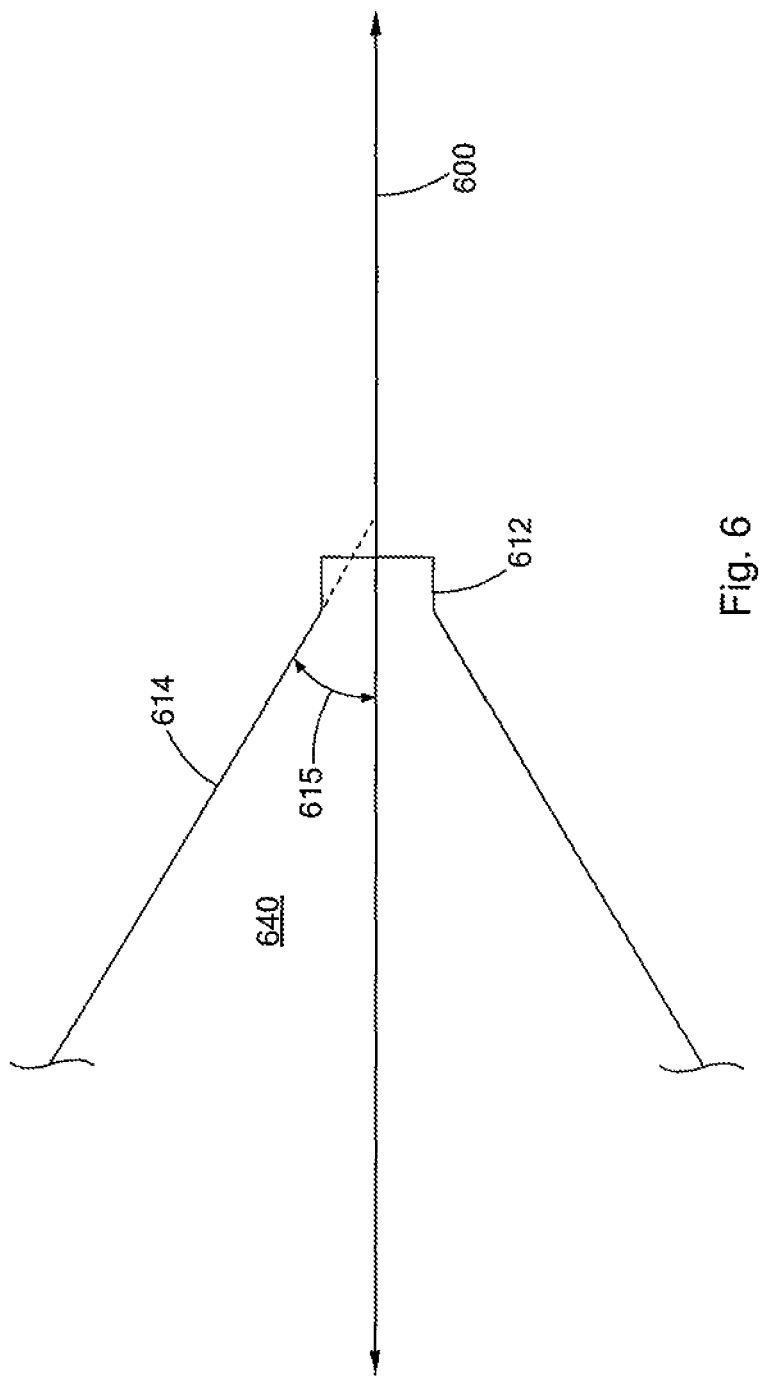
FIG. 6 is a schematic cross-section of a first embodiment of an optical block in accordance with the present invention.

In FIG. 6 there is shown an illustration of a section of a block 640. The angle of the back surface 614 of the block 640, as determined by the angle 615 of the back surface 614 with respect to the axis 600 of the beam path may be varied. To prevent the beam from leaving the block, which in some embodiments may not be functioning as a wave guide, (but in other embodiments, the block may function as a wave guide, and preferably so and in particular with respect to back reflections, in embodiments such as, for example, the embodiment of FIGS. 30, 30A to 30J) the angle 615 may be equal to or greater than the angle of divergence for the light at the block-fiber interface (or, if light is entering the connector by way of the block and into a fiber, the angle of acceptance). The length of the stem 612, the length of the side 614 and the overall distance to the face of the block are also factors for determining the angle 615. For blocks that are designed to reflect back, back reflections, angle 615 should be selected from the ranges of about 10 degrees to about 350 degrees, but preferably about 40-50 degrees and more preferably about 45 degrees to make a corner reflector.

Figure 10:
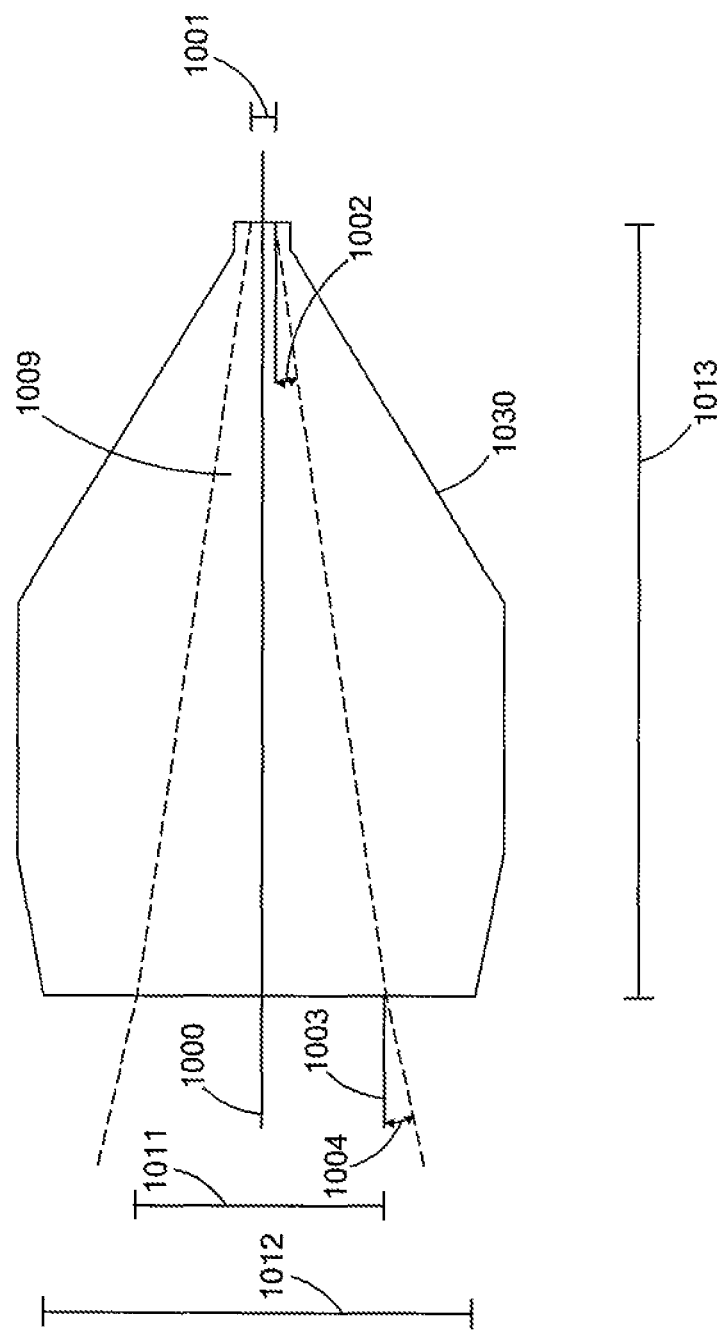
FIG. 10 is a schematic cross-sectional view of a second embodiment of an optical block in accordance with the present invention.

Thus, by way of example, turning to the embodiment of FIG. 10, which is an embodiment in which the block does not exhibit TIR and does not function as a waveguide for the selected wavelength of laser light, the diameter of the beam path, spot diameter, as the beam enters the block 1030 is, shown by line 1001. A laser beam could be transmitted through the block 1030 along beam path 1009. The fiber-block junction could have an angle of divergence, shown by angle 1002. The block-air junction (the face 1031 of the block 1030) could have an angle of divergence 1004, which is determined by a line 1003 that is parallel to the axis of the beam path 1000. The diameter of the beam path, or spot, on the face 1031 of the block is shown by line 1011 and the diameter of the face of the block is shown by line 1012. The axis of the beam path is shown by line 1000. The length of the block is shown by line 1013. It should be understood that although a circular beam spot is used in this example and in TABLE 2, other shapes of beams may be utilized. The following table (TABLE 2) sets out examples of the relative spot diameters and lengths for a block.

TABLE 2

| Example | fiber-block spot diameter (cm) (e.g., FIG. 10, 1001) | block face spot diameter (cm) (e.g., FIG. 10, 1011) | block face size (cm) (e.g., FIG. 10, 1012) | block length (e.g., FIG. 10, 1013) (cm) |
|---|---|---|---|---|
| 1 | 0.06 | 0.5 | 0.55 | 1.208623 |
| 2 | 0.1 | 1 | 1.1 | 2.466577 |
| 3 | 0.04 | 2 | 3 | 13.40023 |

TABLE 2-continued

| Example | fiber-block spot diameter (cm) (e.g., FIG. 10, 1001) | block face spot diameter (cm) (e.g., FIG. 10, 1011) | block face size (cm) (e.g., FIG. 10, 1012) | block length (e.g., FIG. 10, 1013) (cm) |
|---|---|---|---|---|
| 4 | 0.08 | 0.3 | 0.33 | 0.616644 |
| 5 | 0.05 | 5 | 5.5 | 13.44285 |
| 6 | 0.2 | 1 | 1.05 | 1.164293 |
| 7 | 0.0125 | 0.25 | 0.275 | 0.647477 |

FIG. 11 there is provided an illustration of an embodiment of the quartz block fiber interface that may be used with a connector. Thus, a section of a quartz block 1140 is shown having a beam path axis 1101. The block 1140 has a tapered stem 1112. The tapered stem 1112 is smaller at the point where it connects to the fiber 1107. Thus, in this embodiment the tapered stem 1112 is equal to the size of the core 1180, and is not optically associated with the inner cladding 1181, or the outer cladding 1183. In a fiber having only a single clad, the tapered stem would be equal to the core of the fiber.

FIG. 12 there is provided an illustration of an embodiment of the quartz block fiber interface that may be used with a connector. Thus, a section of a quartz block 1240 is shown having a beam path axis 1201. The block 1240 has a tapered stem 1212. The tapered stem 1212 is smaller at the point where it connects to the fiber 1207. Thus, in this embodiment the tapered stem 1212 is larger than the size of the core 1280, and is smaller than the size of the outer cladding 1283. The size of the stem 1212 may be equal to, or less than, the size of the inner cladding 1281. Thus, the quartz block stem and the quartz block, are optically associated or at least partially optically associated with the inner cladding 1281 and the fiber 1207.

As with the discussion of FIG. 10 and TABLE 2, it should be understood that although a circular beam spot is used in, or discussed with respect to the embodiments of FIGS. 11 and 12, as well as other examples in this specification, other beam shapes, sizes and configurations may be utilized, for example the beam shapes and properties that are disclosed and taught in US Patent Application Publication No. US 2010/0044105, the entire disclosure of which is incorporated herein by reference.

Figure 7A:
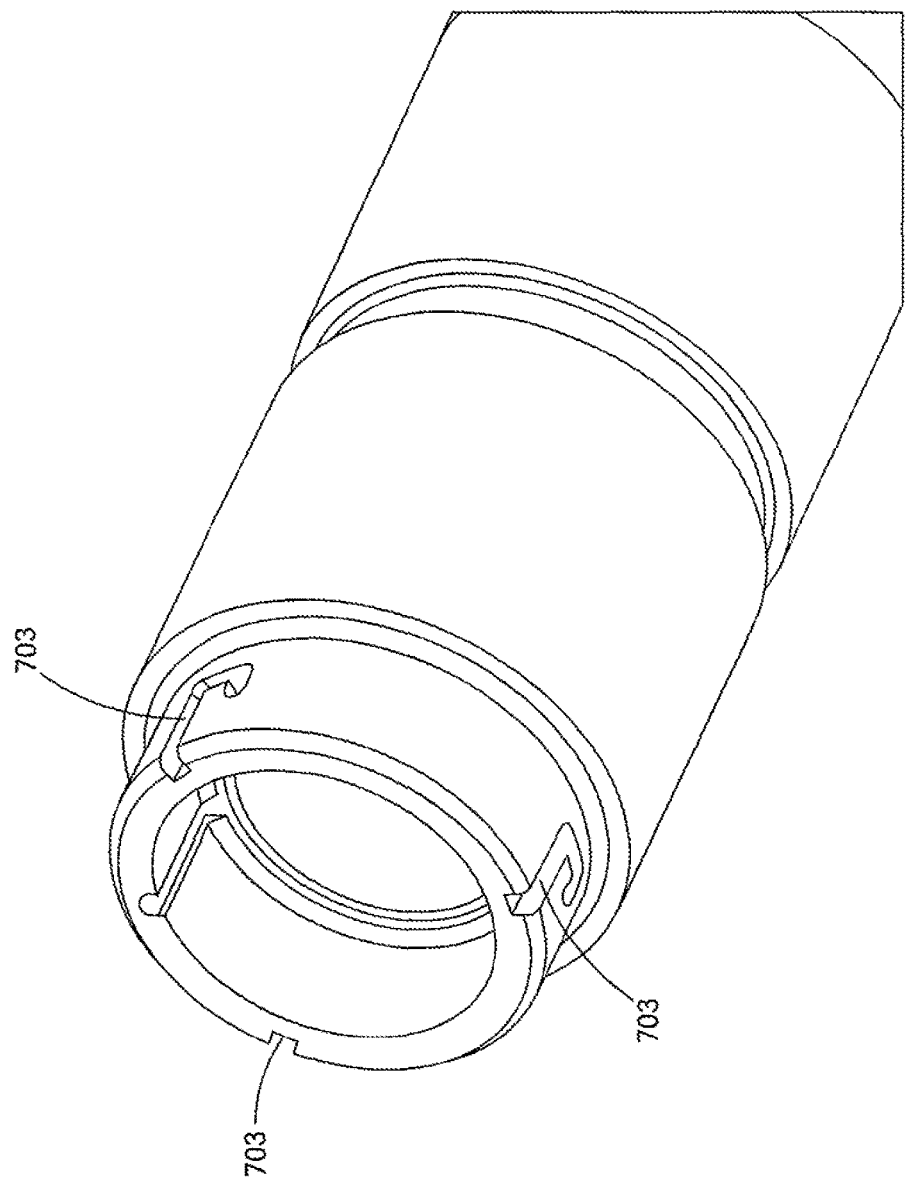
FIGS. 7A and 7B are perspective views on an embodiment of an end cap configuration of a connector in accordance with the present invention.
Figure 7B:
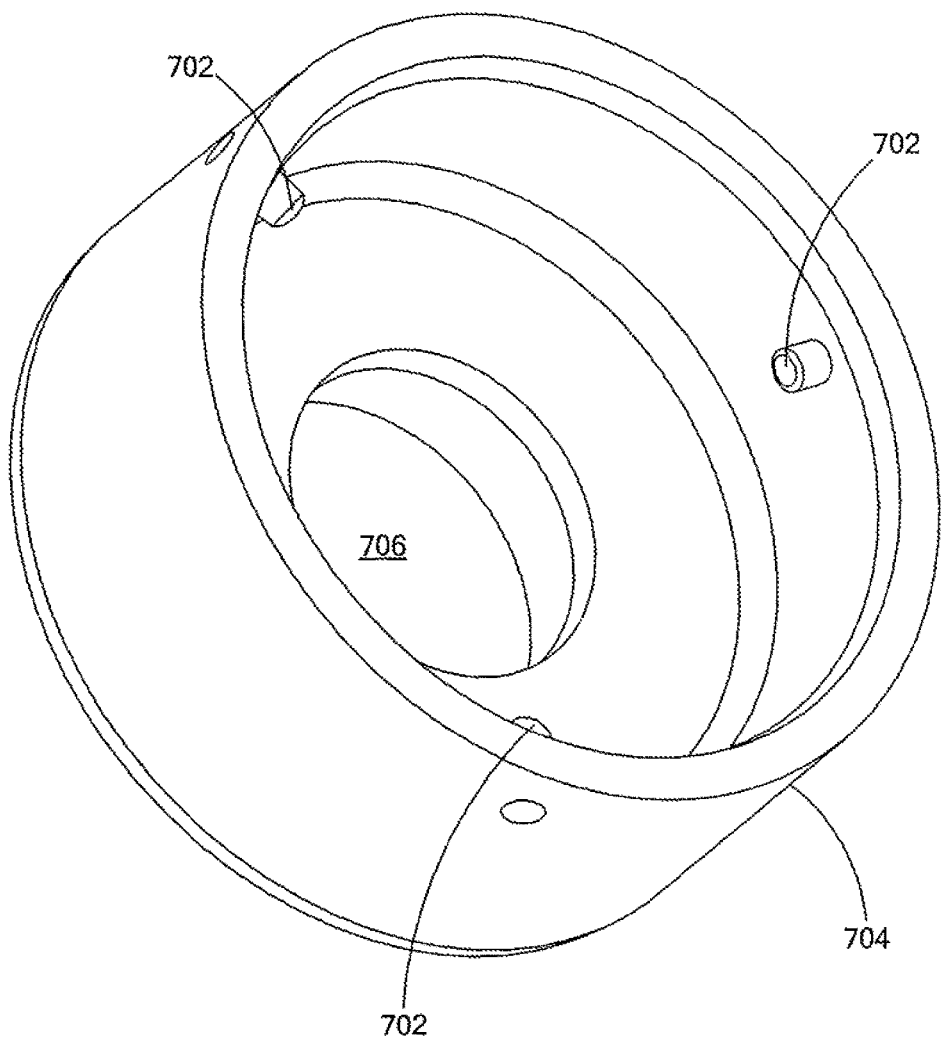

FIGS. 7A and 7B show an end cap configuration that used pins 702 that engage slots 703 in a twisting and locking manner. Although the end cap 704 is shown as having an opening 706, the end cap may also be closed to seal and protect the block or window of the connector. The opening 706 may also have an optical element, such as a lens, or a window positioned in the opening. Thus, for example, the connector could be shipped to the field with a closed cap. The cap removed, the face of the block cleaned and an open-ended cap placed on the connector prior to the connector's insertion into the receptacle. Further, in situations where the connector must be sent to a distant and remote location and is remotely inserted into a receptacle, the cap may be closed and made of material that the laser will ablate upon firing. In this configuration care should be taken to make sure that the ablation products do not harm the optics in the receptacle or the connector.

Figure 8:
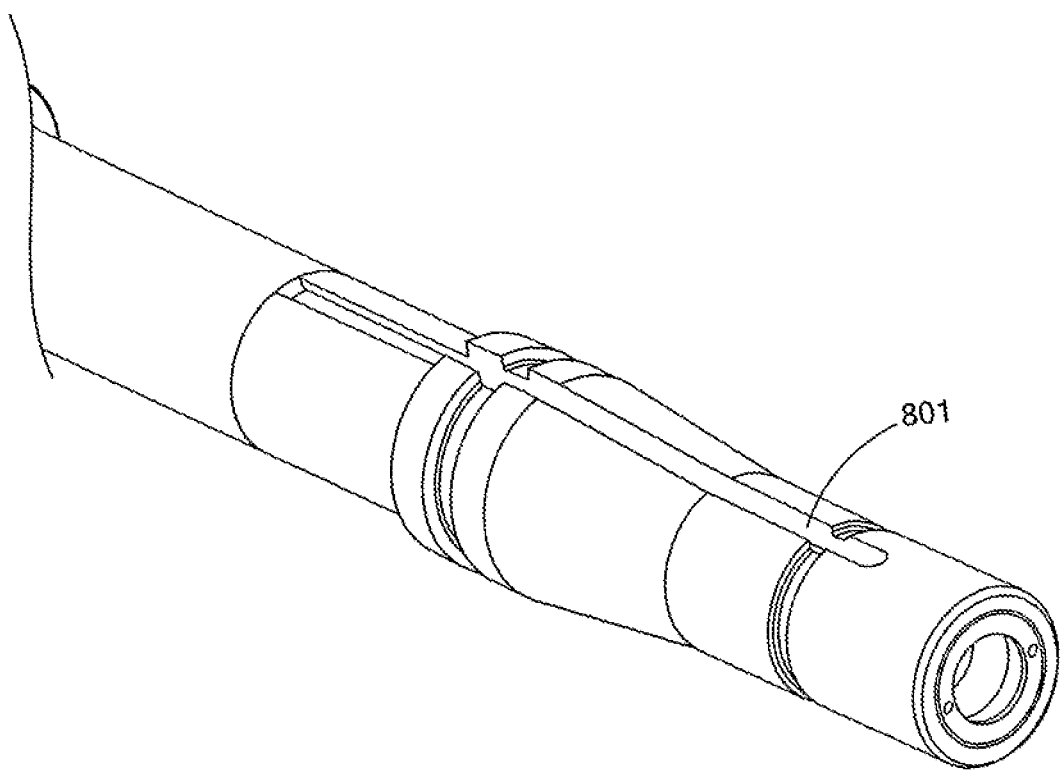
FIG. 8 is a perspective view of an embodiment of a connector in accordance with the present invention.

FIG. 8 shows a connector having a slot 801 formed in the outer housing for holding a diagnostic tool, such as for example a thermocouple. Other diagnostic and monitoring tools may be used; and configurations in addition to a slot to hold such tools may also be used.

Figure 9A:
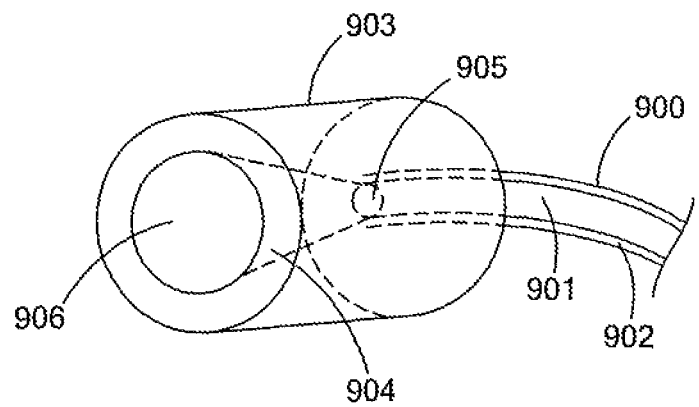
FIG. 9A is a perspective view with internal components shown in dashed lines of an embodiment of optical components in accordance with the present invention.
Figure 9B:
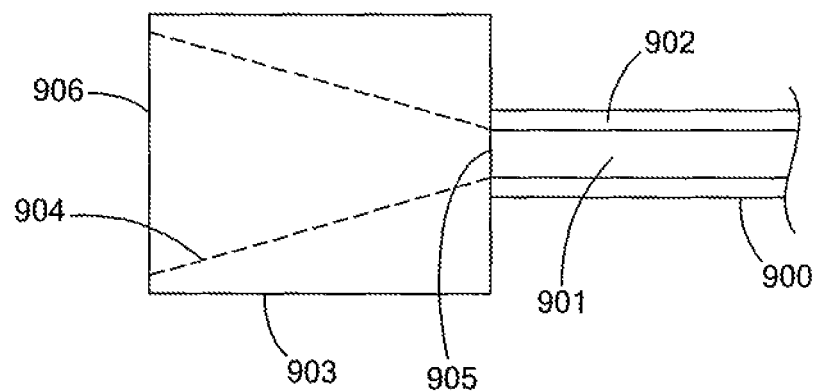
FIG. 9B is a cross-sectional view of the embodiment of FIG. 9A.

FIGS. 9A and 9B show a fiber and block arrangement. The fiber 900 has a core 901 and a cladding 902. The block 903 is cylindrical in shape. In use the laser beam would follow the laser beam path 904. The area of the beam path and the laser beam as it enters 905 the block 903 and exits 906 the block 903 are shown.

Figure 13A:
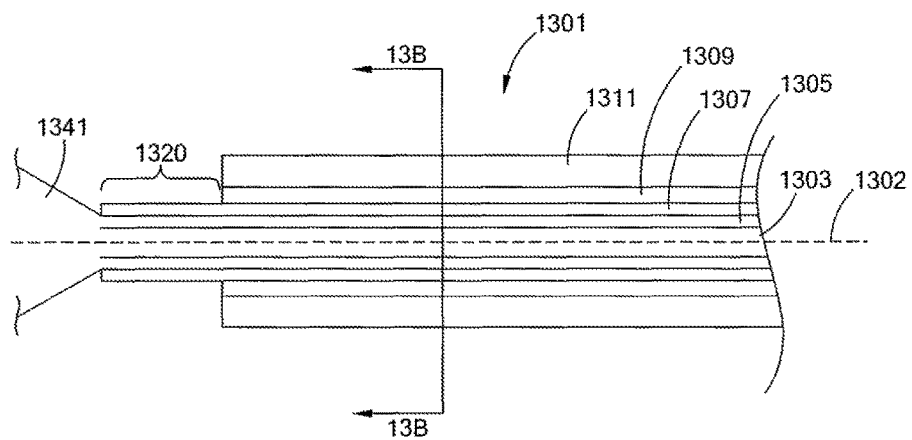
FIG. 13A is a cross-sectional view of an embodiment of optical components in accordance with the present invention.
Figure 13B:
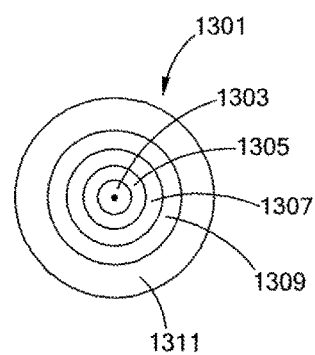
FIG. 13B is a cross-section of the embodiment of FIG. 13A taken along Hne13B-13B of FIG. 13A.

FIGS. 13A and 13B show an embodiment of a multi-clad fiber optic cable that may be used with a quartz block in the present connectors. The multi-clad fiber optic cable 1301 has a center axis 1302. The cable 1301 has: a core 1303, having a diameter of about 600 μm and an NA of about 0.2; a first cladding 1305 (which is adjacent the core) having an outer diameter of about 645 μm and an NA of 0.24; a second cladding 1307 (which is adjacent the first cladding) and having an outer diameter of about 660 μm and an NA of 0.35; a layer of silicone 1309 (which is adjacent to the second cladding) and having an outer diameter of about 685 μm; and, a layer of acrylate 1311 (which is adjacent the silicone layer) and having an outer diameter of about 810 μm. There is also provided a length 1320 of the fiber 1301 having layers removed (layers 1309, 1311) and a quartz block (not shown) having a stem 1341 (partially shown), having a diameter that is equal to or greater than the diameter of the fiber core 1303 and less than the outer diameter of the inner cladding 1305. (The entire quartz block 1340 is not shown in these figures.) The stem may also have a larger diameter than the outer cladding of the fiber.

Double-clad and multi-clad fiber optics may be preferred in the present connectors. A double-clad fiber may reduce or eliminate the need for mode stripping or may be used to augment the ability to manage back reflections. Additionally, a fiber that can propagate cladding modes has the advantage of affording flexibility around the location of mode stripping should it be preferred. The thickness of the outer clad may be chosen so as to minimize the probability of back reflections coupling into it. When used in conjunction with selection of the quartz block, the outer most, or a predetermined selection, clad or dads for single, double, or multi-clad fibers may extend beyond the acceptance area of the quartz block so as to further minimize back reflections coupled into the predetermined clad. The NA of the fiber core may be between about 0.06 and 0.48, with index of refraction between about 1.4 and 2, for wavelengths between about 200 nm and 15 μm. The NA of the first clad, if present, may be between about 0.01 and 0.48, with index of refraction between about 1.4 and 2, for wavelengths between about 200 nm and 15 μm. The NA of the second clad, if present, may be between about 0.01 and 0.48, with index of refraction between about 1.4 and 2, for wavelengths between about 200 nm and 15 μm. The NA of further dads, if present, may be between about 0.01 and 0.48, with index of refraction between about 1.4 and 2, for wavelengths between about 200 nm and 15 μm. The index of refraction of the buffer, if present, may be between about 1.4 and 2, for wavelengths between about 200 nm and 15 μm. Combinations of single, double, and multi-clad fibers may be used with the connectors of the present inventions.

Numerical Aperture (NA) is defined as $$NA_{layer\ n} = \sqrt{n_{layer\ n}^2 - n_{layer\ n+1}^2}$$

where n refers to the index of refraction of the selected layer at the chosen wavelength, and n+1 refers to the layer immediately surrounding the layer for which the numerical aperture is being calculated. (Complex, including "imaginary" mathematical solutions to NA should be interpreted as zero.) For example, in a single clad fiber with a core of index 1.45 and clad of index of 1.436 for a laser beam having a wavelength of 1070 nm, the numerical aperture of the core would be calculated as $$\sqrt{1.45^2 - 1.436^2}$$

or 0.2 at 1070 nm.

Fiber configurations and their respective numerical apertures that may be useful in, or with, the connectors of the present invention, include without limitation the following examples.

Example 1

A fiber having a core, first clad, second clad, silicone buffer, and Teflon-style coating. The core having an NA of about 0.2, and an index of about 1.450 at the wavelength of 1070 nm. The first clad having an NA of about 0.23, and an index of about 1.436 at the wavelength of 1070 nm. The second clad having an NA of about 0.35, and an index of about 1.417 at the wavelength of 1070 nm. The silicone having an index of about 1.373 at the wavelength of 1070 nm.

Example 2

A fiber having a core, first clad, and acrylate-style coating. The core having an NA of about 0.2, and an index of about 1.45 at the wavelength of 1070 nm. The first clad having an index of about 1.436 at the wavelength of 1070 nm.

Example 3

A fiber having a core, first clad, second clad, and Polyimide-style coating. The core having an NA of about 0.1, and an index of about 1.45 at the wavelength of 1070 nm. The first clad having an NA of about 0.12, and an index of about 1.447 at the wavelength of 1070 nm. The second clad having an NA of about 0.2, and an index of about 1.442 at the wavelength of 1070 nm. The polyimide having an index of about 1.428 at the wavelength of 1070 nm.

Example 4

A fiber having a core, first clad, and acrylate-style coating. The core having an NA of about 0.2, and an index of about 1.5 at the wavelength of 2000 nm. The first clad having an index of about 1.487 at the wavelength of 2000 nm.

Example 5

A fiber having a core, first clad, second clad, silicone buffer, and Teflon-style coating. The core having an NA of about 0.2, and an index of about 1.450 at the wavelength of 1070 nm. The first clad having an NA of about 0, and an index of about 1.436 at the wavelength of 1070 nm. The second clad having an NA of about 0.35, and an index of about 1.450 at the wavelength of 1070 nm. The silicone having an index of about 1.407 at the wavelength of 1070 nm.

In addition to step index fibers, for example of the types provided in Examples 1 to 5, other step index configurations may be utilized. Additionally, fibers of other configurations, shapes and types may be utilized, such as for example fibers with air dads, polymer dads, or graded index fibers.

Figure 14A:
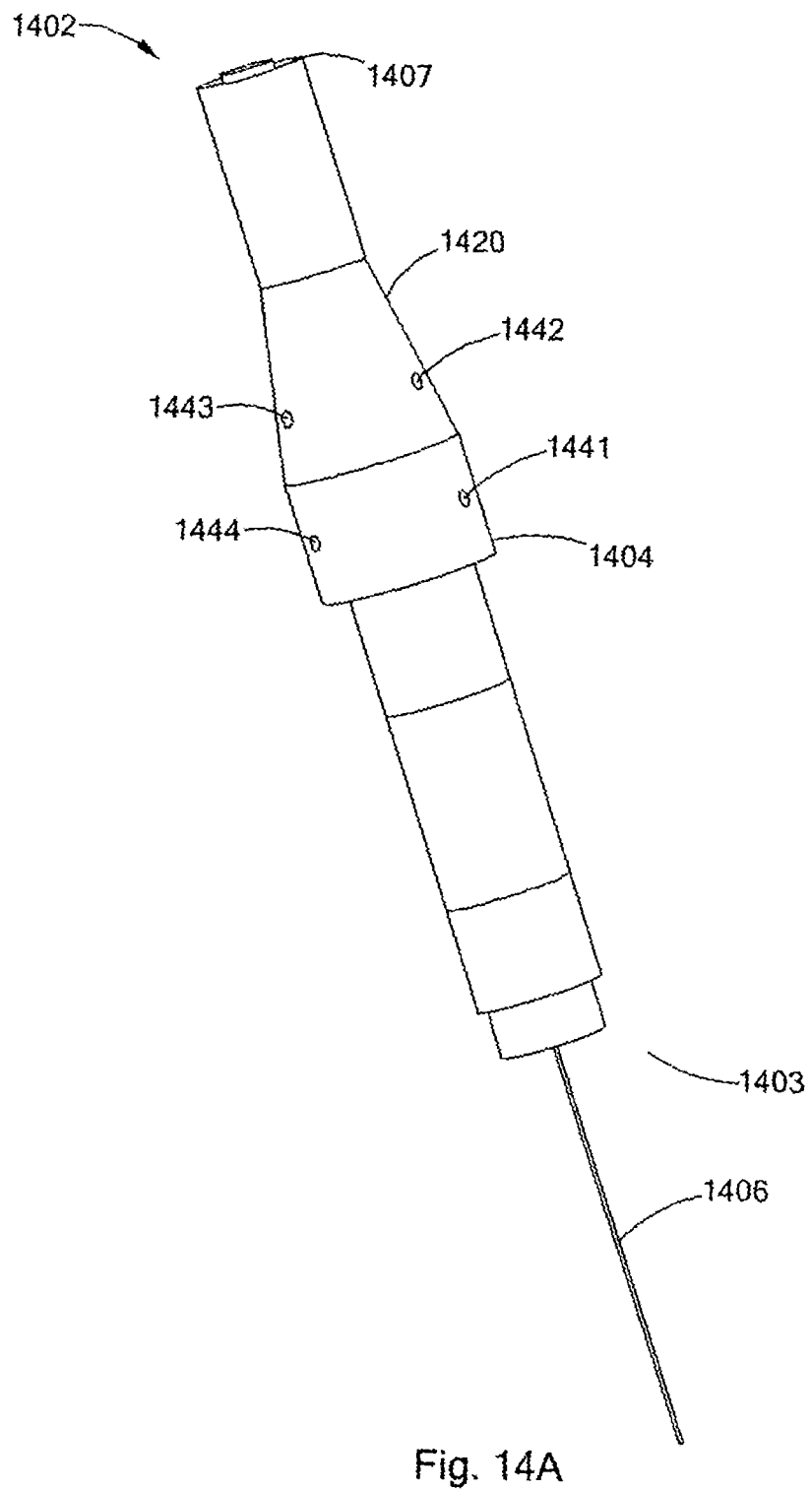
FIG. 14A is a side perspective view of a sixth embodiment of a connector in accordance with the present invention.
Figure 14B:
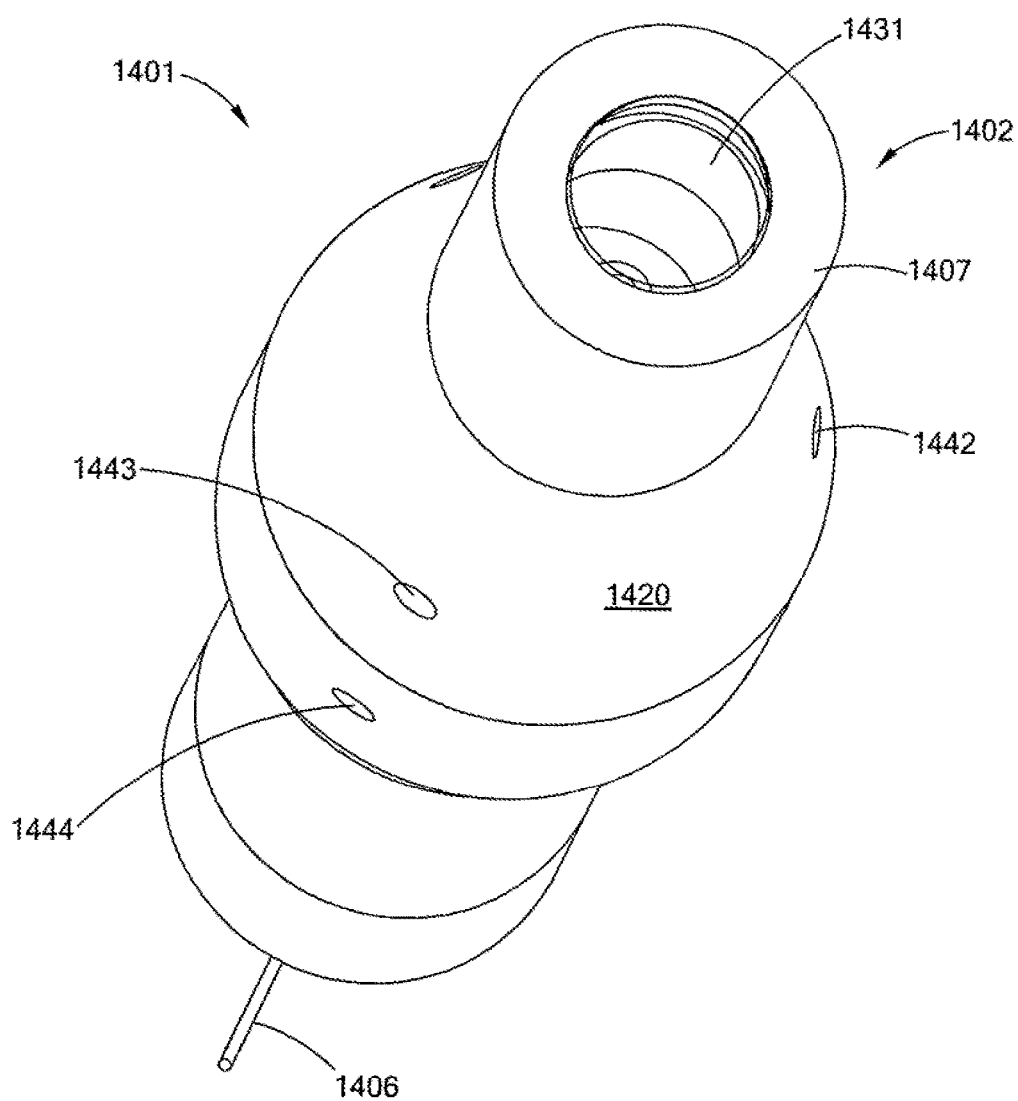
FIG. 14B is a face end perspective view of the embodiment of FIG. 14A.
Figure 14C:
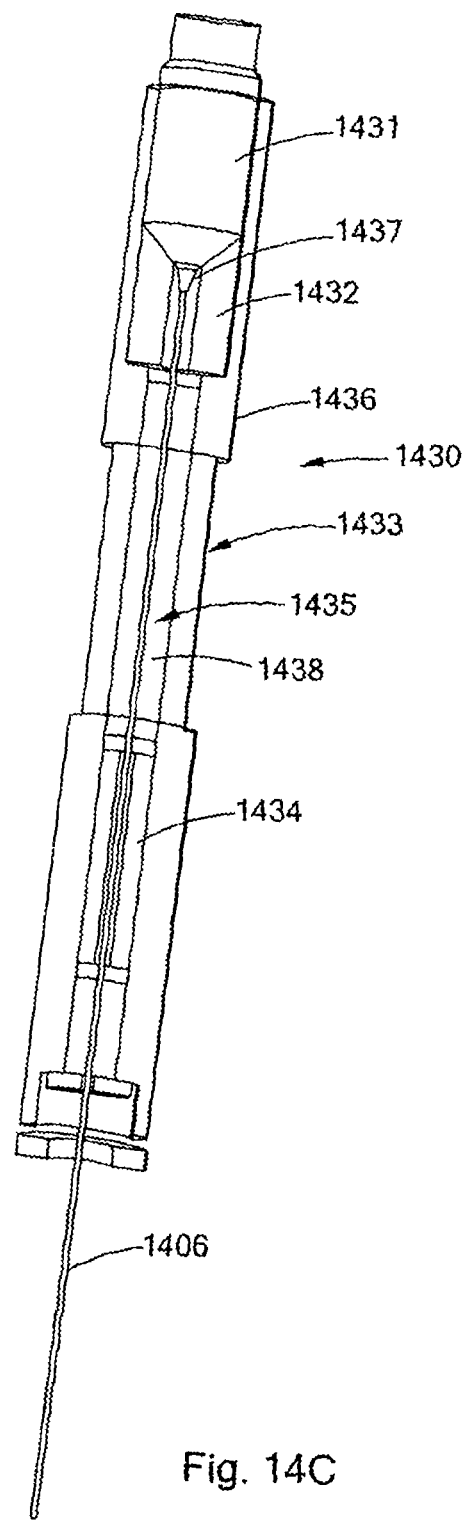
FIG. 14C is a side perspective view of the connector of of FIG. 14A.
Figure 14D:
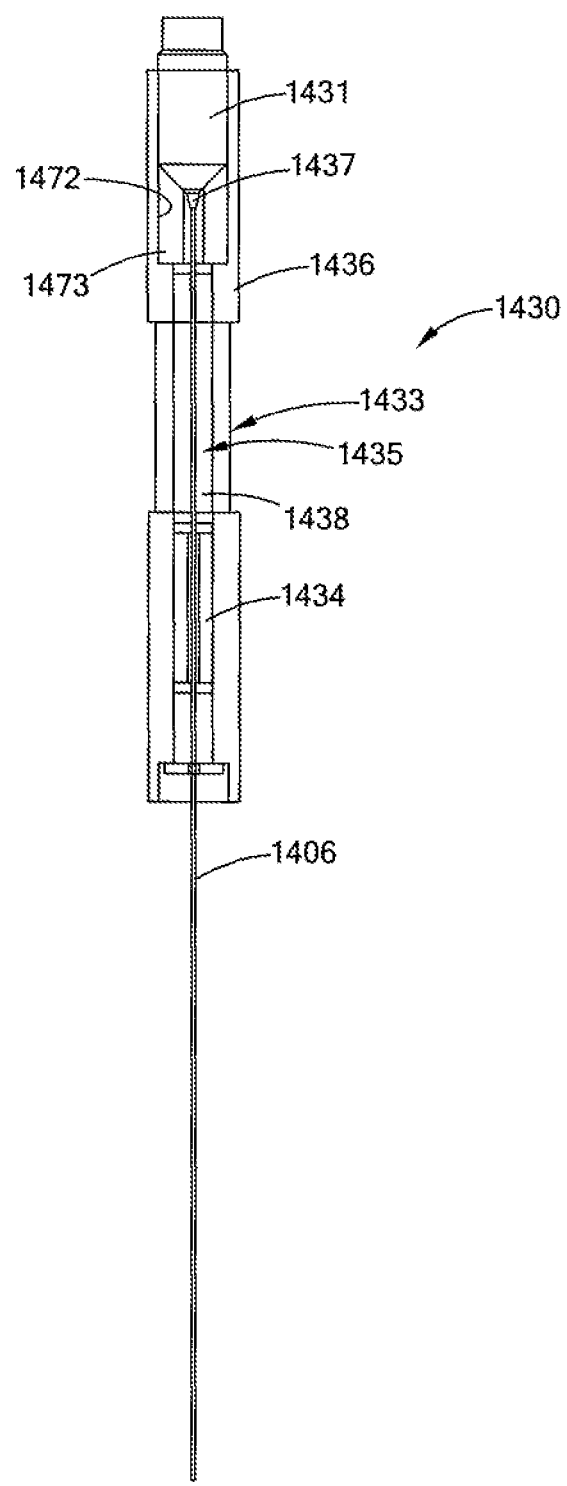
FIG. 14D is a cross-sectional view of the embodiment of FIG. 14C.
Figure 14E:
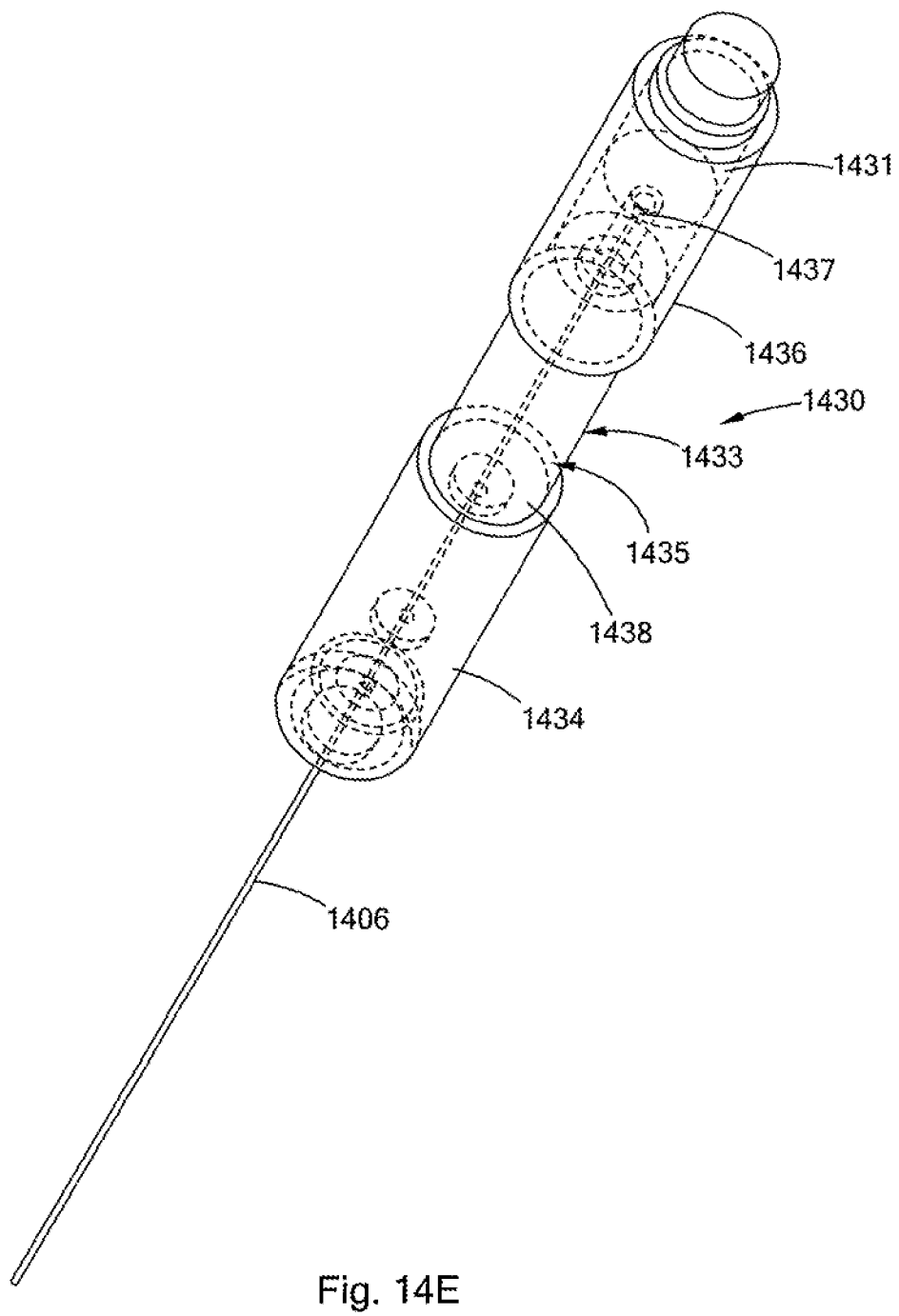
FIG. 14E is a perspective view, with internal component shown in dashed lines, of the embodiment of FIG. 14C.
Figure 14F:
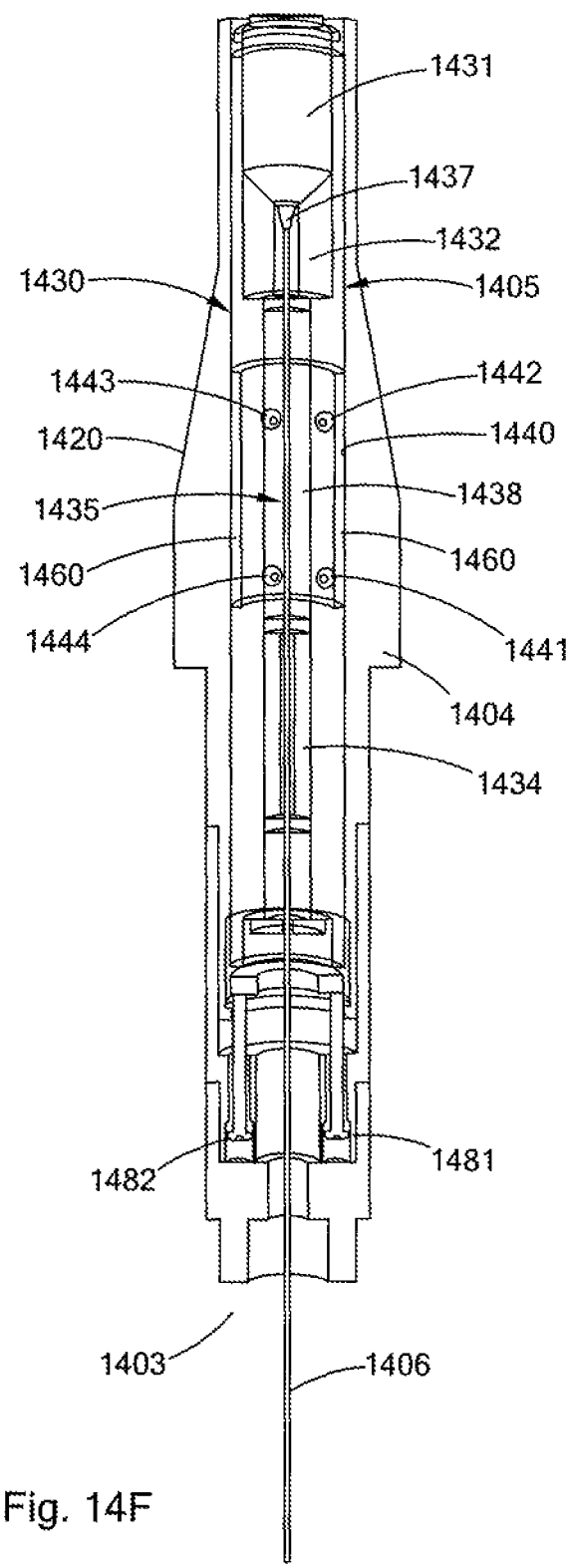
FIG. 14F is a partial cross-sectional perspective view of the embodiment of FIG. 14A.
Figure 14G:
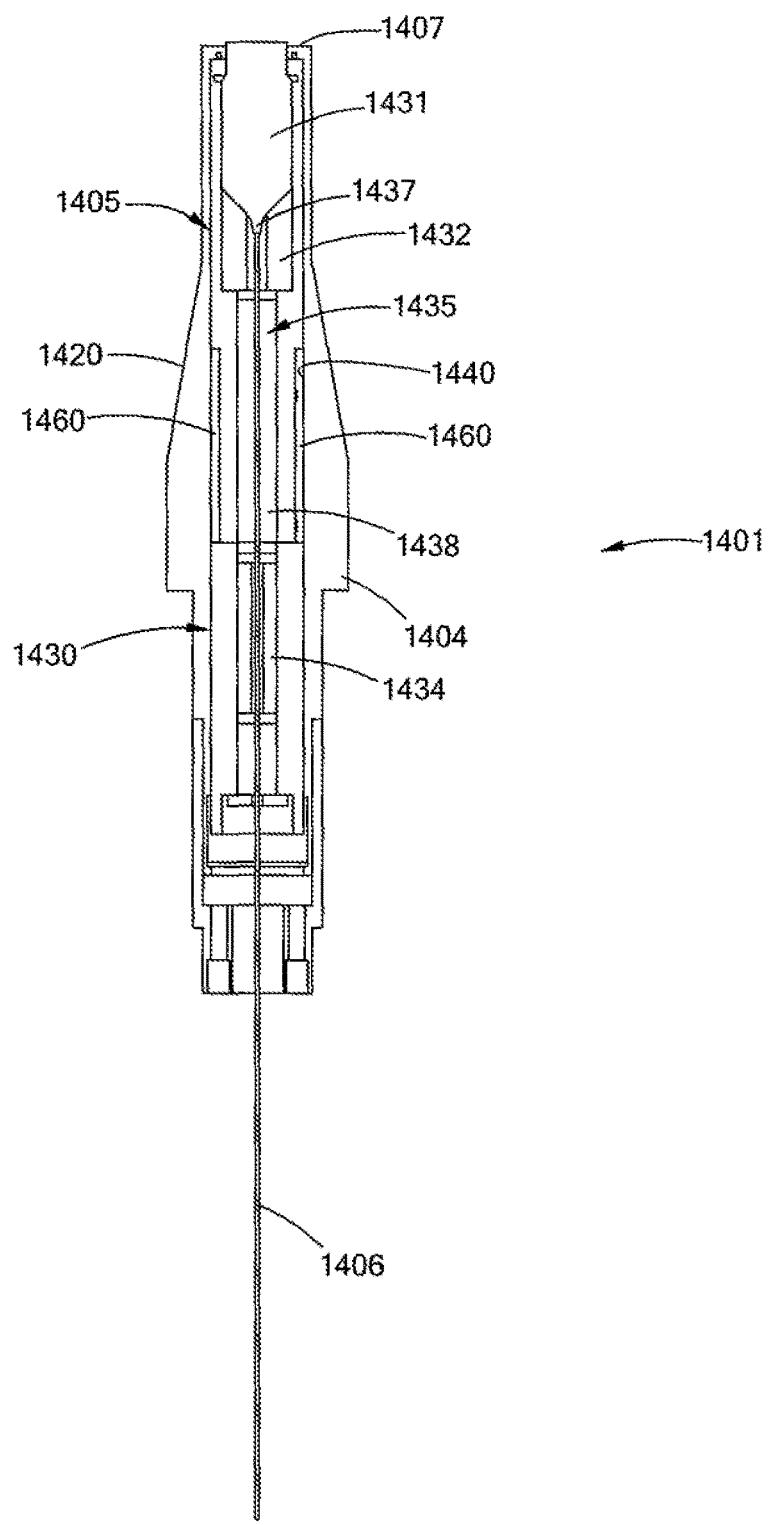
FIG. 14G is a cross-sectional view of the embodiment of FIG. 14F.

FIGS. 14A to 14G show an embodiment of a connector having an alignment adjustment assembly. FIG. 14A provides a side prospective view and FIG. 14B provides a face prospective view of the connector. FIG. 14C is a side prospective view of the optics assembly or optical path components. FIG. 14D is cross-sectional view of the optical path components of the connector. FIG. 14E is a three-quarter perspective view of those components with internal features and components shown in dashed lined. FIG. 14 F and FIG. 14G illustrate the optical path components within the connector body. In FIG. 14F the outer connector components are shown in side cross-sectional view to expose the inner optical path components, which are shown in prospective view. In FIG. 14 G the entire connector is shown in cross-sectional view.

The connector 1401 has a face end 1402 and a tail end 1403, having an optical cable 1406 extending therein. In this embodiment the optical cable is an optical fiber, but could be other configurations including the other configurations provided herein.

The connector has a body having a housing 1404 that forms a cavity 1405 that holds an optical assembly 1430. The face end 1402 has a face end surface 1407, which in this embodiment is also the distal end surface of housing 1404. The housing 1404 has an outer engagement surface 1420, which provides an engagement, alignment surface for the connector when it is optically coupled to a receptacle, another connector, a tool or another device.

The optical assembly 1430 for the connector 1401, may include an optical expander block 1431, e.g., a quartz block, a block alignment and positioning sleeve 1432, a section 1435, an optics assembly alignment section 1433, an epoxy section 1434, an optical fiber 1406 and an outer ferrule 1436, and when incorporated into the housing the optical expander block 1431 may extend beyond the end surface 1407.

The quartz block 1431 has a stem 1437 having a frustro-conical shape. The quartz block 1431, extends distally substantially beyond the end of outer ferrule 1436. The above descriptions of blocks, shapes, materials and the methods of attaching the fiber to the quartz block are applicable to this embodiment. The use of a glass overclad may also be employed.

The block alignment and positioning sleeve 1432 is similar to the sleeves in the above embodiments, and the disclosures for those embodiments are applicable to this embodiment. The interface, e.g., conical surfaces between the quartz block 1431 and sleeve 1432 may be coated and configured to manage back reflections along the lines and in the manner as describe above. The sleeve may also be configured to function as a mode stripper, to remove or handle back reflections in the cladding. Additionally, the sleeve may be used solely, or in conjunction with another optical element such as the quartz block, as a means to lower the ultimate fluence of scattered, incoupled, or back reflected light onto a reflective or absorptive, or partially reflective or absorptive, element below the damage threshold of that element. For example, in this embodiment, the quartz block conical surface is a ground finish, which acts as a diffusing or scattering element to coherent or non-coherent impinging light. The length of the sleeve is selected such that light propagating beyond the quartz block, in the face to tail direction, has sufficient diffusion (lowering of fluence), such that when it reaches surfaces 1472, 1473 forming the interior of the outer ferrule, these surfaces 1472, 1473 are not exposed to a focused beam. These surfaces 1472, 1473 are preferably coated with a reflective coating, and the avoidance of contacting this reflective coating provides greater life for the coating and greater flexibility in the type of coating utilized. This method may be employed to lower the fluence on epoxy, an optical surface, a non-optical surface, etc.

The section 1435 is a predetermined length of fiber (core and cladding) that is in a cavity 1438 formed by the outer ferrule 1436. Cavity 1438 surrounds the fiber. The cavity 1438 may be filled with air. Preferably the fiber in this section and any sections distally from this section have only the core and cladding (including multiclads).

The epoxy section 1434 is similar to the epoxy sections for the other embodiments described above and those descriptions are applicable to this embodiment.

The outer ferrule 1436, preferably may be made from fused silica, although other strong materials such as metal and composites may be used. The use of fused silica provides mechanical CTE advantages as the CTE for the optics assembly components will all be similar, if not essentially identical.

The optics alignment section 1433, of the outer ferrule 1436, is made as a recess in the outer ferrule 1436 that corresponds with adjustment screws located in the housing 1404. The recess in the outer ferrule 1436 forms a cavity 1460 with the inner surface 1440 of the housing 1404. Openings 1441, 1442, 1443, 1444 in the housing 1404 contain adjustment screws. Once the adjustment screws are adjusted to align the optics assembly the cavity 1460 is filled with epoxy. In the configuration where the outer ferrule is fused silica, or another material that is transmissive to UV light, a UV curing epoxy may be employed. Near the tail end of the connector are recesses containing focusing adjustment screws 1481, 1482.

FIGS. 14D and 14E show a cross sectional view and a see through perspective view of the optics assembly 1430 and its components. FIGS. 14F and 14G show a cross sectional view of the optics assembly 1430 associated with the housing 1404 and a see through cross-section view of the optics assembly 1430 associated with the housing 1404.

Many variations on the above detailed embodiments of the connectors, and combinations of the forgoing components for the above detailed embodiments are envisioned; and thus, it should be understood that in general some embodiments of connectors may have, for example: an outer jacket/alignment interface, which is a mechanical envelope for the optical components of the connector, protect it from mechanical damage, and has means to align and connect the connector to a tool, a device, or a receptacle; an internal alignment member, which aligns the optical fiber to the outer alignment interface datum, or other datum; a fiber termination, which is the end of the optical path in the fiber optic and may see the highest fluence surface and may also be the source of back reflections and loss; a heat sink, which transitions radiated energy (back reflections, heat from a work piece, other optical surface, and other sources of heat or light energy) and other generated heat to a cooling component; a fiber securing means, which locks the fiber (radially, axially, especially axially, and both) so that pull strength is retained, alignment is retained, and vibration is managed; a cable connection means, which enables connection to fiber cabling means; a passive cooling means, which removes heat from the connector to prevent overheating of components.

In general, additional components that may be utilized in some embodiments of connectors are for example: a back reflection management system, which addresses and manages back reflections generated from work piece, material being cut, material being drilled, rock face, fiber termination, or other source of back reflected light, that can be coupled into cladding and cause issues with coating, as well as heating issue for other components, the former may preferably be stripped from the cladding; an athermalizing means, which is provided to assist connector function and alignment through a range of operating temperatures; a low or lower-fluence optical face, (high fluence areas, in particular where contamination may be present or accumulate should preferably be minimized and more preferably avoided or protected); sealing components to protect the optical components from environment and operating conditions, such as, contamination and condensation and which further should be employed in higher fluence and sensitive areas; and, contamination protection means, which protect the optical face (beam launch surface or face, or beam receiving surface or face) from contamination when not installed in tool, receptacle or operating system. The techniques for managing back reflections may also be used for managing incoupled light sources from for example scatter from optics, or a misaligned incoming beam.

The following table, TABLE 3, sets forth illustrative examples of components and configuration of connectors and the performance capabilities for such examples.

TABLE 3

Examples of Connectors

| Component | Example 1 Descrip. | Example 2 Descrip. | Example 3 Descrip. | Additional features for Examples 1, 2, or 3 | | | |
|---|---|---|---|---|---|---|---|
| | | | | Descrip. | Descrip. | Descrip. | Descrip. |
| Outer jacket-alignment interface | Precision conical stab interface. Aluminum | Precision conical stab interface. Aluminum | Precision conical stab interface, QBH-bayonet style option, QD style option | All standard connection types: LLK, QD, QBH, etc. | Otherwise locked connections (requires locking action) | Automatically locking connection | Cylindrical ferrule alignment |
| Internal alignment member | Precision ferrule around fiber | Precision ferrule around fiber, conical aligned silica block | Precision ferrule, adjustable internal alignment | Adjustable internal alignments (multiple options) | Conical alignment surfaces | Cylindrical alignment surfaces | Flat-face based alignments |
| Fiber termination | Cleaved, AR coated fiber face | Fusion spliced coated silica block | Fusion spliced coated silica block | Integral end cap (flat, lensed, etc.) | Optically contacted | Fluid immersed | Expanded fiber |
| Heat sink | Aluminum inner wall, epoxy | Aluminum inner wall, epoxy | Absorptive coating on inner wall, high thermal transfer member | Fluid absorption | Wavelength specific absorptive element | Epoxy, otherwise fiber integral heat sink | Heat sink separated by a thermal barrier from fiber |
| Fiber securing means | Epoxy chambers around bare fiber, acrylate, or both | Epoxy chambers around bare fiber, acrylate, or both, mechanical support | Epoxy chambers around fiber, acrylate, or both. Epoxied ferrule to | Epoxy, otherwise curing means of securing fiber | Glass to metal-ceramic etc. bond | Physical clamping means (set screws, clamp, interface with end- | Adjustable axial securing means |

TABLE 3-continued

Examples of Connectors

| Component | Example 1 Descrip. | Example 2 Descrip. | Example 3 Descrip. | Additional features for Examples 1, 2, or 3 |||| 
| --- | --- | --- | --- | --- | --- | --- | --- |
| | | | | Descrip. | Descrip. | Descrip. | Descrip. |
| Cable connection means | 1/8" Swagelok | 1/8", 3/16" Swagelok, 1/8" NPT | Swagelok, NPT | Every standard fitting | Weldable connection | Epoxiable connection | Clamped connection; soldering or brazing; fusing to a glass body; flared tube fittings', fussing to a clarmpable |
| Cooling means | Cooling fins on aluminum outer jacket; separate part or integral with housing | Cooling fins on brass outer jacket | Cooling fins on copper outer jacket | Active fluid cooling | Otherwise convective cooling component (high surface area) | High emissivity radiative cooling component | Conductive contact to heat sink |
| Backreflection and radiated heat management | Reflective component surrounding fiber face | Reflective component, modestripping overclad w/ transmissive ferrule | Reflective component, modestripping overclad or epoxy interface w/ transmissive ferrule | Index matched cladding mode stripping element (solid, fluid, powder, etc.) | Bend radius manipulation to relieve backreflections | Mirror cladding face; or optically disassociate with block | Mirrors inside connector which direct backreflections at heat sink |
| Athermalizing means | Spring compression of alignment ferrule | Spring compression of alignment ferrule | Separate inner ferrule, spring compressed to maintain preload, material match to net athermal | Material selection (different materials) | Material selection (0 effective CTE) | Spring-based contact | Thermal lensing compensation on for shift in focus; all parts may be made from the same material as the fiber; all parts may have a low |
| Lower-fluence optical face | Protective AR coated window | Coated silica block in which beam expands | Coated silica block in which beam expands | Optically contacted block | Larger waveguide expansion | Non-waveguide expansion | Fluid intermediate |
| Sealing components | Gold foil seal between window and inside/epoxied threads/swage/o-rings | Metal-to-glass seal of silica block to outer body, expoxied threads/swage | Epoxied ferrule, threads. Swage. | Hermetic glass to metal/ceramic/etc. seal | Silicone, epoxy, etc. | Contact seal | transparent o-ring or seal. |
| Contamination protection means | None integral | None integral | None integral | Shutter-style optical face protection | Outer sleeve protecting optical face | Active purge | 'windshield wiper' |
| Strain relief | Delrin conical strain relief over swage | Delrin conical strain relief over swage | Coil-type strain relief | Modulus based strain relief | Filleting | reduce, restrict or prevent bending | |

Preferred embodiments of connectors may meet the following operational criteria set forth in TABLES 4, 5 & 6.

TABLE 4

| Environmental condition | Example 1 | Example 2 | Example 3 | with additional features |
| --- | --- | --- | --- | --- |
| Temperature | −40 to 400 F | 50 to 150 F | −40 to 400 F | −40 to 600 F |
| Vibration/shock | 500 g's, | 250 g's, | 500 g's, | 500 g's, |

TABLE 4-continued

| Environmental condition | Example 1 | Example 2 | Example 3 | with additional features |
| --- | --- | --- | --- | --- |
| Pressure | 50 psi | 500 psi | 500 psi | 3000 psi |
| Relative Humidity | 0-100% | 0-100% | 0-100% | 0-100% |

TABLE 5

| Performance metric | Example 1 | Example 2 | Example 3 | with additional features |
|---|---|---|---|---|
| Average Power | 0-10 kW | 0-20 kW | 0-30 kW | 0-50 kW+ |
| Wavelength | 1060-1100 nm, 1450-1600 nm, other possible | 1060-1100 nm, 1450-1600 nm, other possible | 1060-1100 nm, 1450-1600 nm, other possible | Broad range |
| Backreflection | 10 watts | 500 watts | 1 kW | >1 kW |
| Instantaneous power density | 100 MW/cm$^2$ | 500 MW/cm$^2$ | 1 GW/cm$^2$ | 1 GW/cm$^2$ |

TABLE 6

| Operation Metric | Exh. 1 | Exh. 2 | Exh. 3 | benefit from additional features |
|---|---|---|---|---|
| temperature rise per power | 3 degrees C./kW | 1.5 degrees C./kW | 1 degree C./kW | .1-5 degrees C./kW |

Preferably, to reduce or eliminate points where stress can be induced into the optical components, the edges or corners of such components should have radii on them as opposed to having a sharp angle.

Figure 31A:
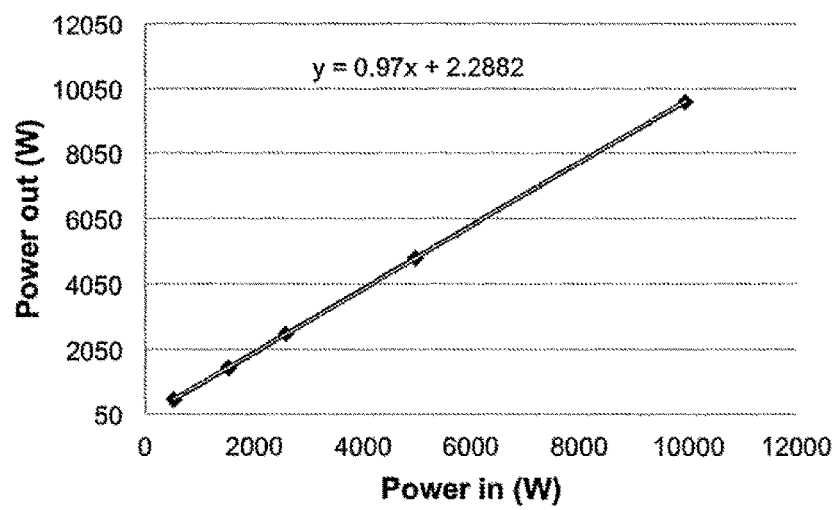
FIGS. 31A-31C are graphs of performance data for an embodiment of a connector in accordance with the present invention.
Figure 31B:
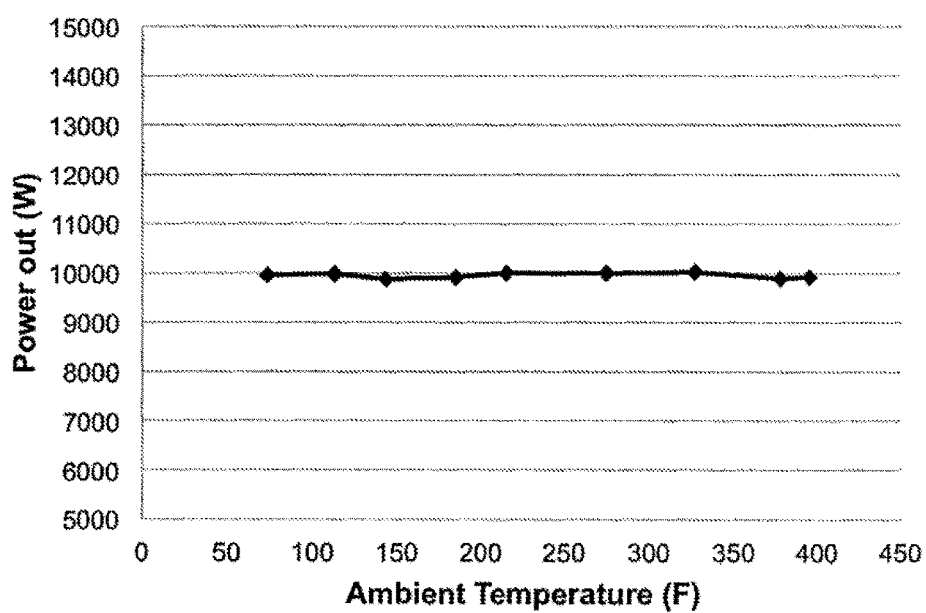
Figure 31C:
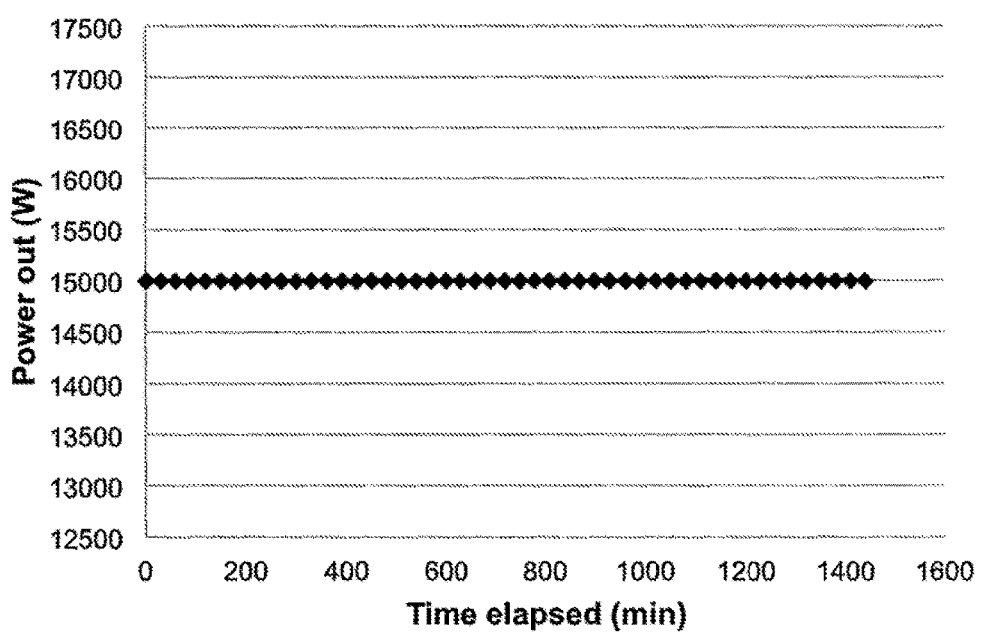

The present connectors are capable of withstanding high laser powers in, for example, the environmental and operational conditions that may be present during laser drilling, workover and completion operations, salvage operations, and mining operations. These connectors may also function together as a system to couple two high power fibers optically together. Thus, for example, as provided in the graphs of FIGS. 31A to 31C, an embodiment of a connector of the present invention transmits laser power with virtually no losses, over a wide range of powers, at 500-1,000 psi inlet pressure. FIG. 31A is a graph of laser power out vs power in through an embodiment of a connector at 500-1,000 psi external pressures. FIG. 31B is a graph of laser power out vs time for an embodiment of a connector tested at 10 kW input power over varying temperatures. FIG. 31C is a graph of laser power out vs time for an embodiment of a connector tested at 15 kW input power for a 25 hour continuous period. This connector and other embodiments are capable of operating over greater pressures, pressure ranges, temperatures and durations.

As shown in the graph of FIG. 31B, an embodiment of the connector is operated over a wide range of temperatures, e.g., at least 100° to 400° F. without failure. This connector, and other embodiments, may be capable of operating over greater temperatures and larger temperature ranges.

As shown in the graph of FIG. 31C, an embodiment of a connector can operate at higher powers for extended periods of time, for example, an embodiment is operated at 15 kW for 1,500 minutes (i.e., 25 hours). In this test the connector transmitted 15 kW of power continuously for about 25 hours, without failure. This connector and other embodiments may be capable of operating at greater powers and over longer time periods.

Figure 32A:
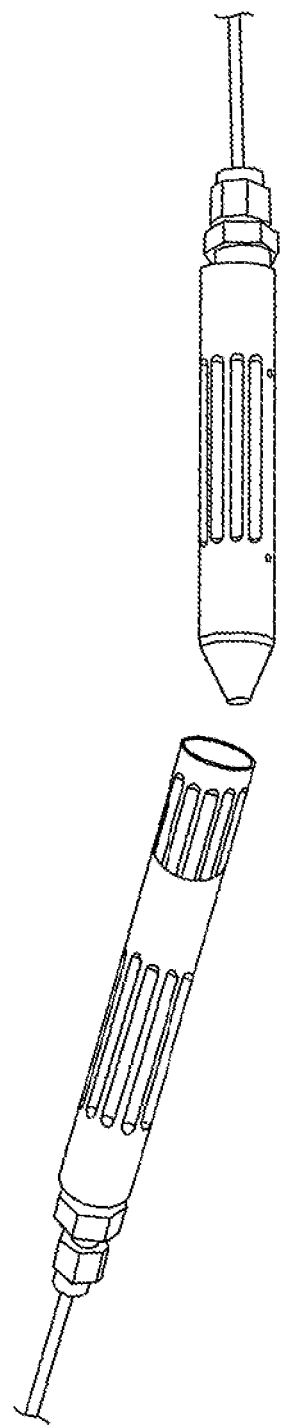
FIG. 32A is a perspective view of a disconnected fiber-to-fiber coupling assembly in accordance with the present invention.
Figure 32B:
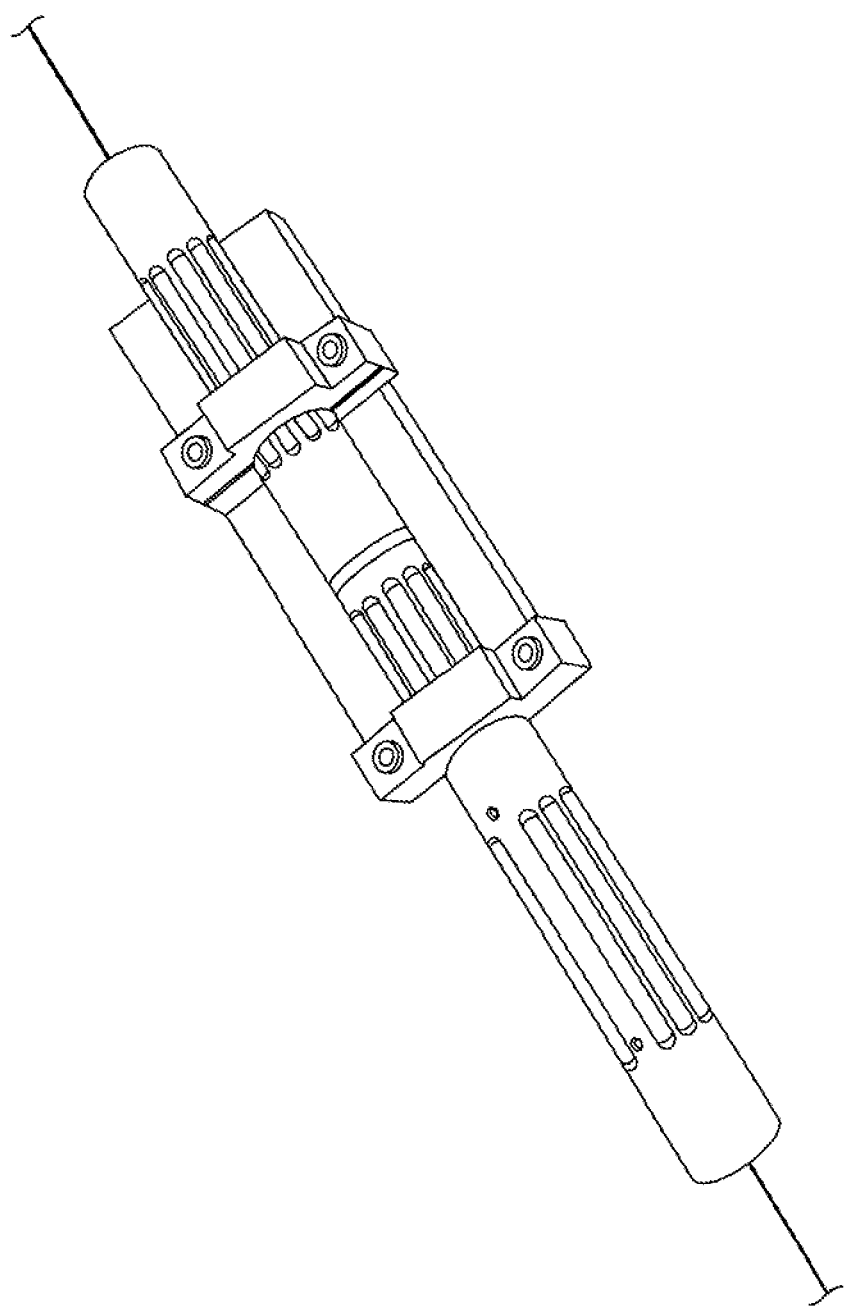
FIG. 32B is a perspective view of the embodiment of FIG. 32A connected in accordance with the present invention.
Figure 33A:
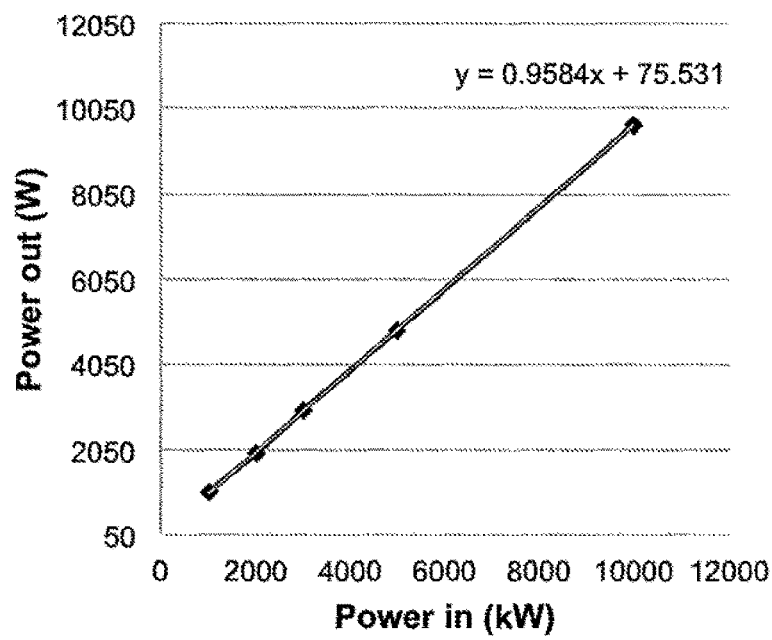
FIGS. 33A-33B are graphs of performance data for the embodiment of FIGS. 33A and 33B in accordance with the present invention.

Embodiments of the connectors, as shown in FIGS. 32A and 32B and for example in FIGS. 17-19, can function as a detachable, and a detachable/re-attachable fiber-to-fiber coupler, fiber-to-tool coupler or both. Thus, by way of illustration two embodiments of two connectors were coupled together as shown in FIG. 32B and laser energy is transmitted through this system as provided in the graph of FIG. 33A.

The connectors, and their associated fibers, are then detached from each other, as shown in FIG. 32A and then reattached, as shown in FIG. 32B. No repair, modification or other procedures are needed to be performed on the connectors during detachment and reattachment.

Figure 33B:
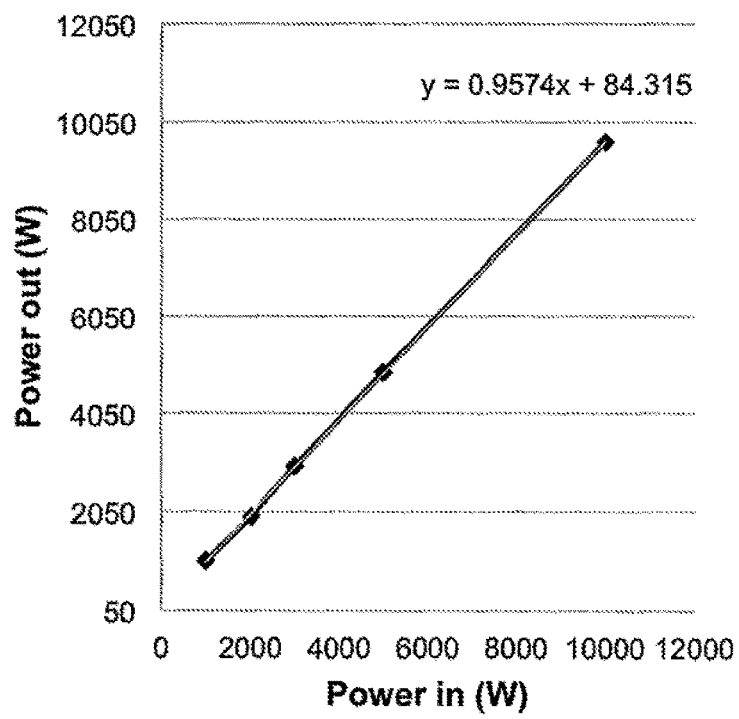

The reattached system transmits laser energy, without substantial losses, as provided in the graph of FIG. 33B. These embodiments, well as, others are capable of transmitting greater powers of laser energy over longer times.

Figure 22A:
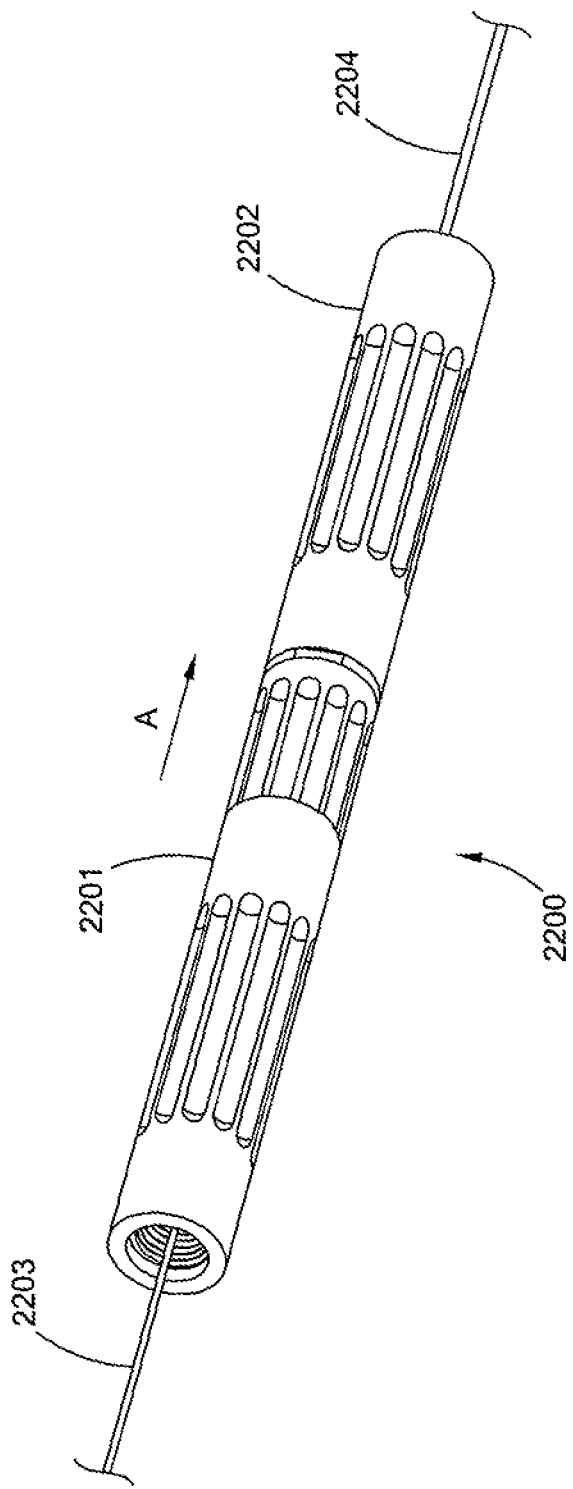
FIG. 22A is a perspective view of an embodiment of a fiber-to-fiber couplers in accordance with the present invention.
Figure 22B:
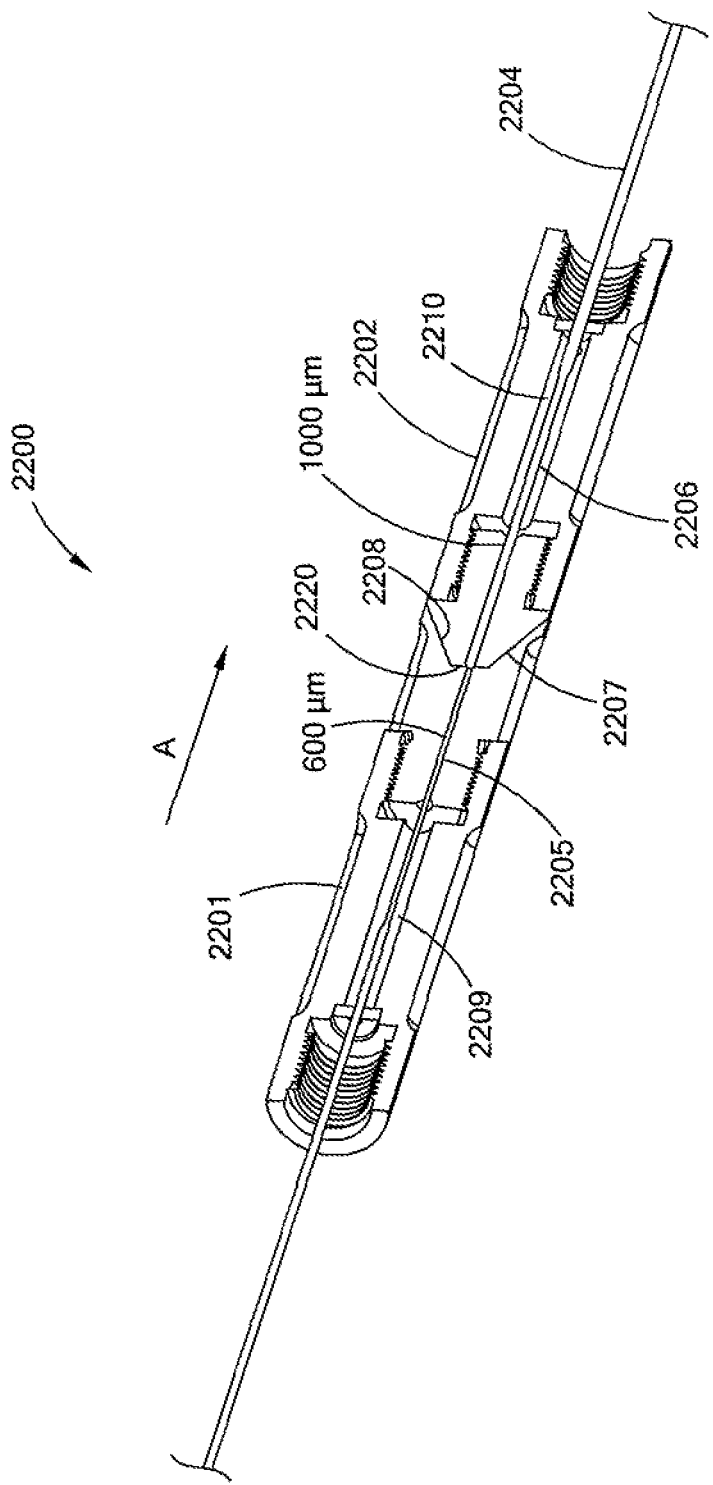
FIG. 22B is a perspective cutaway cross-sectional view of the embodiment of FIG. 22A.
Figure 22C:
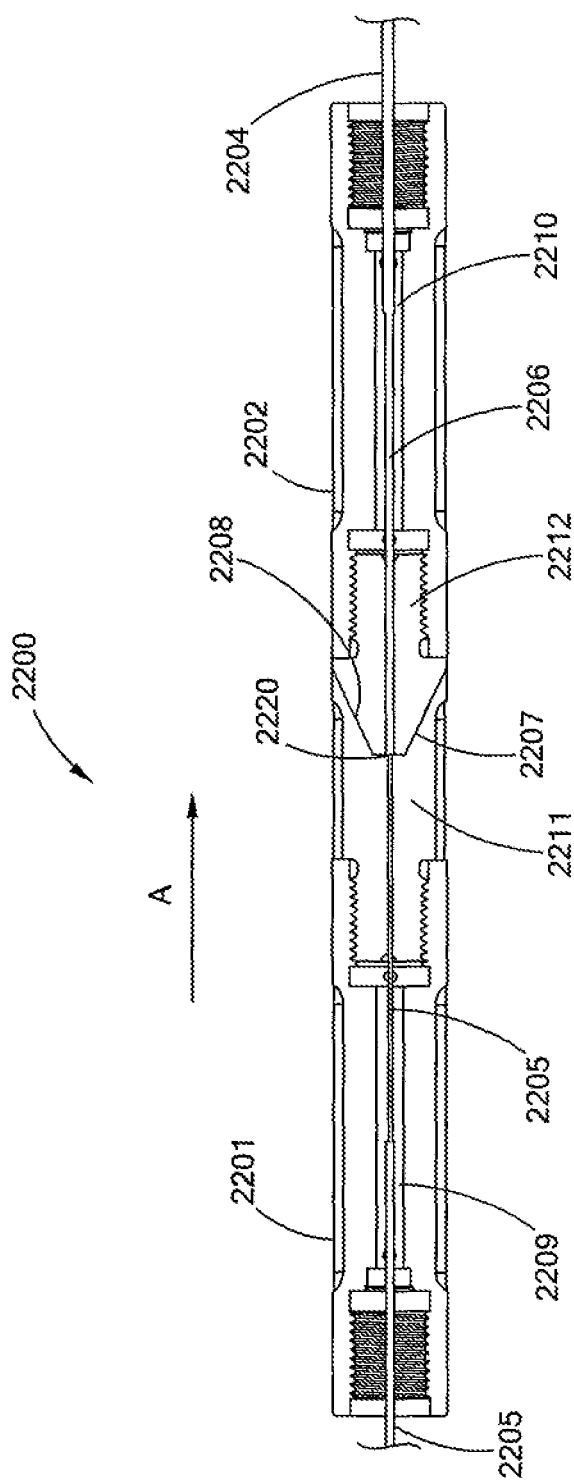
FIG. 22C is a cross-sectional view of the embodiment of FIG. 22A.

More detailed illustrations of the connectors from the forgoing testing, figures and graphs are set forth in FIGS. 22A to 22C. Thus, there is provided a first connector 2201 having a 600 μm core fiber 2203, which enters the connector through the proximal end (the laser beam is traveling in the direction of arrow A). The first connector 2201 is optically and mechanically associated with a second connector 2202, which has a 1000 μm core fiber 2204, which enters the connector through the distal end. The connectors 2201, 2202, each form half of a coupler 2200. FIG. 22B is a perspective cross-sectional view of the coupler 2200 and FIG. 22C is a cross-sectional view of the coupler 2200. The connectors 2201, 2202 have epoxy sections 2209, 2210 that hold and fix the fibers 2203, 2204. Preferably, the fibers 2203, 2204 have any coatings, such as a acrylate coating, removed and in sections 2205, 2206 only have their core and cladding(s). The distal end of connector 2201, has a concave shape 2207, that is configured for mechanical engagement with the convex shape, 2208 of the proximal end of connector 2202. The shapes and components of the mating distal and proximal ends of the connectors are designed to minimize thermal and vibrational effects and thus maintain the relative positions of the ends of the two fibers 2203, 2204 in substantial alignment. The faces of the ends of the two fibers are preferably only a few microns apart. The smaller core diameter fiber face is preferably the distal, or beam launch face, and the larger core diameter fiber face is preferably the proximal, or beam receiving face.

Other shapes for the mating surfaces of the coupler halves may be used. However, it is preferable that the concave shape be used for the coupler half that is least likely to collect debris, e.g., it is on the upper half if the coupler is positioned vertically during connection or disconnection. Additionally, mode strippers may be used, and could be located adjacent the fibers in sections 2211, 2212, in epoxy sections 2209, 2210 or both. For example, the mode stripper may be an etched outer clad of both fibers, it may be an epoxy that is optically transmissive, an epoxy that is capable of managing high heats, an epoxy that is index matched to the cladding and combinations of these. The face of the fibers may preferably be coated with an antireflective coating. The face of the fibers and in particular the face of the launching fiber may be a flat face, for example from cleaving the fiber, it may be polished, or it may be other shapes, for example it may have a predetermined shape to provide or affect the beam in a predetermined manner, such as a sphere, a curve, or to function as a lens or other optic that shapes, affects or both the properties of the laser beam.

Figure 34:
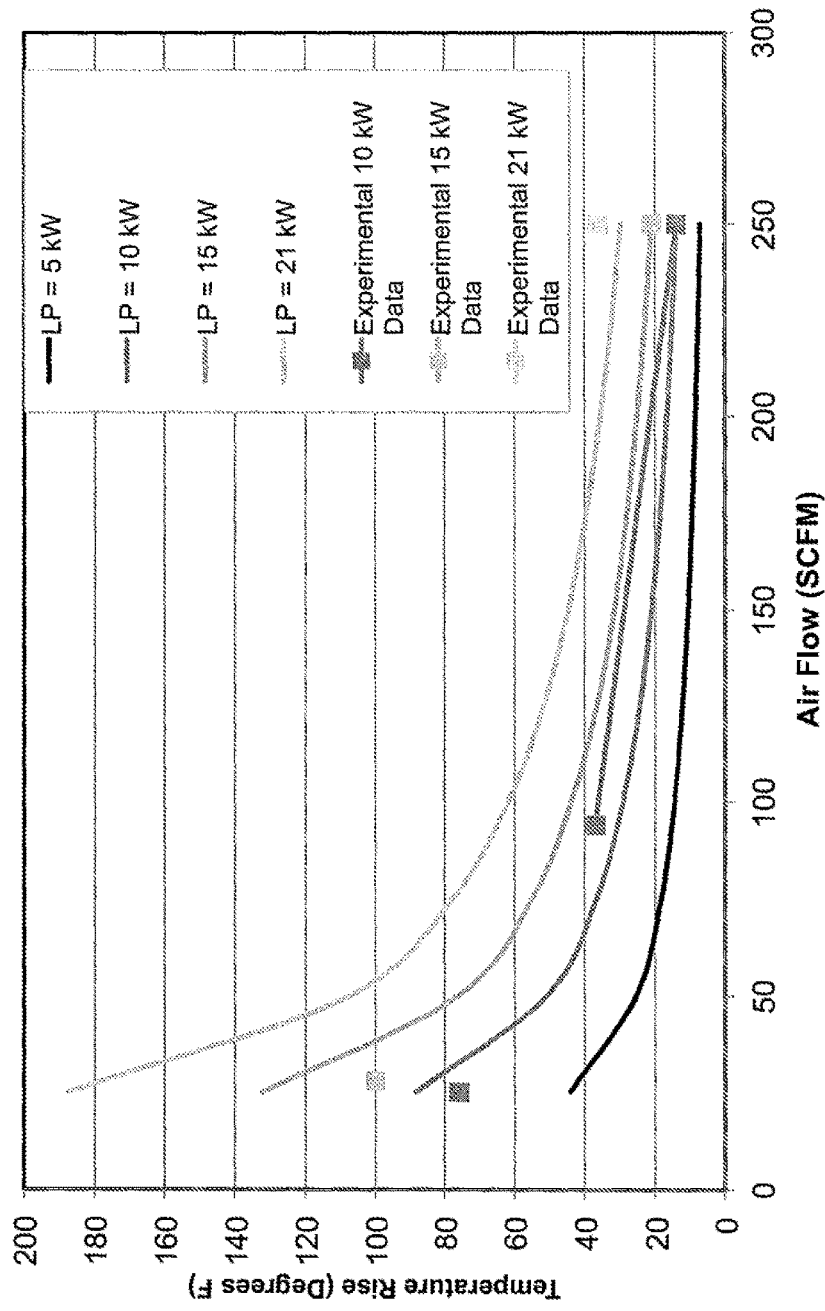
FIG. 34 is a graph of performance data for an embodiment of a connector in accordance with the present invention.

Embodiments of the present connectors can transmit higher levels of power over extended periods of time without incurring substantial temperature increases. For example an embodiment of a connector transmitted over 20 kW of power, with minimal temperature increases. In this example, the connector was inserted into an optics assembly having an optics package of the general type shown in U.S. provisional patent application 61/446,040. Laser energy was transmitted through this system, with the beam being fired at a beam dump (graphite for some tests and dolomite for others). As provided in the graph of FIG. 34, airflow over the assembly, (passive, not active cooling) was controlled and the temperature rise of the assembly observed at various laser powers.

It can be seen from this graph that even at very low air flow (about 25 scfm) and at 21 kW of laser power, the optics assembly only had about a 180° F. rise in temperature. Additionally, at lower flows, about 100 scfm, for all laser powers, including 21 kW, the rise in temperature is well below 100° F. In these tests the connector exhibited substantially smaller temperature rises than the optics assembly.

Some embodiments of the present connectors may utilize total internal reflection ("TIR") in some or all of the optical path components, in addition to the optical fiber, which utilizes TIR to transmit the laser beam. Additionally, HR coating may be used on surfaces of the optical path components to provide, for example the capability to create predetermined and specific reflected laser beam paths. Thus, in general, and for example, there are provided shapes and configurations of optical components such as the optical or quartz block at the face end of the connector, that in part or in whole, provide for TIR, within the quartz block. There are also other optical components, or components associated with the optical path, that exhibit TIR, for example a back reflection chamber, may be used. Such TIR features or capabilities, address (e.g., manage, handle, or mitigate some, most, or all adverse effects): back reflections that may enter the face of the connector from the work piece, work surface or work environment; forward propagating cladding modes that may be launched from a fiber's cladding in the forward direction; and combinations and variations of these. Preferably, in these TIR connector embodiments the forward propagating high power laser beam does not strike the TIR surfaces of the quartz block, to preserve beam quality. In general, the back reflection chamber, which is referred to as a "chamber" because its optical function can be envisioned as being like a chamber in an optical element that has one, two or more surfaces, having predetermined angles, areas and configurations, and some or all of which exhibit TIR properties for the desired or anticipated laser beam paths and wavelengths. These back reflection chambers may be in optical association with the quartz block in a manner that may further utilize, or contribute to the TIR features or capabilities of the connector.

Preferably in the TIR optical block embodiments of the present connectors, the back reflection chamber is optically and mechanically bonded to the surface of the optical block, in a manner that enables them to function as a single optical element. Further, the optical block and back reflection chamber may be a single unitary element, several elements that are bonded together to form an integral element, several elements (which individual components may be held in optical association by mechanical or other forces), separate components, e.g., separated by free space, and combinations and variations of these.

Generally, and unless contradictory or expressly stated otherwise, the above teachings and disclosures regarding CTE matching, thermal management, vibration management, cleanliness, materials selection, optical cable configurations, and other factors and considerations in the design construction and configuration of the present connectors may be used or applied to the TIR connectors. In the TIR connectors, by way of example, the optical or quartz block may be essentially cylindrical in shape, having protruding members, ear like structures, that are referred to as "ears" at its tail end, i.e., the other side from the optical blocks face (e.g., closest to the tail end of the connector, which may preferably, although not necessarily, also be closest to the laser source, and thus would be the proximal end). Other shapes of the quartz block in addition to cylindrical, which configurations provide for TIR may be utilized. Although referred to as a quartz block, the block may be made from other materials that are taught and disclosed above, in U.S. Patent Application Ser. No. 61/493,174 the entire disclosure of which is incorporated herein by reference, and that are known or may become know to those of skill in the art. The back reflection chamber may be made from similar types of optical materials, and preferably may be made from the same, or substantially the same, material as the optical block.

Figure 29:
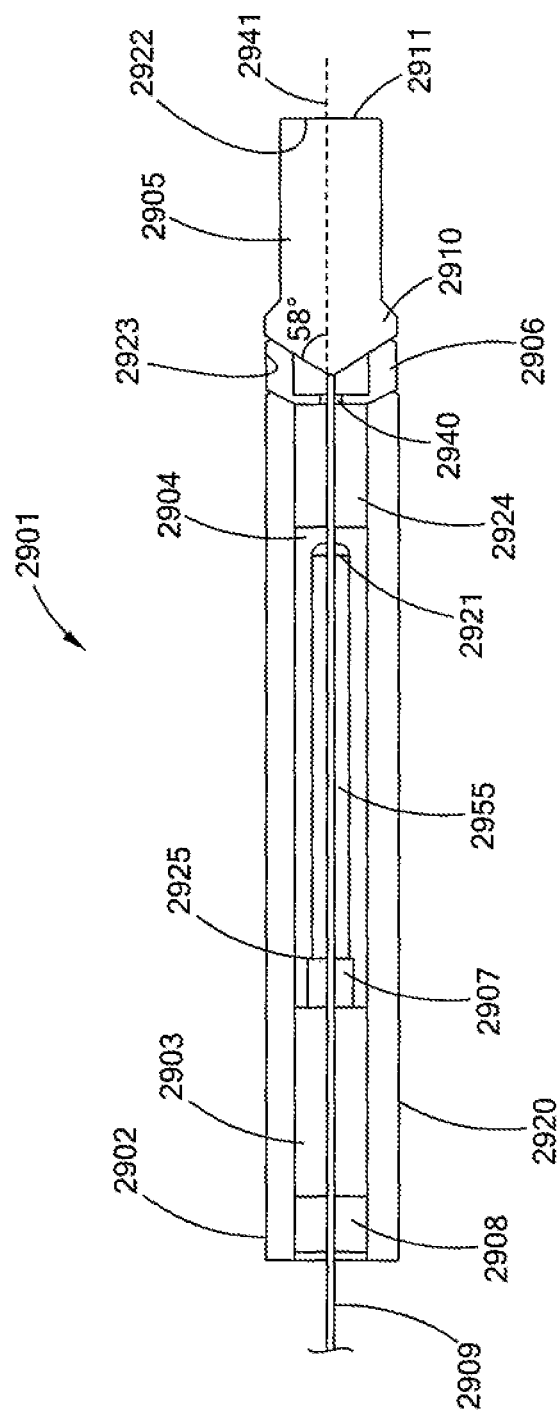
FIG. 29 is a cross-sectional view on a fifteenth embodiment of a connector in accordance with the present invention.

The angles, shape and configuration of the ears may provide for alignment and the management of thermal changes, in addition to TIR. In one preferred embodiment the ears form a back surface of the optical block, which is conical in nature and has an angle from about 15 to about 90 degrees and preferably has an angle of about 58° with the axis of the optical fiber or the beam path through the optical fiber and block (as used herein the "angle" referred to would be the same as the half angle for the cone, thus, the angle referred to herein is from one side of the cone to the central axis, as illustrated in FIG. 29). In this preferred embodiment the back reflection chamber has a conical surface configured to optically mate with the conical back surface of the optical block. Thus, this surface would form a cone having an angle e.g., 122 degrees that is supplementary to the optical blocks back surface angle, e.g., 58 degrees. Thus, preferably the configuration of these embodiments may provide for the quartz block to be aligned with the fiber, the structures of the connector and both. Additionally the configuration of the ears allows for locking of the fiber and quartz block relative to a predetermined point of rotation, e.g., the virtual focus, e.g., the point of rotation for which no radial misalignment will be incurred on the exiting beam from the face of the connector. For example, the virtual focus may be the focal plane of the optic intended to receive the light exiting the connector in the absence of any other optical elements in between the connector and the optic intended to receive the light.

Thus, by way of example, the angle in the embodiment of FIGS. 30, 30A to 30I, for surface 3007 is 58 degrees, and the angle for surface 3006 is 45 degrees with respect to the axis of the fiber and block. The 45 degree angle may range from 15 to 90 degrees. Further, other surfaces and angular configurations may be utilized depending on intended or predetermined light paths for, e.g., back reflections and cladding mode light.

Generally for the connectors, including TIR connectors, the selection of materials, configurations and components may take into consideration factors, such as, for example, sensitivity to contamination, alignment tolerances, ease of assembly, handling or addressing of back reflections, temperature robustness, handling of cladding modes, sensitivity to vibration, sensitivity to pressure, and monitoring and control.

Regarding the sensitivity to contamination factor, attributes such as, for example, material selection, the use of abrasion resistant coatings, the size of components, the use of isolation seals, the geometry for access of cleaning, the types of optical coatings, minimizing the number and area of sliding surfaces, the optical damage threshold for the components along the optical path, and the use of a receptacle seal may be considered. Regarding material selection for optical materials, for example, Suprasil, Infrasil, Low OH fused silica, fluorinated glasses, sapphire, chalcogenide glass, diamond, silicate, fused silica and quartz may be used. For mechanical components factors and features such as, for example, hardness, corrosion resistance, lubricity, out-gassing, surface finish, and weldability may be considered, thus, leading to the use of materials such as, for example, hardened stainless steel, ceramic titanium, and beryllium cooper. Regarding abrasion resistance for mechanical surfaces, for example, the following may be considered or utilized: copper plating, hard gold plating, nickel plating, the use of fluoropolymers, shot peening, various surface finishes, and non-metal coatings. Regarding the size of components, for example, the exit or face of the quartz block can have a diameter of about 0.6 mm to 100 mm, preferably about 5 mm to 100 mm, the entrance to a pressure window may have a diameter of about 0.6 mm to about 100 mm, preferably about 5 mm to 100 mm, the exit from a pressure window may have diameter of about 0.6 mm to about 100 mm, preferably about 5 mm to 100 mm, and an integral lens may have a diameter from about 0.6 mm to about 100 mm, preferably about 5 mm to 100 mm. Isolation means, such as seals, such as, for example, a c-ring, a weld, a braze, an o-ring, tapered threads, metal to metal, epoxy, optical contacting, glass welding, and gaskets may be used. For optical components within the optical path the optical damage threshold should be, for example, from about 10 kW/cm$^2$ to about 300 MW/cm$^2$; and the optical damage threshold for any coatings used within or near the optical path should be, for example, from about 10 kW/cm$^2$ to about 300 GW/cm$^2$. Optical coatings that may be used, for example, would include, IBS coatings such as magnesium fluoride, electron beam coatings such as silicon dioxide, sputter coatings such as tantalum pentoxide, oxide coatings such as titanium dioxide, and metallic coatings.

Regarding the alignment tolerances factor, attributes such as, for example using substantially kinematic holding or fixing techniques, using radial springs, the interaction length of components, the tolerances of optical components, the CTE of materials, the use of biasing elements, and the use of an alignment sleeve may be considered. Regarding kinematic holding techniques, for example, predetermined geometric configurations may be used at, or relative to predetermined locations within or on the connector to meet intended tolerances, such as axial, radial, and angular (e.g., the location of the center of rotation). Thus, for example: a sphere in a cone geometric configuration may be used relative to the fiber face, or more preferably to the virtual focus of the fiber; a cone in a cone geometric configuration may be used relative to the fiber face, or more preferably to the virtual focus of the fiber; three balls geometric configuration may be used relative to other features of the connector; a cone in a torus geometric configuration may be used relative to the receptacle; a cylinder in a groove geometric configuration may be used relative to the center of gravity; a cylinder in a cylinder geometric configuration relative to a force may be used; a sphere on a flat geometric configuration relative to temperature gradient effects may be used; and a flat on a flat relative to other components may be used. Regarding the use of radial springs performance considerations such as, for example, a spring rate from about 0 lbf/in to about 10,000 lbf/in, a deflection amount from about 0 mm to about 5 mm may be preferred. Radial spring types may include, for example, a j-ring, a c-ring, a v-ring, an o-ring, an e-ring, mechanical flexure devices, magnetic bearings, and elastic amorphous materials. Regarding the tolerances of optical components, for example: an axial tolerance of from about 100 nm to about 5 mm for the fiber to receptacle location; a radial tolerance of from about 100 nm to 2 mm for the fiber to the connector alignment external point; and an angular tolerance of about 100 nradians to 100 mradians for the fiber to quartz block location may be used. Preferably, and by way of example the CTE for materials used in the connector may be from about −8*10"$^6$/K to about 100*10"$^6$/K. Regarding the biasing element, which may be a spring, the spring rate may be for example from about 0 lbf/in to about 500 lbf/in, the deflection amount may be from about 0 in to about 4 in. The spring types may be, for example, helical, a wave, a belleville, an elastic amorphous material, a magnet, a flexure, a hydraulic spring, and a pneumatic spring. Regarding the alignment sleeve, the sleeve may provide active alignment and may have the same geometric configuration and relative locations as with the kinematic features.

Regarding the ease of assembly factor, attributes such as, for example, the use of UV cure epoxy resins, fast cure epoxy, heat cure epoxy, evaporative cure epoxy, and chemical cure epoxy may be considered. Preferably, for example, such epoxies should have a shear strength of about 10 psi to about 5,000 psi, a compressive strength of from about 10 psi to about 60,000 psi, and optical properties from about 0 to about 99.9% transmission for a predetermined wavelength or wavelength range.

Regarding the handling of back reflections factor, attributes such as for example, the geometry, the material types and the coatings as described herein may be used. Regarding the gap between optical components that are opto-mechanically joined together, preferably and for example, the surfaces before being joined should have a surface finish of from about 1 Angstrom to about 50 microns RMS. For the completed joint, preferably and for example: the damage threshold for the joint should be from about 10 kW/cm$^2$ to about 30 MW/cm$^2$; the transmission for a predetermined wavelength, or wavelength range, should be from about 0 to about 99.99%, or greater; and the operating temperature range should be from about −100 C to about 2,700 C. The types of bonding that may be used for example to form the joint are: chemical assisted bonding, such as hydroxide catalysis, sodium silicate; diffusion bonding; friction bonding. Preferably the materials on both sides of the joint are index matched, or have predetermined indices to provide a predetermined optical feature, performance of beam path.

Preferably, materials should be selected to reduce, minimize and, most preferably, avoid any out-gassing during the operation, or under intended operating conditions of the connector. Further to the extent that materials that may, or will, exhibit out-gassing are used, those materials should preferably be removed from or isolated from the optical components and the beam path.

Regarding the temperature robustness factor, attributes such as for example a lack of organic materials, the above discussed avoidance of out-gassing, the selection and addressing of CTE as discussed herein, the geometry of the components, e.g., avoiding interference and excessive clearance over predetermined temperature ranges and gradients as well as having thermally conductive paths between heat sinks and heat loads, having a single sliding interface to control the effects of thermal expansion, selecting high temperature high strength materials, e.g., for housings and bodies have a material that is greater than 100 ksi yield strength @ 100° C., the use of composite metals, the use of explosively welded metals, and other high strength high temperature materials, the passive cooling fin construction, e.g., the use of a metal composite and the use of thermal conduction rods, may be considered.

Regarding the handling of cladding modes factor, attributes such as for example the use of a reflective coating or TIR on selected surfaces of the optical block, such as, for example, on the outer side surface, and the stripping of various layers of the fiber as it transition through the connector, for example the removal of the hard clad and the use of mode strippers may be considered, as well as the attributes regarding the handling of back reflections factor.

Regarding the sensitivity to vibrations factor, attributes such as, for example, mass, location of the center of mass, location of center of mass relative to the fiber face, or the back reflection chamber, having optical contact joints preferably having a high yield strength, for example, and preferably, of from about 100 psi to about 1000 ksi, may be considered as well as the attributes regarding the alignment tolerances may be considered.

Regarding the monitor and control factor, attributes such as, for example, a thermal switch (e.g., having a tripping temperature selected of from within the range of about 40 C to about 400 C), an RTD (e.g. having a temperature sensitivity selected from within the range of from about −100 C to about 800 C), a position interlock, a continuity interlock, and a pressure interlock (e.g., having a pressure sensitivity selected from within the range of from about 0 psi to about 50,000 psi) may be considered.

Figure 23:
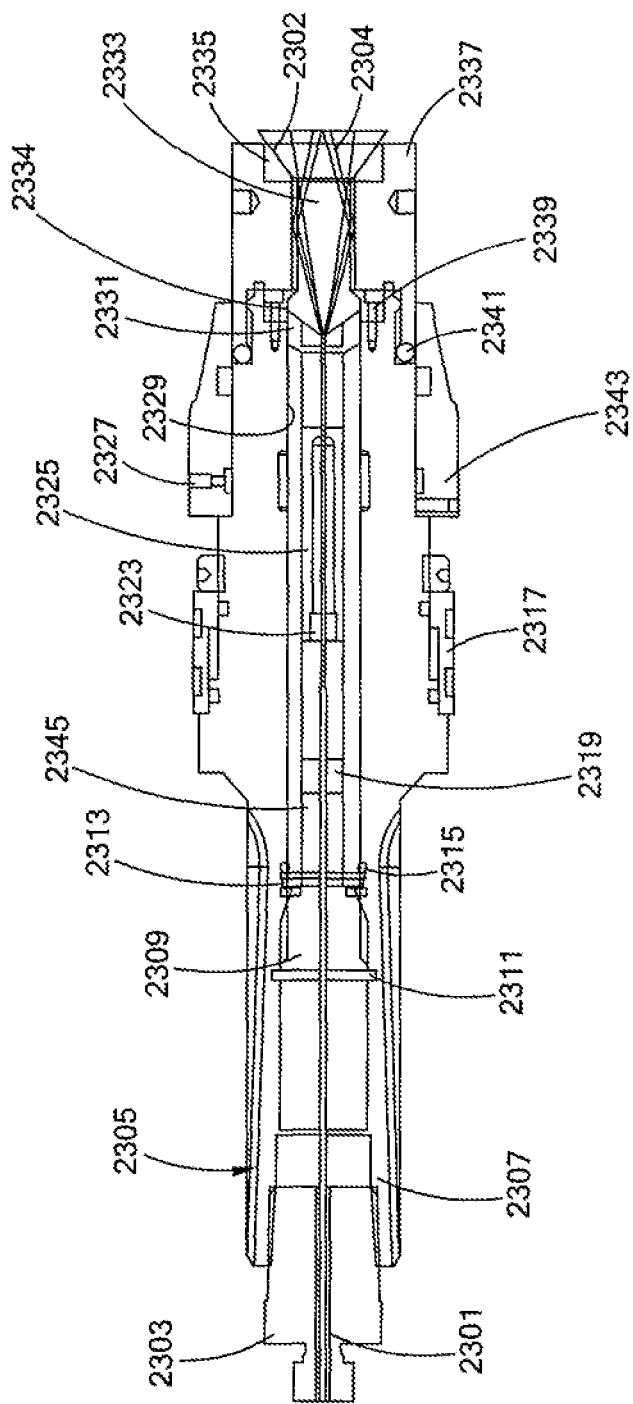
FIG. 23 is a cross-section of a ninth embodiment of a connector in accordance with the present invention.

Turning to FIG. 23 there is provided an embodiment of a connector having a back reflection chamber. Thus, there is provided a high power laser cable 2301, which may be an optical fiber in a metal tube ("FIMT"), or may be any of the other configurations for laser cables provided herein, or otherwise known to the art. A tail end fixing and sealing means 2303, which may be a SWAGELOK or may be any of the other configurations provided herein, or otherwise known to the art. The fixing and sealing means 2303 fixes and seals the laser cable 2301 to the connector body or housing 2307. The body 2307 has cooling fins 2305 (and may have one, two, three, or more of such fins). Within the body 2307, there is a retaining ring 2311, a spring stopper 2309, a preload spring 2313, a centering o-ring 2315, a first (e.g., back, tail or proximal) adhesive dam 2319, a highly reflective ("HR") capillary 2345, which has an HR surface 2329. There may also be a second (e.g., front, or distal) adhesive dam 2323, a glass spacer 2325, and an epoxy injection port 2327. The space between the first dam 2319 and the second dam 2323 within the capillary 2345 is filled with epoxy to fix or otherwise bond the optical fiber. The connector may have a quartz or optical block 2333, having ears 2334, and having a tail end surface, which may also be a part of the ears. This tail end surface, (e.g., proximal surface, or back surface), is configured to join to, and form an optical association with the back reflection chamber 2331. The connector also may have a continuity interlock 2317, an alignment sleeve 2343, an o-ring 2341, a quartz block retaining flange 2339, a pressure window housing 2337, and a pressure window 2335. In FIG. 23, examples of ray traces for the laser beam are provided, with ray traces 2302 illustrating forward propagating light from the core of the fiber, and ray traces 2304 illustrating, back reflected light, forward propagating cladding mode light, and combinations and variation of these.

Thus, in general, in operation the shape, composition, and arrangement of contacting surfaces for the quartz block and back reflection chamber, are predetermined for a particular wavelength laser beam and optical fiber, (and may also be based upon an optics assembly to be associated with the connector), as well as other factors, in a manner that gives rise to TIR in the combined quartz block back reflection chamber optical structure that reflects at least about 90%, at least about 95%, at least about 99%, and at least about 99.99%, or more, of all back reflected light in the forward propagating direction, and thus back out the face of the connector and in the general direction of, or along a beam path toward, the work piece or work site. Further, in general in operation the shape, composition, and arrangement of contacting surfaces for the quartz block and back reflection chamber, are predetermined for a particular wavelength laser beam and optical fiber in a manner that gives rise to TIR in the combined quartz block back reflection chamber optical structure that reflects at least about 90%, at least about 95%, at least about 99% and at least about 99.99% or more of all forward propagating cladding mode light in the forward propagating direction, and thus out the face of the connector and in the general direction of, or along a beam path toward, the work piece or work site.

Figure 24:
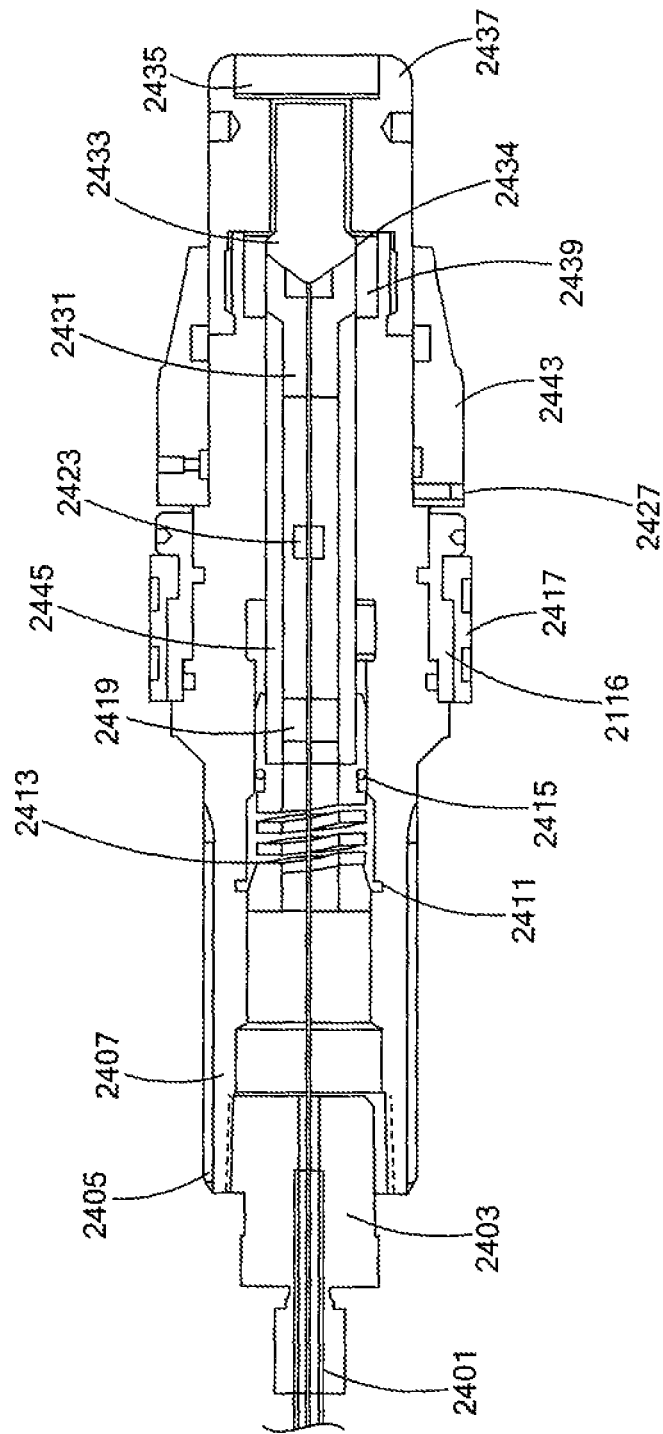
FIG. 24 is a cross-section of a tenth embodiment of a connector in accordance with the present invention.

Turning to FIG. 24 there is provided an embodiment of a connector having a back reflection chamber. Thus, there is provided a high power laser cable 2401, which may be an optical fiber in a metal tube ("FIMT"), or any of the other configurations for laser cables provided herein, or otherwise known to the art. A tail end fixing and sealing means 2403, which may be a SWAGELOK, or other suitable device. The fixing and sealing means 2403 fixes and seals the laser cable 2401 to the connector body, or housing 2407. The body 2407 has cooling fins 2405 (and may have one, two, three, or more of such fins). Within the body 2407, there is a retaining ring 2411, a preload spring 2413, a centering o-ring 2415, a first (e.g., back, tail or proximal) adhesive dam 2419, a highly reflective ("HR") capillary 2445. There may also be a second (e.g., front, or distal) adhesive dam 2423 and an epoxy injection port 2427. The space between the first dam 2419 and the second dam 2423 within a capillary is filled with epoxy to fix or otherwise bond the optical fiber. The connector may have a quartz or optical block 2433, having ears 2434, and having a tail end surface, which may also be part of the ears, that is configured to join to, and form an optical association with the back reflection chamber 2431. The connector also may have a continuity interlock 2417, a thermal switch 2416, an alignment sleeve 2443, a press-fit quartz block retainer 2439, a pressure window housing 2437, and a pressure window 2435.

Figure 25A:
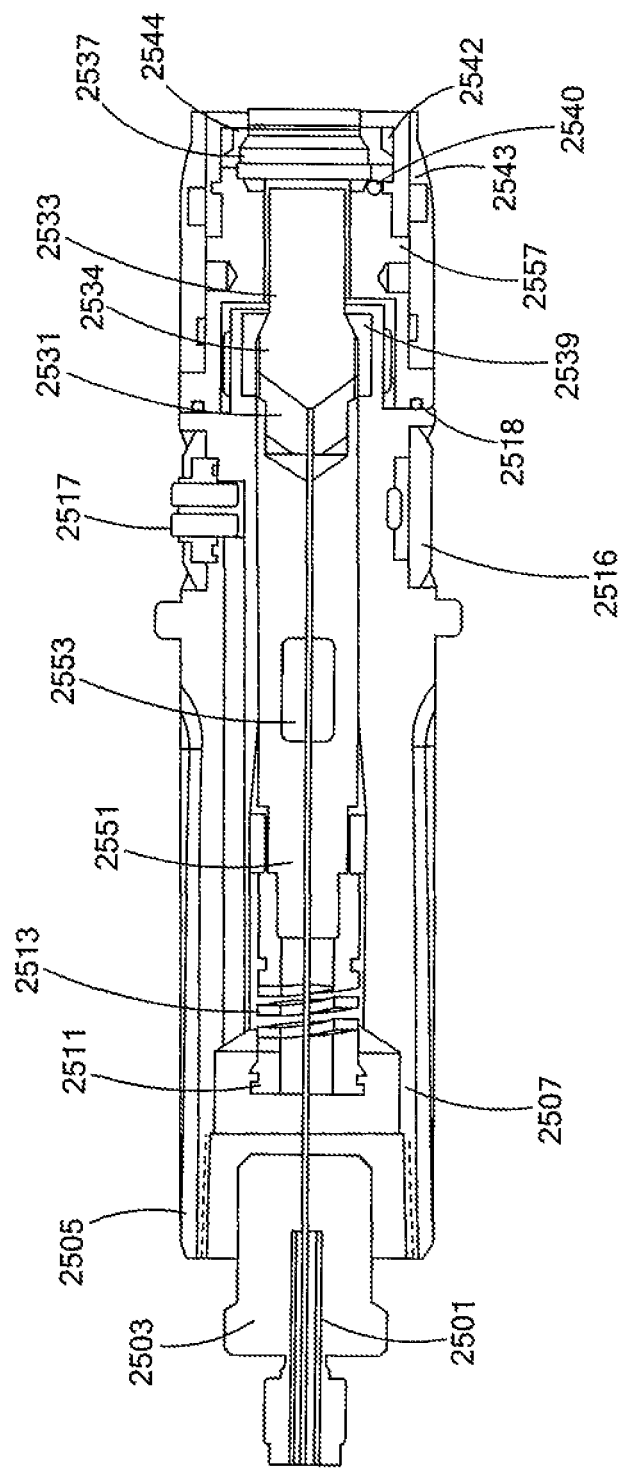
FIG. 25A is a cross-section of an eleventh embodiment of a connector in accordance with the present invention.
Figure 25B:
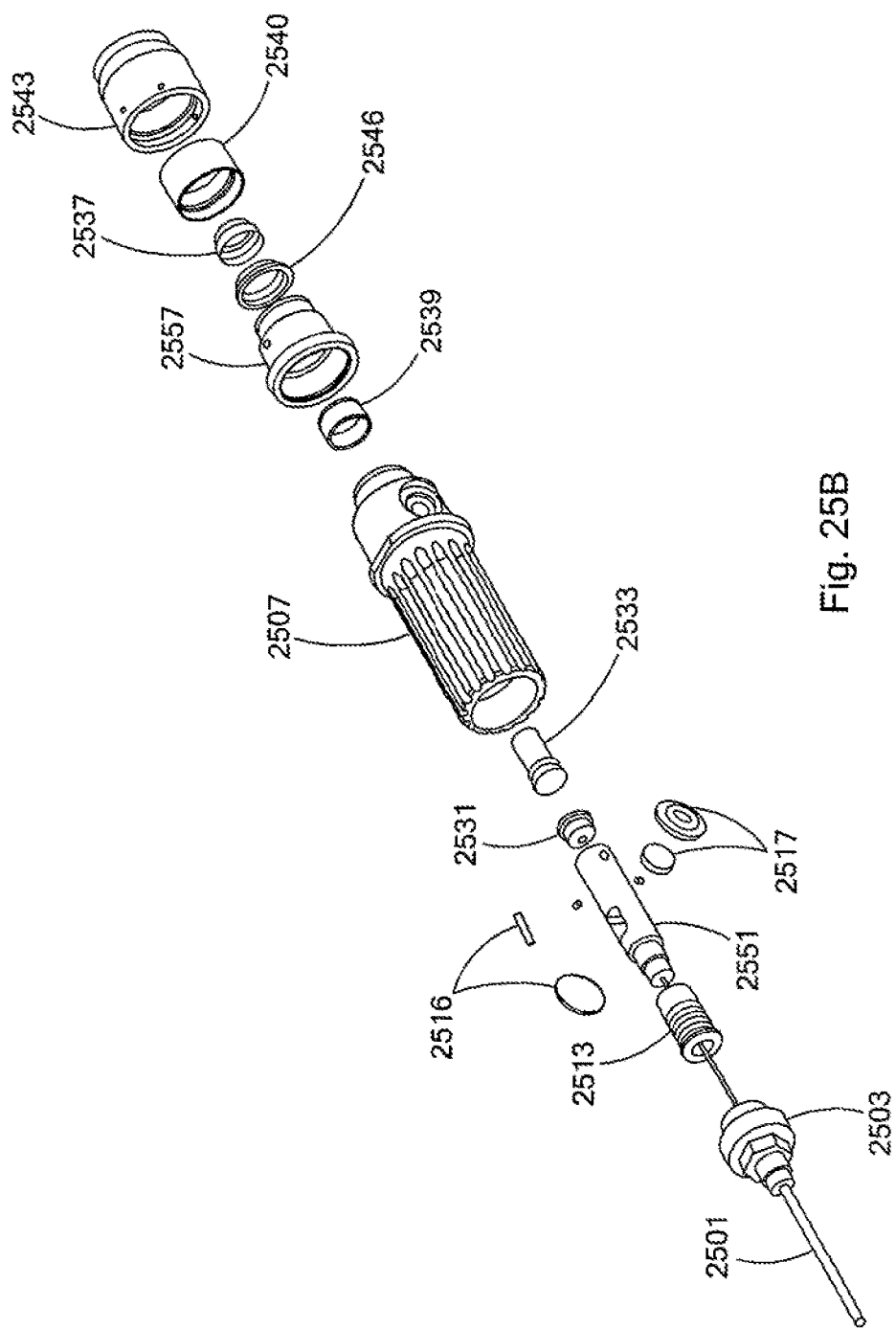
FIG. 25B is an exploded view of the embodiment of FIG. 25A.
Figure 25C:
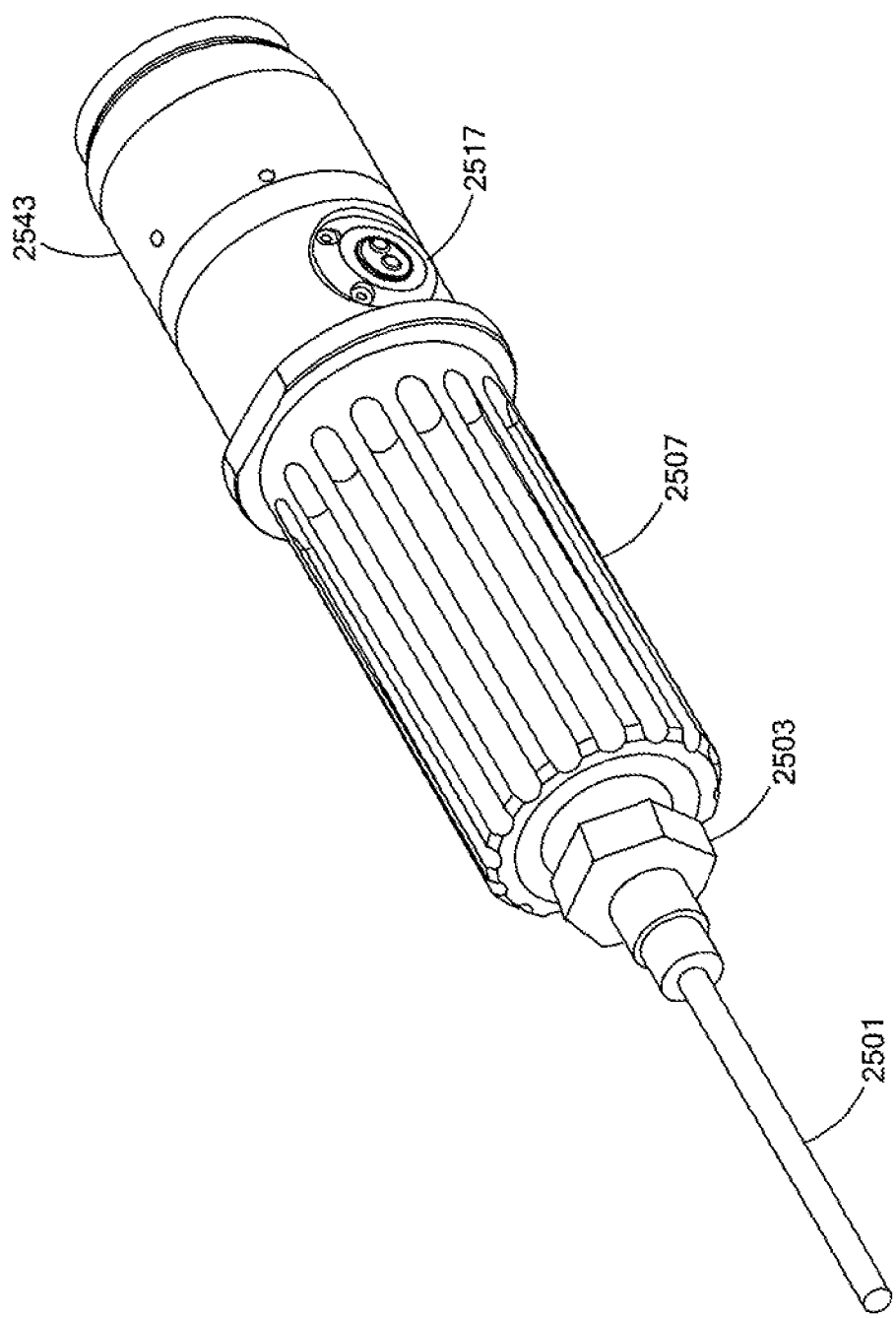
FIG. 25C is a perspective view of the embodiment of FIG. 25A.

Turning to FIGS. 25A to 25C, there is provided an embodiment of a connector having a back reflection chamber. FIG. 25A is a cross-sectional view of the connector. FIG. 25B is an exploded perspective view of the components of the connector. FIG. 25C is a perspective view of the connector. Thus, there is provided a high power laser cable 2501, which may be an optical fiber, an optical fiber in a metal tube ("FIMT"), or any of the other configurations for laser cables provided herein, or otherwise known to the art. A tail end fixing and sealing means 2503, which may be a SWAGELOK, or other suitable device. The fixing and sealing means 2503 fixes and seals the laser cable 2501 to the connector body, or housing 2507. The body 2507 has cooling fins 2505 (and may have one, two, three, or more of such fins). Within the body 2507, there is a retaining ring 2511, a preload spring 2513, a glass ferrule 2551, and an epoxy chamber 2553. The connector may have a quartz or optical block 2533, having ears 2534, and have a tail end surface, which may also be a part of the ears. The tail end surface is configured to joint to, and form an optical association with the back reflection chamber 2531. It should be noted that in this embodiment, as compared to the embodiment of e.g., FIG. 24, substantially the entire tail-end surface of the quartz block 2533 is in contact with substantially the entire face-end surface of the back reflection chamber 2531. The connector also may have a continuity interlock 2517, a thermal switch 2516, which may be a thermistor, an o-ring 2518, a pressure window housing 2557, a press-fit quartz block retainer 2539, an alignment sleeve 2543, a retaining ring 2540, a preload spring 2542, a pressure window 2537, a pressure window ring 2544, and a pressure window retainer 2546.

Referring generally to the embodiments of FIGS. 23, 24, and 25A to 25C, there are shown three embodiments of examples of the back reflection chamber. The term chamber is used in the sense of an optical space, and does not require a specific wall or housing, although such may be present. Because the fiber is within and extends through the chamber, there should be no, or at least de minimis, forward propagating laser light in the back reflection chamber, of these embodiments. Generally, there are multiple ways in which back reflecting light can enter the back reflection chamber from its front, e.g., distal end (the end closest to the face, launch end of the connector).

First, by way of example, light can enter the back reflection chamber without refraction or reflection impacting the beam, or without refraction or reflection essentially, or materially impacting the beam. This may be achieved when the distal end of the back reflection chamber and the proximal end of the quartz block are in optical contact. Second, by way of example, light may pass through the distal end of the back reflection chamber and encounter a surface that results in material refraction and/or reflection, e.g, a refraction of greater than about a 1.45 multiplier from the axis of the laser beam in the fiber. In this situation, the geometry of the back reflection chamber is configured to provide for a predetermined beam profile and/or distribution of the light on the side and proximal surface, or faces of the chamber. Third, by way of example, when the back reflection chamber is for example made of a fused silica, there may be a hole or channel through the chamber, through which the fiber passes. The ID of that channel may or may not be in optical contact, or partial optical contact, with the fiber. In the non-optically contacting embodiment there is a space created, which provides for back reflections to enter the space and then the back reflections may exit the space and enter the back reflection chamber. The configuration and geometry of this space may be configured to address specific back reflection paths. Additionally, other geometries, configurations and means of entry are contemplated and other paths for back reflected light may arise. Thus, for example in these embodiments, there are shown three configurations of side and proximal surfaces of the back reflection chamber for managing the exit, e.g, rejection, of back reflected light from the back reflection chamber. The back reflection chamber may also have ear like structures for alignment, and alignment over thermal variations, like the ears on the quartz block, e.g., the embodiment of FIGS. 25A to 25C.

Turning to FIGS. 26, 27, and 28, there are provided embodiments illustrating various configurations, by way of example, for the optical assembly or optical path components to be affixed to the outer components of the connectors. In FIG. 26 the connector 2601 has a floating (e.g., not fixedly attached) quartz block 2603 and a capillary held by epoxy 2602. In FIG. 27 the connector 2701 has a quartz block that is fixed by a cone 2703 and capillary held by a spring and plug assembly 2702. In FIG. 28 the connector 2801 has a quartz block that is held by a constraining flange 2803 and capillary held by a constraining flange 2802.

Turning to the embodiment of FIG. 29, there is provided an optical assembly, or optical path components, that may be used in a connector housing, in other tools, or without any other components, to launch or receive a high power laser beam. The TIR optical assembly 2901 addresses back reflections and forward propagating cladding mode light, substantially preventing, and preferably preventing all adverse effects of such light, by propagating this light out the face 2911 of the quartz block 2905 in a forward direction along the laser beam path toward a work piece or work surface. The optical assembly 2901, which can be considered a connector, has a high power optical fiber 2909, which could be a single fiber or any of the optical cables provided herein or known to those of skill in the art, entering its tail end. The optical assembly 2901 has a glass ferrule 2902 that has back reflection chamber 2906 on the face end of the glass ferrule 2902, and a quartz block 2905 on the face end of the back reflection chamber 2906. The back reflection chamber 2906, quartz block 2905 and glass ferrule 2902 are mechanically attached or fixed; and quartz block 2905 and back reflection chamber 2906 are mechanically and optically associated or fixed. These components may be a single assembly of components, fixed into an integral component, two, three or more separate components, and combinations and variations of these. The glass ferrule 2902 has an adhesive dam 2908 at its tail end, epoxy 2903 that fixes the optical fiber 2909 to the glass ferrule 2902, and epoxy dam 2907. There is also provided a reflective dam 2904. The back reflection chamber 2906 is in optical and mechanical association with the quartz block 2905. The surfaces, as explained in further detail in the following paragraph, size, and configuration of the back reflection chamber 2906 and quartz block 2905 and ears 2910 provide for TIR for the majority of, and preferably all of any likely back reflections and forward propagating clad modes.

There is provided in the optical assembly 2901 examples of coating configurations for various surfaces. Thus, there is an HR coated 0 degrees surface 2925 on dam 2907, a reflective gold surface 2920 on the outer surface of the glass ferrule 2902, an HR coated 45 degrees surface 2924 on the inner surface of the glass ferrule 2902, an HR coated 0 and 45 degrees surface 2921 of the face of inner chamber or tube 2950, an HR coated 0 and 45 degrees surface 2923 on the inner surface of the back reflection chamber, and a bandpass coated surface 2922 on the front 2911 of the quartz block 2905. The, hole, channel, or space 2940 in the back reflection chamber, through which the fiber 2909 passes, may have its inner diameter coated with a highly reflective (HR) coating. Other configurations of and types of coatings may also be utilized.

The embodiment of FIG. 29 has a cone back face having an angle of 58 degrees, from the axis 2941 of the fiber 2909 and quartz block 2905, which does not inhibit, e.g., is removed from the path of, the forward propagating light launched from the core of the fiber. The back face and polished cylinder surfaces of optical block provides for TIR, which may result in the rejection of cladding modes and back reflections. Preferably the components and structures may have tapered interfaces, which allow the ability to pre-build internal components of the connector with epoxy or other types of bonding and fixing. The HR surfaces in effect create a cavity for the rejection of back reflections, i.e., their reflection, refraction, and combinations there of, to redirect them in a forward direction and out the face of the optical block and connector. The cavity, formed by surface 2921 and 2924 in back of the back reflection chamber 2906 further rejects low angle light that may breach the gap, annulus, between the fiber and the back reflection chamber, that may be present where the fiber 2909 passes through the hole 2940 in the back reflection chamber 2906. Preferably a hard clad interface is located in free space within in chamber 2920. The hard clad interface is that section of the fiber transitioning from where the fiber has a hard clad to where there is no hard clad present. Preferably this transition from hard clad present to no hard clad has a hard clad termination face that is clean and normal to the axis of the fiber. The hard clad interface, or transition point, may be a source of heating, or heat generation. By way of example, a transparent epoxy resin may be used that is capable of handling 2 kW/cm$^2$ of laser power.

Figure 30A:
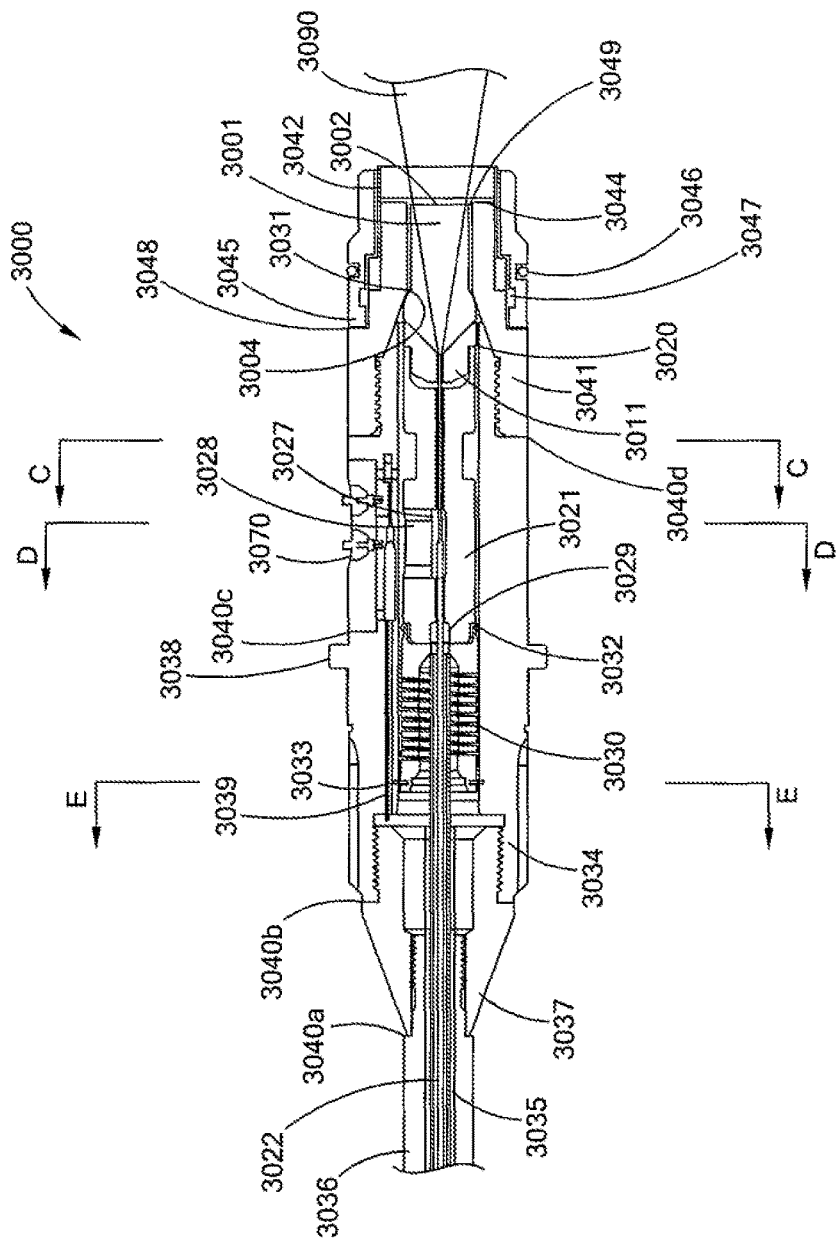
FIG. 30A is a cross-sectional view of the embodiment of FIG. 30.
Figure 30B:
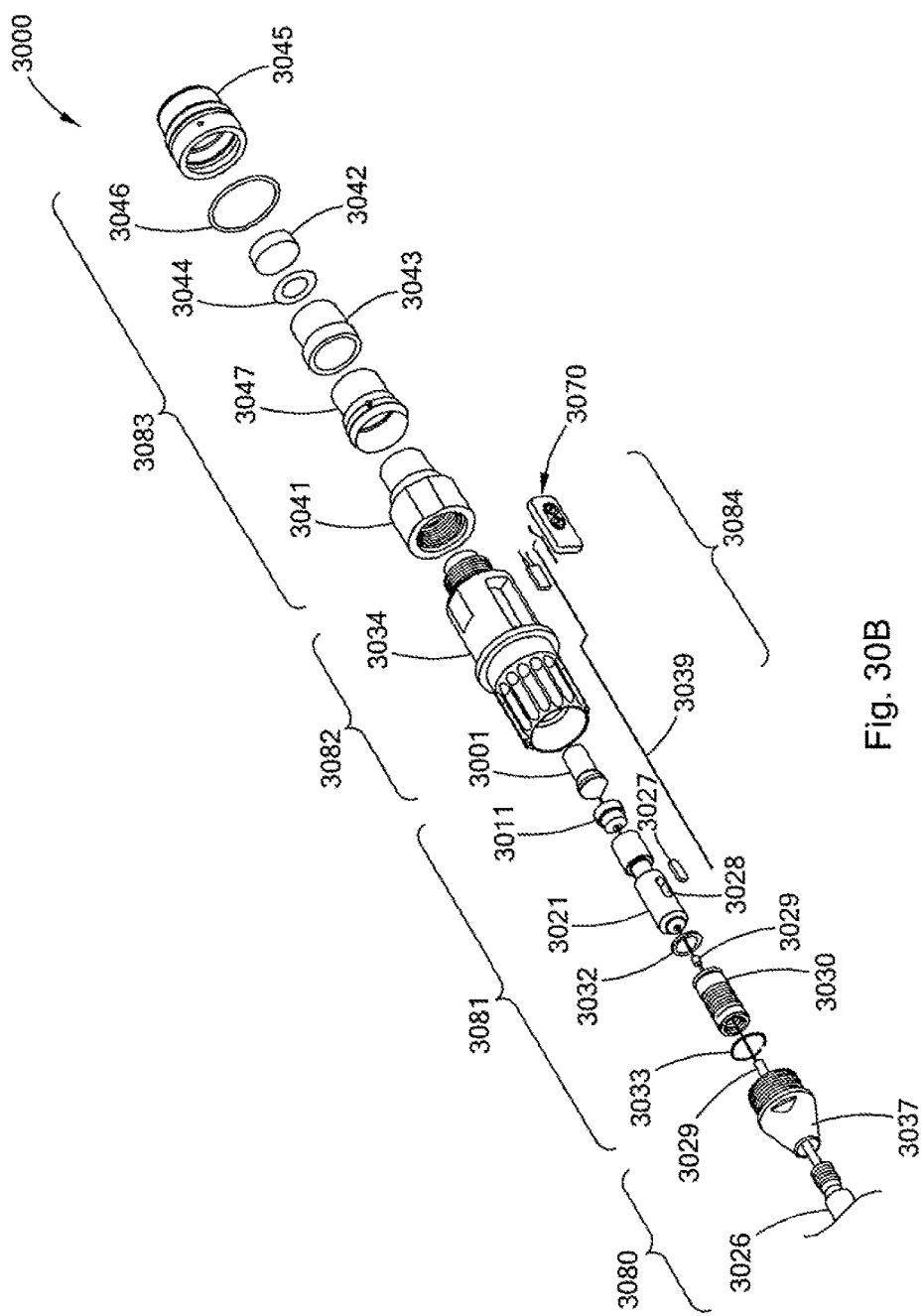
FIG. 30B is an exploded view of the embodiment of FIG. 30.
Figure 30C:
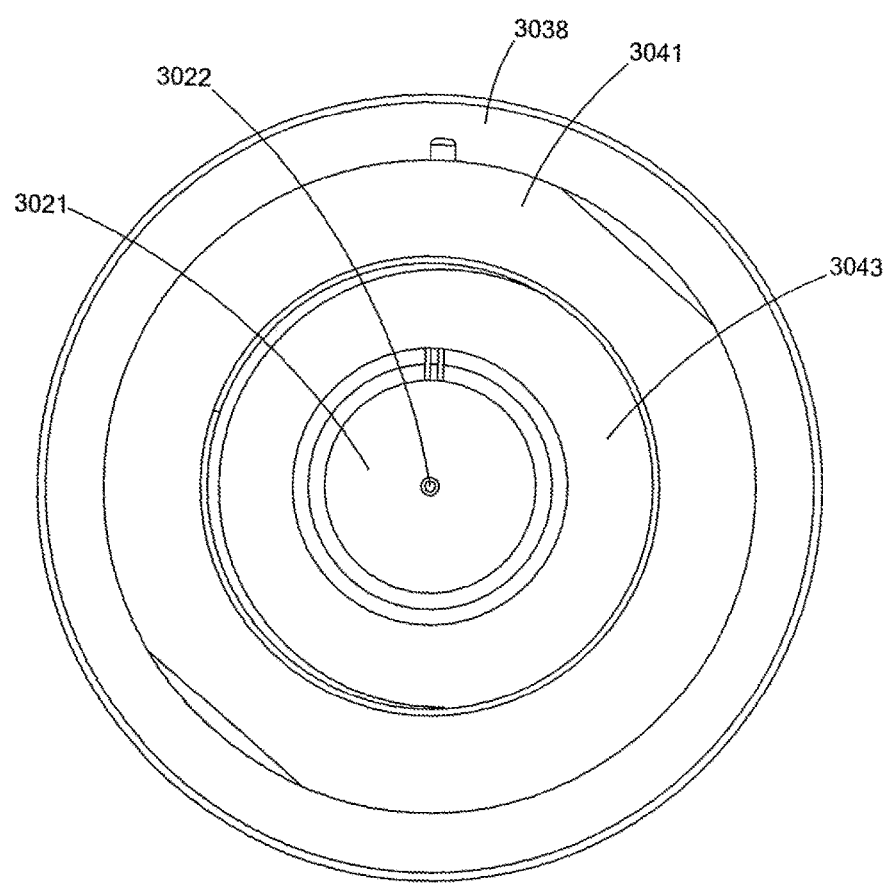
FIG. 30C is a cross-sectional view of the embodiment of FIG. 30 taken along line C-C of FIG. 30A.
Figure 30D:
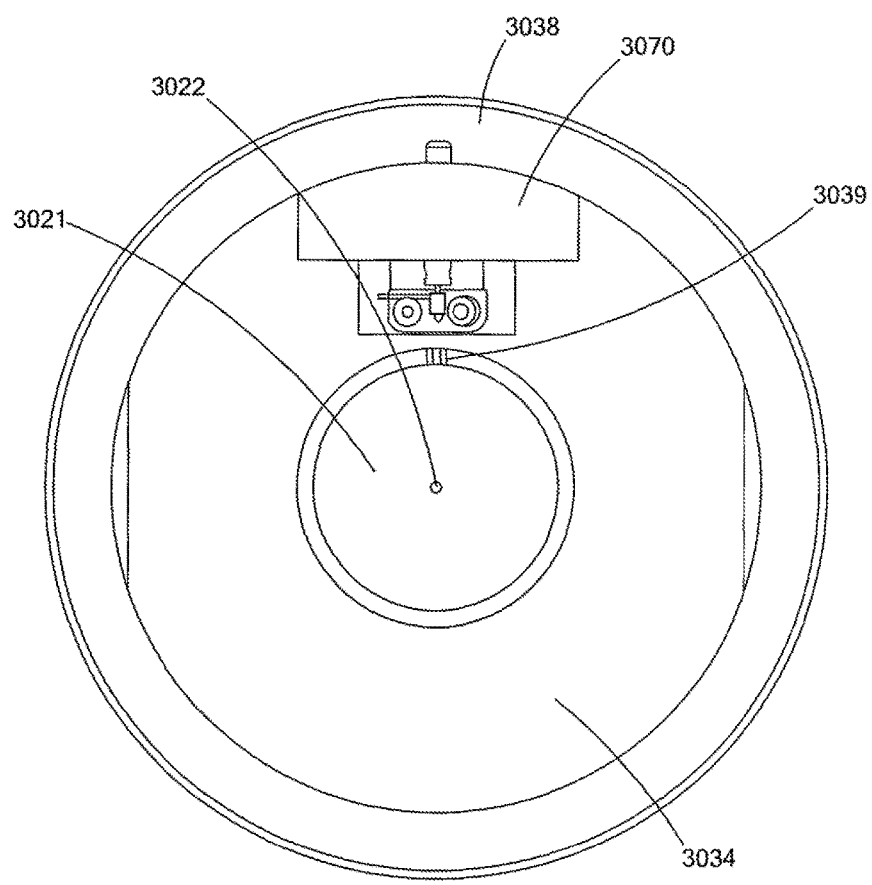
FIG. 30D is a cross-sectional view of the embodiment of FIG. 30 taken along line D-D of FIG. 30A.
Figure 30E:
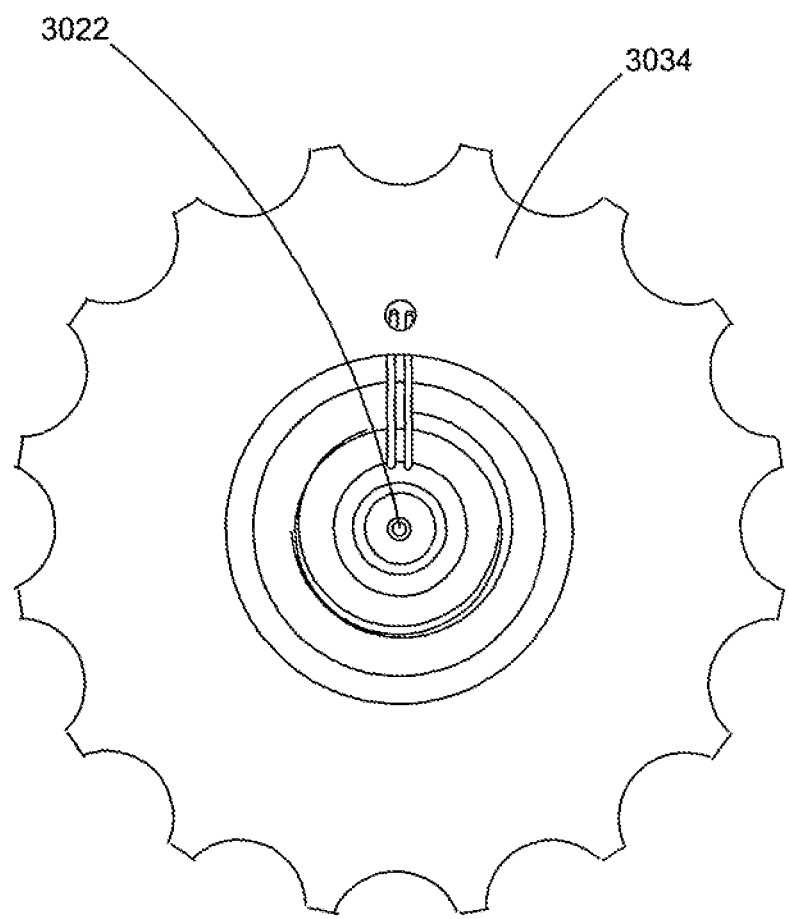
FIG. 30E is a cross-sectional view of the embodiment of FIG. 30 taken along line E-E of FIG. 30A.
Figure 30F:
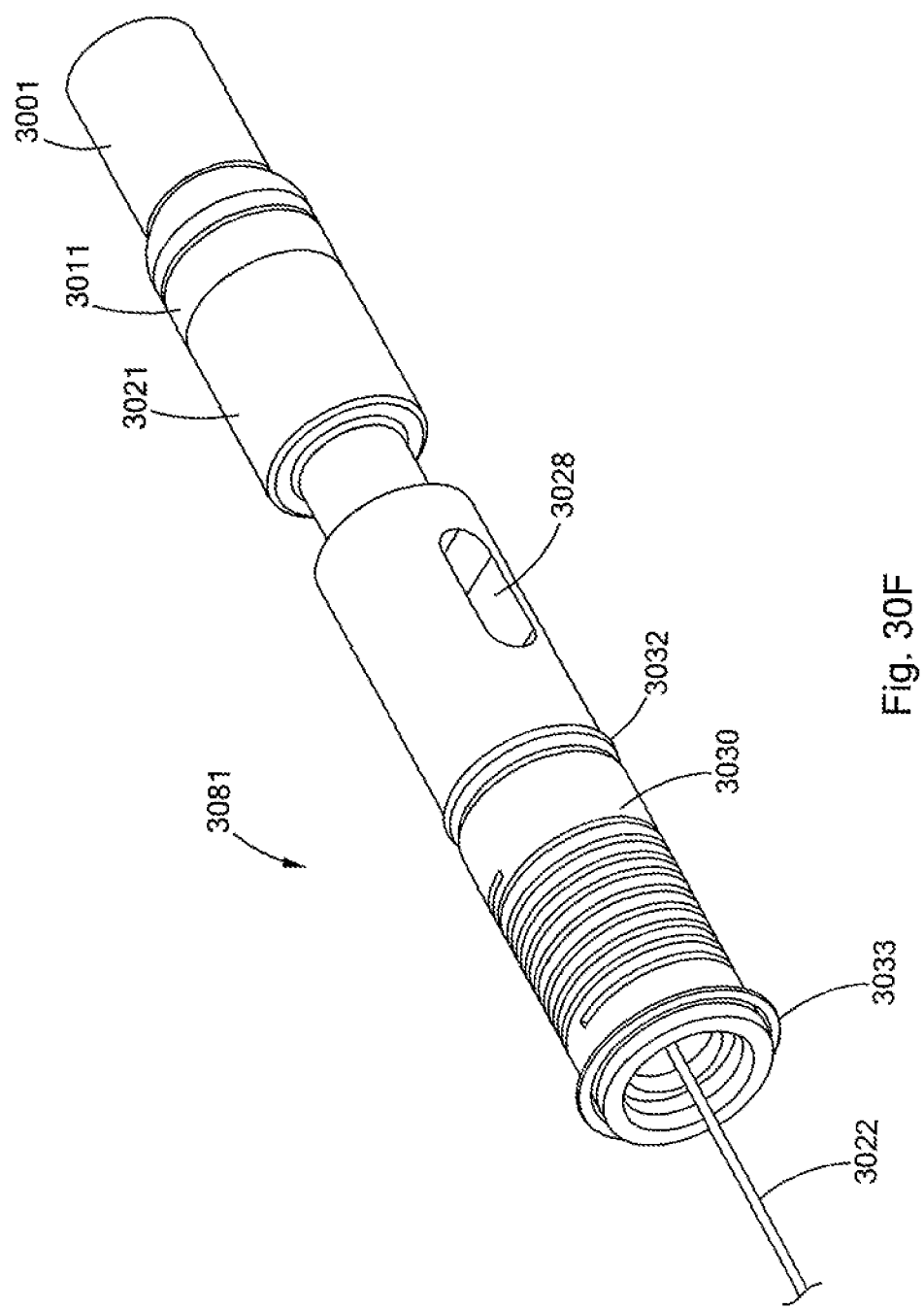
FIG. 30F is a perspective view of the internal section of the embodiment of FIG. 30A.
Figure 30G:
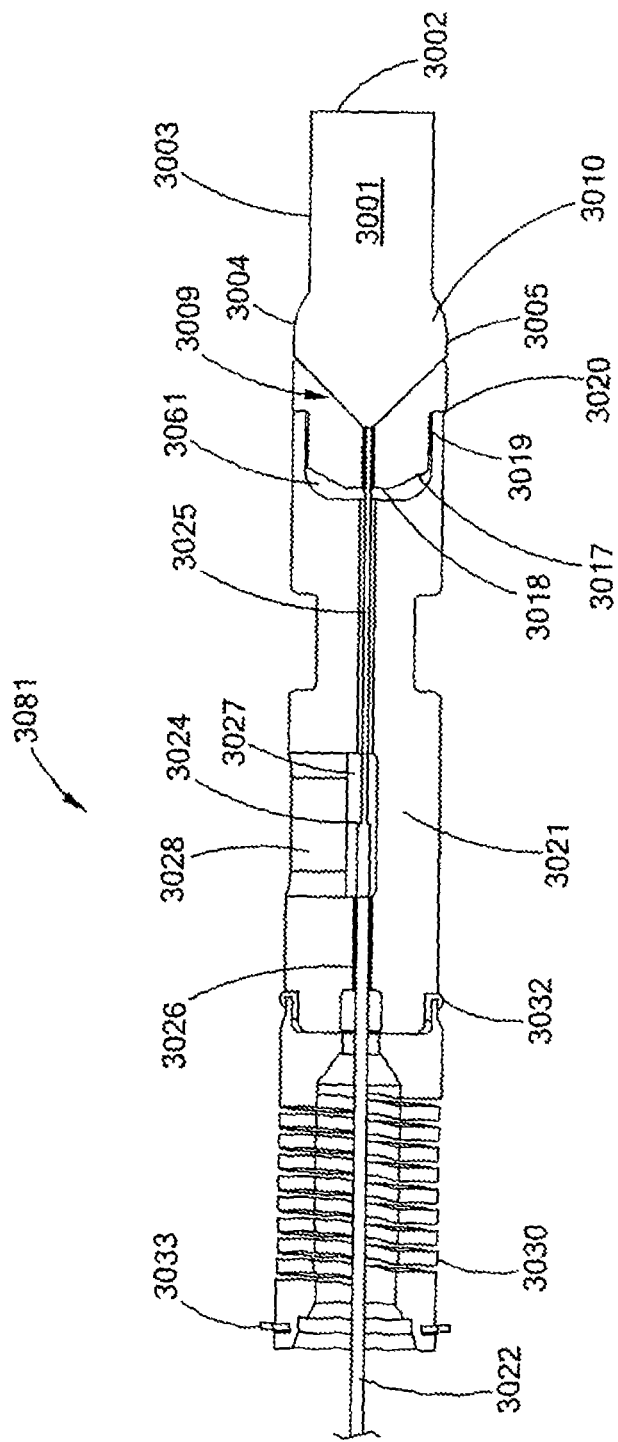
FIG. 30G is a cross-sectional view of the embodiment of FIG. 30F.
Figure 30H:
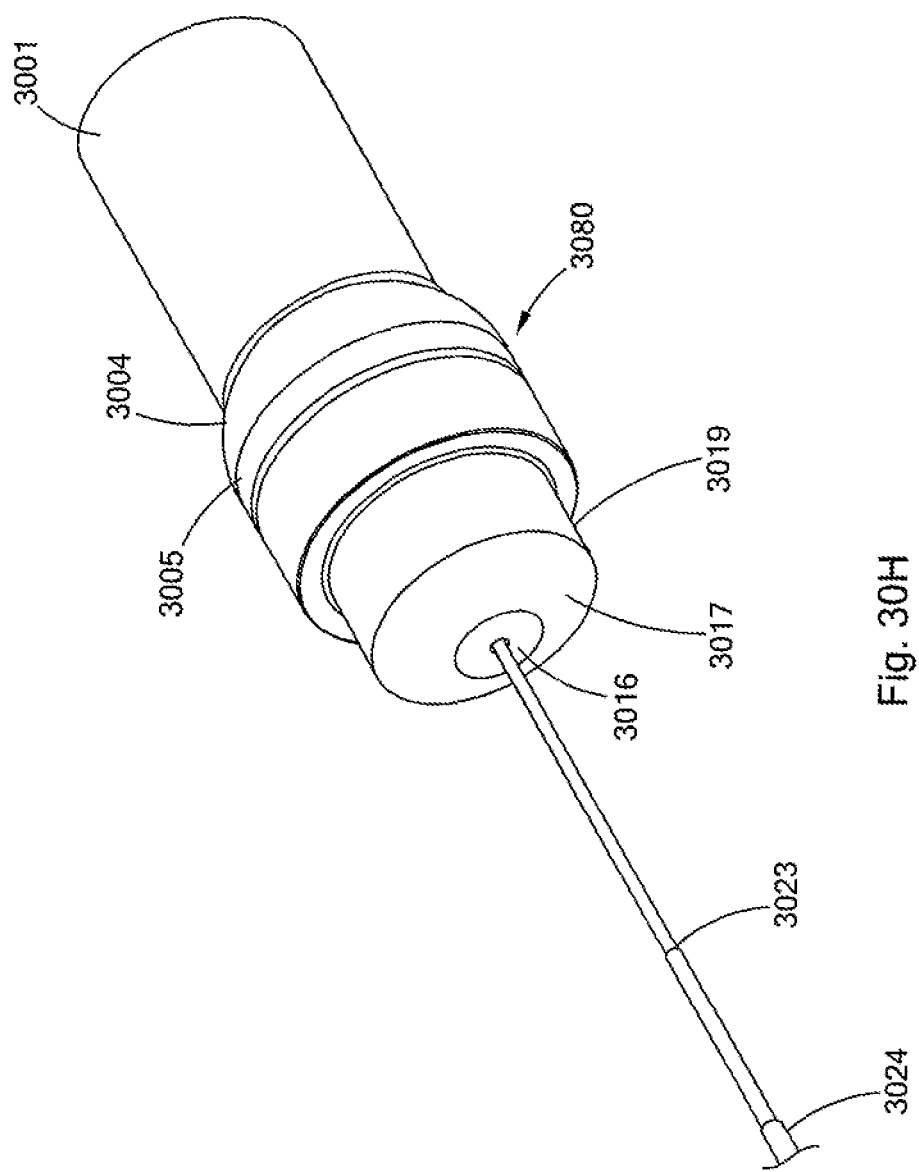
FIG. 30H is a perspective view of optical components of the embodiment of FIG. 30.
Figure 30I:
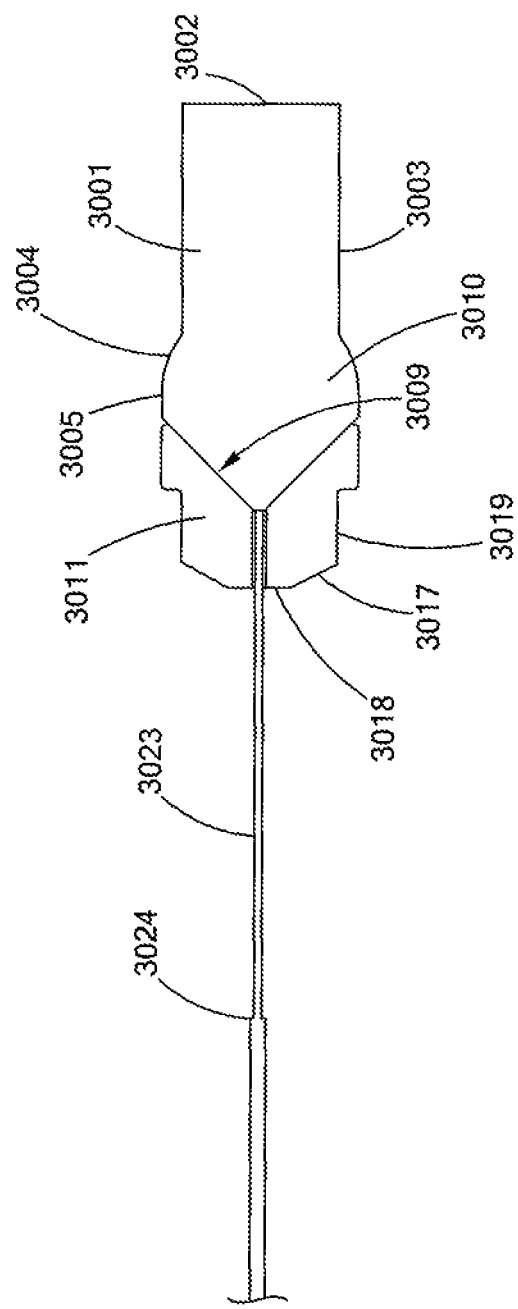
FIG. 30I is a cross-sectional view of the embodiment of FIG. 30H.
Figure 30J:
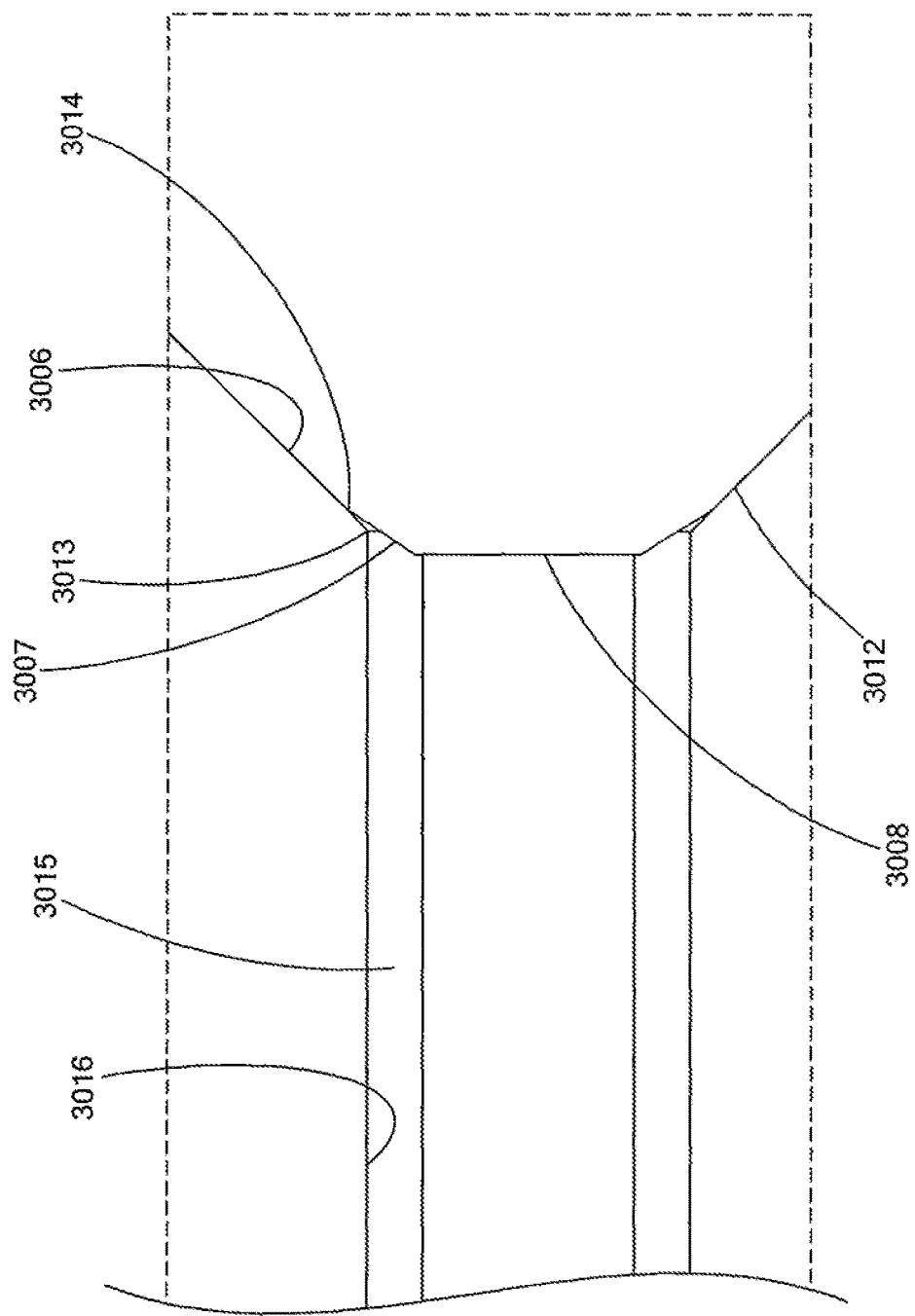
FIG. 30J is an enlarged cross-sectional view of the embodiment of FIG. 30I.

Turning to FIG. 30, and FIGS. 30A to 30J, there is provided an embodiment of a TIR connector. FIG. 30 is a perspective view of the connector 3000, showing the laser beam path 3090. FIG. 30A is a cross-sectional view of the connector 3000 showing the laser beam path 3090. FIG. 30B is an exploded perspective view of the components of the connector 3000. FIG. 30C is a transverse cross-section taken along line C-C in FIG. 30A. FIG. 30D is a transverse cross-section taken along line D-D in FIG. 30A. FIG. 30E is a transverse cross-section taken along line E-E in FIG. 30A. FIG. 30F is a perspective view of the components of the internal section of the connector. FIG. 30G is a cross-sectional view of those components. FIG. 30H is a perspective view of the fiber, back reflection chamber and optical block of the connector. FIG. 30I is a cross section of those components, and FIG. 30J is an enlarged cross-sectional view of those components in the area around the fiber optical block connection.

Turning to these figures, there is provided an embodiment of a connector 3000 that is configured to utilize and achieve TIR to address back reflections and forward propagating cladding modes. The connector 3000 has an optical block 3001 that has a distal face or surface 3002, which is flat, a side face or surface 3003, which is cylindrical, a third face or surface 3004, which is spherical and also functions as an engagement surface with the outer section 3083 of the connector (which engagement is explained in further detail below), a fourth face or surface 3005, which is cylindrical and forms the outer end of the ear 3010. The optical block 3001 has a back face or surface 3009 having a first back face or surface 3006, which is conical in shape and mates with the back reflection block 3011, a second back face or surface 3007, which is angled away from the back reflection block and is a transition to, a third back face or surface 3008, which is disc shaped and is the surface to which the optical fiber 3022 is bonded and attached. Although the back face 3009 of the optical block 3001 in this embodiment preferably has three back face sections each having a different and predetermined shape, more, less and faces having different shapes may be used.

A back reflection block 3011, which is a back reflection chamber, has an optically mating face or surface 3012, which is in the shape of a cone. The conical surface 3012 has a minor diameter 3013, as measured from the axis of the fiber 3022. The first back face 3006 of the optical block 3001, which mates and is optically and mechanically joined with face 3012, is in the shape of a cone having a minor diameter 3014. Preferably, the minor diameter 3014 of the optical block back face cone 3006 is larger than the minor diameter 3013 of the back reflection block face cone 3012. These diameters may be the same, larger or smaller than the others. Thus, optical block back face 3006 is optically bonded to optical mating surface 3012. As seen, for example, in FIG. 30J, these surfaces preferably are not entirely contacting, e.g., they are only substantially contacting. Thus, there is formed a small space, or gap, e.g., an air space, between these surface, 3012, and the back surface 3009, which is formed between surface 3006 and surface 3007. This space may be a part of space 3015, which may contain air. Space 3015 may also contain, although preferably not adjacent to surface 3007, a mode stripping means in optical attachment with the fiber 3022. Thus, and preferably, the entirety of surface 3006 is in optical contact with surface 3012; while the entirety of surface 3012 is not in optical contact with surface 3006.

The back reflection block 3011 has an inner annular surface 3016, which is cylindrical and forms or defines, in part, space 3015, a first back face or surface 3017, which is conical in shape, a second back face or surface 3018, which is annular, and a outer side face 3019, which is cylindrical. A space 3061 is formed or defined by the back sides of the back reflection block 3011 and the front inner face of the chamber or tube 3021.

The shapes, arrangement and configuration for the optical block 3001, back reflection block 3011, and chamber 3021 surfaces of the embodiment of FIGS. 30, 30A to 30J, are preferred for that embodiment. It being understood that other shapes, arrangements and configurations may be employed in that embodiment and in other embodiments of TIR connectors, partial TIR connectors, and non-TIR connectors. Further HR coated surface and TIR surface may be used in different configuration with in the optical components to provide for a predetermined light path.

Thus, for example, and preferably, for the configuration of the embodiment of FIG. 30, 30A-30J, back reflection block back surfaces 3018, 3017 and 3019 may have HR coatings, and preferably IBS coatings, and optical block side surface 3003 may preferably be a TIR surface.

The back reflection block and the optical block are preferably opto-mechanically joined by for example bonding. When the components are made from silica based materials, bonding by way of having a fluid containing silica that migrates into the joint, and then forms a bond when the fluid evaporates, is preferred. An example of this type of bonding is disclosed and taught in Sinha, Investigation of the suitability of silicate bonding for facet termination in active fiber devices (Optical Society of America 2007) and Sivasankar, Optical Bonding Using Silica nanoparticle Sol-Gel Chemistry, Nano Letters Vol. 7, No. 10, p. 3031-3034 (American Chemical Society 2007), the entire disclosure of which is incorporated herein by reference. Other forms of optical mechanical and opto-mechanical bonding that meet the strength and optical requirements for particular connector intended use may also be utilized.

The back reflection block is preferably bonded to the chamber or tube 3021. The chamber 3021 preferably is transparent, made from optical materials, and preferably the same optical materials as the optical block and back reflections block, but may also be made from metal, composite metals, composites or other similar materials.

The chamber 3021 has an epoxy chamber 3028 that contains epoxy 3027, which fixes the optical fiber 3022 to the chamber 3021. Preferably, the epoxy 3027 is uniform on both sides of the fiber, and does not fill the entirely of the epoxy chamber 3028. The fiber 3022 is bonded, opto-mechanically by for example a fusion process disclosed herein, to the back face 3008 of the optical block 3001. In this manner the optical block 3001, the back reflection block 3011, the chamber 3021 and the fiber 3022 form a preferably integral and preferably rigid opticalassembly. This optical assembly, as discussed below, contributes to the kinematic feature of this connector.

The fiber 3022 is contained in a TEFLON tube 3035, that is contained within a metal tube 3036. The fiber has a core, a first clad, a second or hard clad over the first clad, which hard clad may be a polymer over coat or clad, and a TEFZEL, which is an ETFE Fluoropolymer, coating over the hard clad. Moving from the tail to the face of the connector, the bare fiber, with hard clad removed is located forward of point 3023, and the TEFZEL coating is removed from point 3024 going forward. Space 3025 and space 3026 are provided within chamber 3021, and may be, for example, air spaces. Mode strippers may also be located in spaces 3025, 3026. A plug 3029, which may be a silicone resin or other type of fixing or holding material, is provided to provide strain relief for the fiber 3022. A spring 3030 is mechanically associated with the optical assembly, contacting the chamber 3021. The spring 3030 is held within and fixedly associated with the connector body 3034 by ledge 3033. The spring provides a forward bias, forcing surface 3004 into engagement with inner surface 3031 of pressure window 3041 (the kinematic relationship of which is explain in detail below). A capture nut 3037 fixes the fiber metal tube assembly to the connector body 3034. The connector body 3034 has a flange 3038. Laser welds 3040a, 3040b, 3040c, 3040d fix and seal the various components of the connector. There are also provided wires 3039, that attach to a monitoring assembly 3070, which may be any type of break detection, temperature, pressure or other types of instrumentation, and combinations and variations thereof, which wires connect to the surface or to a control, monitoring or control and monitoring system.

The components of the connector may be viewed as having sections, which sections may be separate, integral, fixed or otherwise associated for the operating conditions for the connector. Thus, there is provided a tail section 3080, an internal section 3081, an outer housing section 3082, an outer face section 3083, and a monitoring assembly 3084. The tail section 3080, the outer housing section 3082 and the outer face section 3083 form a pressure vessel that protects the internal section 3081 from pressure, dirt, debris, and other adverse operations and environment conditions. The pressure vessel is capable of withstanding over about 5,000 psi, over about 10,000 psi, over about 15,000 psi and about 20,000 psi or greater.

The outer face section 3083 has a pressure window housing 3041, a pressure window 3042, a pressure window holder 3043, a pad 3044, which may be a gold plated brass pad that accounts for surface imperfections and has gasketing properties. This section 3083 also has an alignment sleeve 3045, an o-ring 3046, epoxy 3047, a TEFLON pad 3048 and a gap or space 3049.

The connector 3000 is a kinematic structure. The inner section 3081 is affixed to the outer sections 3082, 3083 at only two locations: at the engagement location of surface 3031 and surface 3004, which is a sphere 3004 in a cone 3031 configuration or assembly; and at the location where radial spring 3032 engages the body 3034. The spherical shaped surface 3004 has a radius that is preferably based upon the virtual focus point within the optical block; similarly the alignment sleeve may also have an outer face for engaging a tool, receptacle, etc., that is based upon the virtual focus. In this manner the sphere-in-a cone and radial spring engagement points creates a kinematic structure such that angular changes of, or within the inner section of the connector, will not translate into radial changes of the laser beam path.

The configurations of the optical components of the connector provide for TIR. Preferably, the space 3015 should be as small as possible or practical, e.g., taking assembly considerations into account. This space 3015 may also have a mode stripper. Inner annular surface 3016 should have a surface smoothness of from about 1 Angstrom to about 50 microns, to facilitate refraction and to cause a predetermined back reflection to be launched out the face or front of the optical block. Thus, for example, a back reflection beam path may enter the optical block through surface 3002, travel to surface 3007, be refracted by surface 3007 to surface 3016, to surface 3017 where it may be reflected by TIR or an HR coating such a IBS, and directed out the face 3002 of the optical block 3001.

The outer diameter of outer surfaces of the optical block and back reflection block and their lengths should be large enough so that 90%, 95%, 99% and most preferably 99.99% or more of predetermined, or anticipated, back reflections are directed along various paths utilizing TIR at least at one point in the path to direct the back reflected light out of the face 3002 of the optical block 3001. The predetermined, or anticipated back reflections, may be determined based upon such factors as the intended work piece or surface, the stand off distance from the work piece, the focal length of the optics, and other properties of the optics positioned along the beam path between the connector and the work piece, the beam path environment and other factors and consideration.

Figure 35:
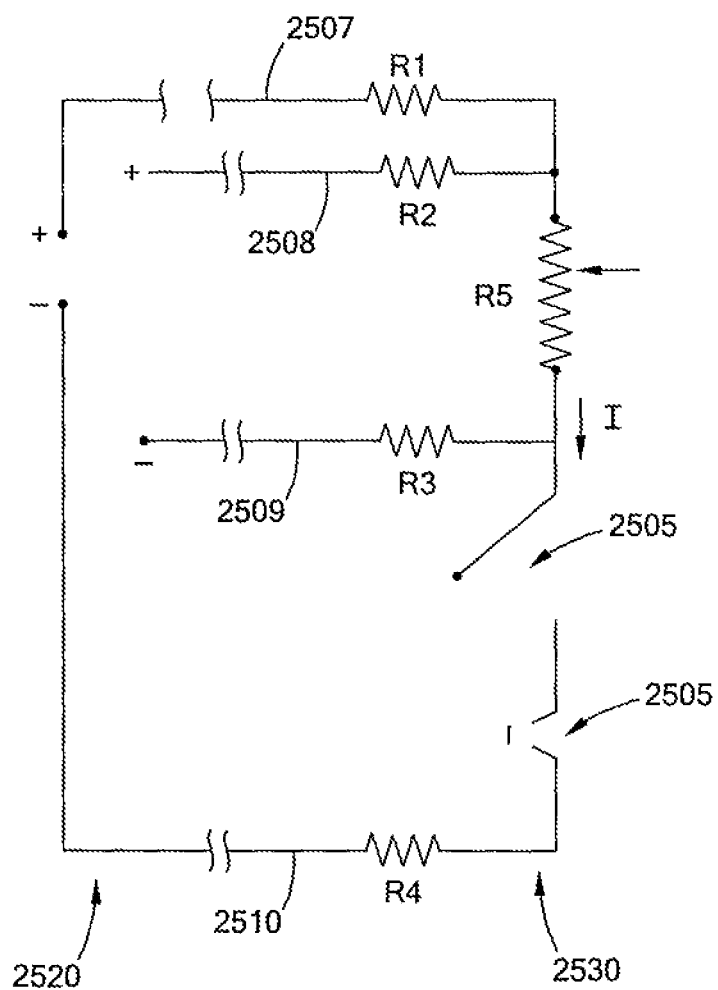
FIG. 35 is a schematic for an embodiment of a circuit in accordance with the present invention.

Turning to FIG. 35, there is provided an example of a variable control circuit, such as may be used for example as a monitoring assembly 3070 for the embodiment of FIGS. 30, 30A to 30J. Thus, there is provided a surface side of the circuit 2520, and a remote, e.g., down hole side 2530 of the circuit. Preferably, the remote side 2530 is located on, or associated with a connector, a down hole tool, a remote laser tool, optics assembly, laser bottom hole assembly, or other assembly or apparatus that is removed from the laser. Thus, for example, resistor R1, switch 2505, which may be, for example, a temperature switch or a pressure switch, and position switch 2506 may be located in the connector, and may make up, e.g., monitoring assembly 3070. Four wires 2507, 2508, 2509 and 2510 run from the remote components, e.g., R5, switches 2505, 2506, or the connector or down hole tool, etc. to the surface. R1, R2, R3 and R4 are the resistances of these wires based upon their length, diameter, material and other properties, and e.g., may have lengths of greater than about 1,000 ft, greater than about 5,000 ft, greater than about 10,000 ft and greater than about 20,000 ft. R5 is a variable resistor that may vary based upon temperature, pressure or other conditions. The potential at the surface that is applied to the circuit, may be for example 24 volts DC. Thus, if for example the connector is positioned correctly in a receptacle the position switch 2506 will be closed and if, e.g., the temperature is below the set point for the temperature switch 2505 that switch will be closed giving rise to the flow of current I. (If either the position switch 2506 or the temperature switch 2505 open the circuit is broken, and the laser will be shut down, preferably by means of an automatic control system.) Thus, in operation R1 to R4 will all be substantially the same, R5 will have a known current, an unknown resistance and produces a voltage. Because no current is flowing in wires 2508, 2509 there will be no voltage drop between the remote location and the surface location. Thus, the voltage across R5 can be determined, and is the same as, the voltage across wires 2508 and 2509 at the surface. In this manner the voltage can be correlated, or calibrated, to the resistance of R5 and a remote condition, such as temperature or pressure monitored at the surface.

In general, optical assemblies, an optical package, optical components and optics, that may be utilized, by way of example, with the present connectors, may be generally any type of optical element and/or system that is capable of handling the laser beam (e.g., transmitting, reflecting, etc. without being damaged or quickly destroyed by the beams energy), that is capable of meeting the environmental conditions of use (e.g., down hole temperatures, pressures, vibrations, etc.) and that is capable of effecting the laser beam in a predetermined manner (e.g., focus, de-focus, shape, collimate, steer, scan, etc.). Further examples of optical assemblies, optical packages, optical components and optics are disclosed and taught in the following US patent applications and US Patent Publications: US 2010/0044105, US 2010/0044104, Ser. No. 61/446,040, Ser. Nos. 61/446,312, 13/403,509, 13/403,287, the entire disclosure of each of which are incorporated herein by reference.

The present connectors may, by way of example, be used in, with, as a part of, or in conjunction with, laser and laser-mechanical methods, tools, systems and applications, in which the laser beam, or beams, may for example have 10 kW, 20 kW, 40 kW, 80 kW or more power; and have a wavelength in the range of from about 445 nm (nanometers) to about 2100 nm, preferably in the range of from about 800 to 1900 nm, and more preferably in the ranges of from about 1530 nm to 1600 nm, from about 1060 nm to 1080 nm, and from about 1800 nm to 1900 nm. Further, the types of laser beams and sources for providing a high power laser beam may, by way of example, be the devices, systems, optical fibers and beam shaping and delivery optics that are disclosed and taught in the following US patent applications and US Patent Application Publications: Publication No. US 2010/0044106, Publication No. US 2010/0044105, Publication No. US 2010/0044103, Publication No. US 2010/0044102, Publication No. US 2010/0215326, Publication No. 2012/0020631, Ser. No. 13/210,581, and Ser. No. 61/493,174, the entire disclosures of each of which are incorporated herein by reference. The source for providing rotational movement, for example for laser drilling applications in which the present connectors may be utilized, may be a string of drill pipe rotated by a top drive or rotary table, a down hole mud motor, a down hole turbine, a down hole electric motor, and, in particular, may be the systems and devices disclosed in the following US patent applications and US Patent Application Publications: Publication No. US 2010/0044106, Publication No. US 2010/0044104, Publication No. US 2010/0044103, Ser. No. 12/896,021, Ser. No. 61/446,042 and Ser. No. 13/211,729, the entire disclosures of each of which are incorporated herein by reference. The high power lasers for example may be fiber lasers or semiconductor lasers having 10 kW, 20 kW, 50 kW or more power and, which emit laser beams with wavelengths preferably in about the 1064 nm range, about the 1070 nm range, about the 1360 nm range, about the 1455 nm range, about the 1550 nm range, about the 1070 nm range, about the 1083 nm range, or about the 1900 nm range (wavelengths in the range of 1900 nm may be provided by Thulium lasers). Thus, by way of example, the present connectors may be utilized in a system that is contemplated to use four, five, or six, 20 kW lasers to provide a laser beam in a laser bottom hole assembly bit for hard rock drilling having a power greater than about 60 kW, greater than about 70 kW, greater than about 80 kW, greater than about 90 kW and greater than about 100 kW. One laser may also be envisioned to provide these higher laser powers.

High powered optical cables, spools of cables, creels, and reels of cables of the type disclosed and taught in the following US patent applications and US Patent Application Publications: 2010/0044104, 2010/0044103, 2010/0215326, 2012/0020631, Ser. Nos. 13/366,882, 13/403,692, 13/403, 723 and Ser. No. 13/210,581, the entire disclosures of each of which are incorporated herein by reference, may be, by way of example, used in conjunction with the present systems. Thus, for example, the conveyance structure may be: a single high power optical fiber; it may be a single high power optical fiber that has shielding; it may be a single high power optical fiber that has multiple layers of shielding; it may have two, three or more high power optical fibers that are surrounded by a single protective layer, and each fiber may additionally have its own protective layer; it may contain other conduits such as a conduit to carry materials to assist a laser cutter, for example oxygen; it may have other optical or metal fiber for the transmission of data and control information and signals; it may be any of the combinations set forth in the forgoing patents and combinations thereof.

The use of a component or components in one of the illustrated embodiments of the present connectors, but not in others, as well as, other components that may be used in only one, a few, less then all, or all of the illustrated embodiments, is not and should not be considered as a limitation or requirement that such components may only be used with those illustrated embodiments, or must necessarily be used with those illustrated embodiments. Rather, these components, consistent with the teachings herein, may be used, may be used with other embodiments, and may be used with other connector configures, without departing from the spirit of the inventions. Thus, the components, designs, teachings, configurations and arrangements for one embodiment of a connector may be utilized with, or for, the components, designs, teachings, configurations and arrangements of other embodiments of connectors.

The optical component at the face end of the connector, including optical blocks, such as a quartz block, may comprise a shaped element, which has a shape to affect the laser beam in a predetermined manner. For example, the element may be shaped such that it somewhat or entirely concentrates, collimates, or expands the beam by reflective means. Exemplary geometries for such an element would include parabolas, ellipses, and linear non-imaging concentrators. The reflection may be accomplished by coating, reflective material selection, or total internal reflection. Shaped elements can be utilized in both as the proximal and distal connector termination. In one embodiment, a proximal face connector would have a concentrating element. In another embodiment, a distal face connector would have a substantially collimating reflective element.

The configurations and assemblies that are provided from the management and mitigation of back reflections of the laser beam also may be utilized to manage and mitigate additional spectrum of electromagnetic radiation caused by the laser beam's interaction with a work piece, work surface, the work environment, and combinations and variations of these.

Although optical cables and optical fibers that have circular cross-sectional shapes are preferred and are utilized in the illustrative embodiments herein; it should be understood that fibers having other cross-sectional shapes may be utilized in the connectors of the present invention.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

What is claimed:

1. A passively cooled high power laser connector comprising:
   a. a tail end and a face end;
   b. a housing defining a cavity, the cavity located between the tail end and the face end;
   c. an optics package, comprising an optical fiber having a core, a first chamber, a back reflection chamber, an optical block, and a window; and,
   d. the optics package defining a portion of a laser beam path, the laser beam path extending from the tail end to the face end, and capable of transmitting a laser beam having a power of at least about 15 kW.

2. The connector of claim 1, comprising a means for athermalizing.

3. The connector of claim 1, comprising a means for addressing back reflections.

4. The connector of claim 1, comprising a means for addressing cladding modes.

5. The connector of claim 1, comprising a means for passively cooling the connector.

6. The connector of claim 1, comprising a means for athermalizing; and a means for addressing back reflections.

7. The connector of claim 6, comprising a means for passively cooling the connector.

8. The connector of claim 1, wherein the housing comprises a first and a second section; the first section comprising an alignment means.

9. The connector of claim 3, wherein the means for addressing back reflections comprises a TIR surface of the optical block.

10. The connector of claim 3, wherein the means for addressing back reflections comprises the optical block having ears.

11. A high power laser connector comprising:
    a. a tail end and a face end;
    b. a housing defining a cavity, the cavity located between the tail end and the face end;
    c. an optics package, comprising an optical fiber having a core, a first chamber, and an optical block;
    d. the optics package defining a portion of a laser beam path, the laser beam path extending from the tail end to the face end, and capable of transmitting a laser beam having a power of at least about 15 kW;
    e. at least a portion of the optics package in the cavity; and,
    f. the optics block having ear structures.

12. The connector of claim 1, comprising a means for monitoring a condition of the connector.

13. The connector of claim 11, comprising a means for monitoring a condition of the connector.

* * * * *